United States Patent
Hermany et al.

(10) Patent No.: US 9,697,545 B1
(45) Date of Patent: Jul. 4, 2017

(54) SERVICE MONITOR FOR MONITORING AND TRACKING THE PERFORMANCE OF AN APPLICATION RUNNING ON DIFFERENT MOBILE DEVICES

(71) Applicant: Apteligent, Inc., San Francisco, CA (US)

(72) Inventors: Sean Hermany, Salt Lake City, UT (US); Andrew Levy, San Francisco, CA (US); Robert Kwok, San Francisco, CA (US); Andrew Yousef, San Francisco, CA (US); David Shirley, Oakland, CA (US)

(73) Assignee: VMWARE, INC., Palo Alto, CA (US)

( * ) Notice: Subject to any disclaimer, the term of this patent is extended or adjusted under 35 U.S.C. 154(b) by 517 days.

(21) Appl. No.: 14/207,501

(22) Filed: Mar. 12, 2014

Related U.S. Application Data

(60) Provisional application No. 61/951,491, filed on Mar. 11, 2014.

(51) Int. Cl.
*H04W 24/00* (2009.01)
*G06Q 30/02* (2012.01)

(52) U.S. Cl.
CPC .................. *G06Q 30/0282* (2013.01)

(58) Field of Classification Search
CPC .............. G06Q 30/0282; G06F 11/0778
USPC ........................................ 455/423
See application file for complete search history.

(56) References Cited

U.S. PATENT DOCUMENTS

| 7,577,879 | B2 | 8/2009 | Lantz et al. | |
|---|---|---|---|---|
| 7,739,551 | B2 * | 6/2010 | Eickmeyer | G06F 11/0709 714/38.1 |
| 7,890,299 | B2 | 2/2011 | Fok et al. | |
| 7,966,522 | B2 * | 6/2011 | Fabbrocino | G06F 11/0793 714/26 |
| 8,180,376 | B1 | 5/2012 | Merritt | |
| 8,453,027 | B2 * | 5/2013 | Bartz | G06F 11/0709 714/746 |
| 8,516,308 | B1 * | 8/2013 | Gill | H04L 67/34 714/26 |

(Continued)

FOREIGN PATENT DOCUMENTS

WO PCT/US2015/053861 10/2015

OTHER PUBLICATIONS

International Search Report and Written Opinion for PCT/US2015/053861, Jan. 4, 2016 (mailing date), Crittercism, Inc.

(Continued)

*Primary Examiner* — Marceau Milord
(74) *Attorney, Agent, or Firm* — Adeli LLP

(57) ABSTRACT

Some embodiments provide a service monitor that operates on a number of different mobile devices to track and monitor services that an application is using. The service monitor of some embodiments includes a service call wrapper to intercept a request made by the application to access the service and capture data relating to the service request. The service monitor then sends the captured data to a performance monitoring server in order to present, based on the captured data and other captured data from other mobile devices, a set of performance reports relating to the performance of the service as used by the same application across a number of mobile devices.

14 Claims, 34 Drawing Sheets

(56) References Cited

U.S. PATENT DOCUMENTS

| | | | |
|---|---|---|---|
| 8,644,813 B1 | 2/2014 | Gailloux et al. | |
| 8,726,092 B1* | 5/2014 | Gray | G06F 11/0706 |
| | | | 714/38.1 |
| 8,861,360 B2 | 10/2014 | Chang et al. | |
| 8,898,637 B2 | 11/2014 | Surazski et al. | |
| 9,104,797 B1* | 8/2015 | Sekhar | G06F 11/362 |
| 9,198,117 B2* | 11/2015 | Raleigh | G06Q 10/06375 |
| 9,215,159 B2* | 12/2015 | Raleigh | H04L 67/2804 |
| 9,225,797 B2* | 12/2015 | Raleigh | G06Q 30/0601 |
| 9,253,663 B2* | 2/2016 | Raleigh | H04W 24/02 |
| 9,386,165 B2* | 7/2016 | Raleigh | G06Q 30/016 |
| 9,386,463 B1* | 7/2016 | Contino | H04W 24/02 |
| 9,436,553 B2* | 9/2016 | Sadovsky | G06F 11/142 |
| 9,438,491 B1* | 9/2016 | Kwok | H04L 43/065 |
| 2003/0120593 A1 | 6/2003 | Bansal et al. | |
| 2003/0149719 A1 | 8/2003 | Wang | |
| 2004/0068560 A1* | 4/2004 | Oulu | G06F 11/3495 |
| | | | 709/224 |
| 2006/0029016 A1* | 2/2006 | Peles | H04L 43/022 |
| | | | 370/328 |
| 2006/0218533 A1 | 9/2006 | Koduru et al. | |
| 2007/0136302 A1* | 6/2007 | Zuber | H04M 1/72561 |
| 2007/0207880 A1 | 9/2007 | Sullivan et al. | |
| 2010/0262619 A1* | 10/2010 | Zargahi | G06F 8/61 |
| | | | 707/770 |
| 2011/0196761 A1* | 8/2011 | Callahan | G06Q 10/10 |
| | | | 705/27.1 |
| 2012/0023475 A1* | 1/2012 | Surazski | G06F 11/0742 |
| | | | 717/100 |
| 2012/0069131 A1* | 3/2012 | Abelow | G06Q 10/067 |
| | | | 348/14.01 |
| 2012/0117478 A1 | 5/2012 | Vadde et al. | |
| 2012/0252357 A1 | 10/2012 | Tarleton et al. | |
| 2013/0027561 A1* | 1/2013 | Lee | G06Q 30/02 |
| | | | 348/150 |
| 2014/0024348 A1 | 1/2014 | Hurst et al. | |
| 2014/0113588 A1 | 4/2014 | Chekina et al. | |
| 2014/0242945 A1* | 8/2014 | Zeng | G06F 21/53 |
| | | | 455/410 |
| 2014/0281714 A1* | 9/2014 | Matthews | G06F 11/2294 |
| | | | 714/27 |
| 2015/0106505 A1* | 4/2015 | Ramaswamy | G06Q 30/02 |
| | | | 709/224 |
| 2015/0213561 A1* | 7/2015 | Hollis | G06F 17/2247 |
| | | | 705/14.66 |
| 2015/0227404 A1* | 8/2015 | Rajagopal | G06F 11/0748 |
| | | | 714/37 |

OTHER PUBLICATIONS

U.S. Appl. No. 14/207,512, filed Mar. 12, 2014, Levy, Andrew, et al.
Portions of prosecution history of U.S. Appl. No. 14/207,512, Oct. 2, 2015, Levy, Andrew, et al.
Author Unknown, "PonyDebugger," month unknown, 2013, 9 pages, available at http://web.archive.org/web/20130901043356/https://github.com/square/PonyDebugger.

* cited by examiner

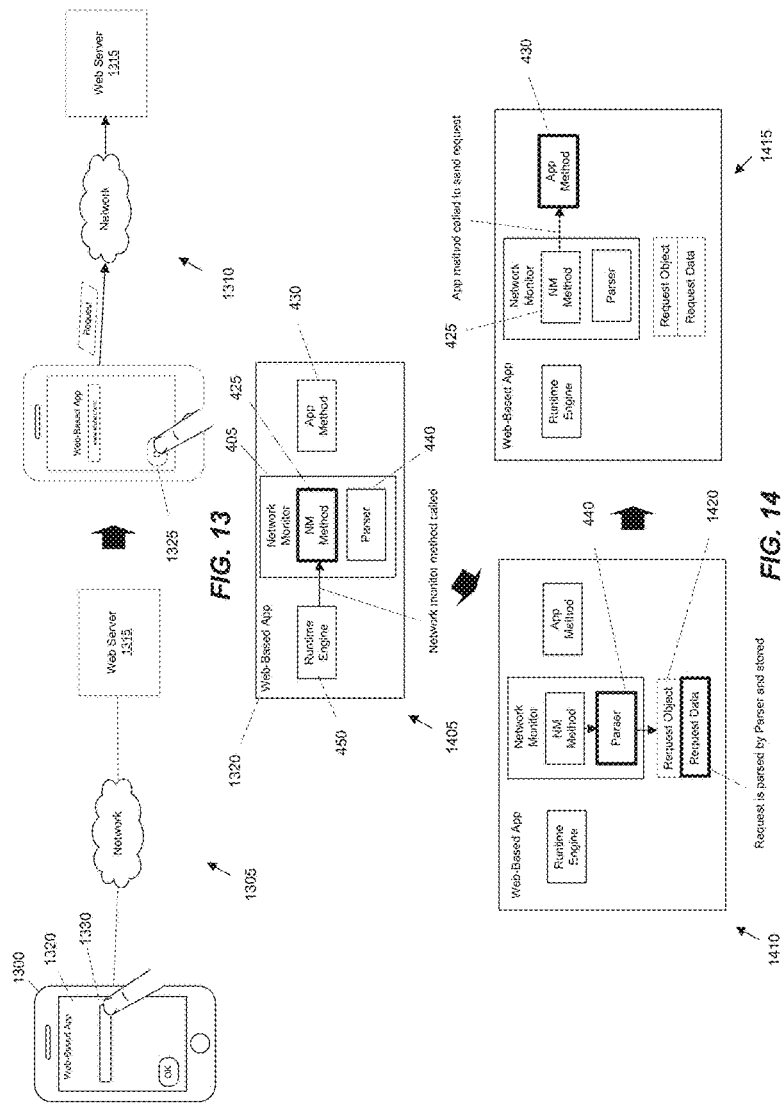

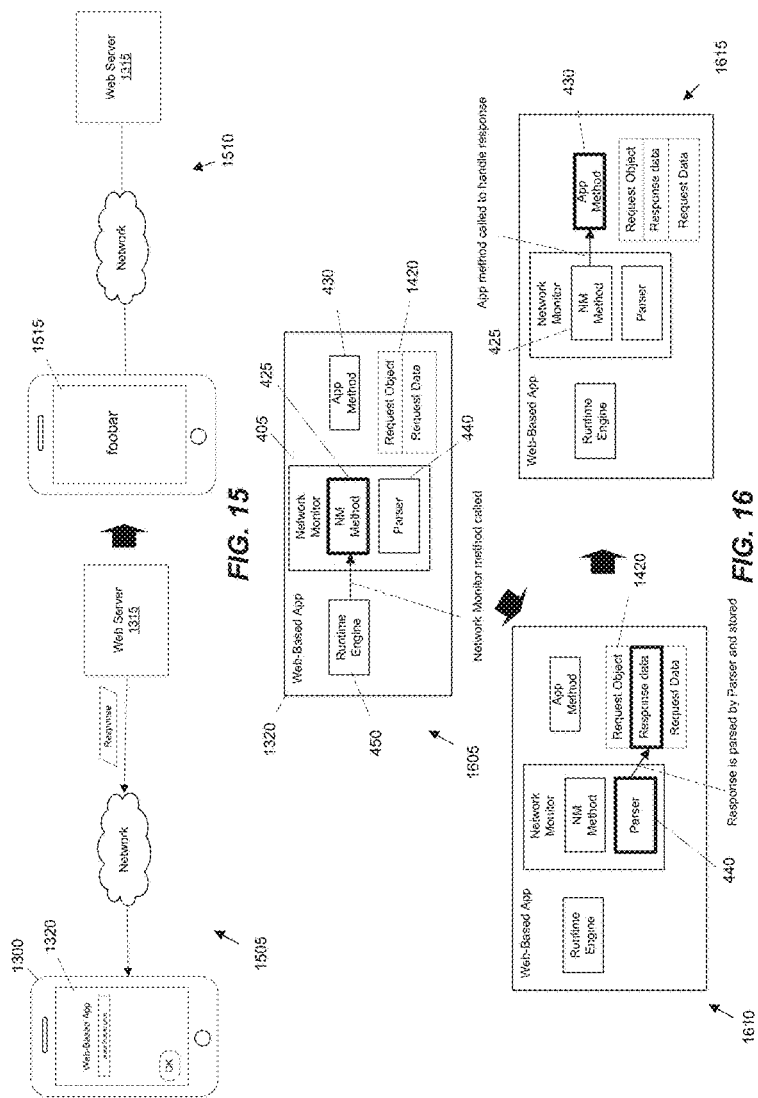

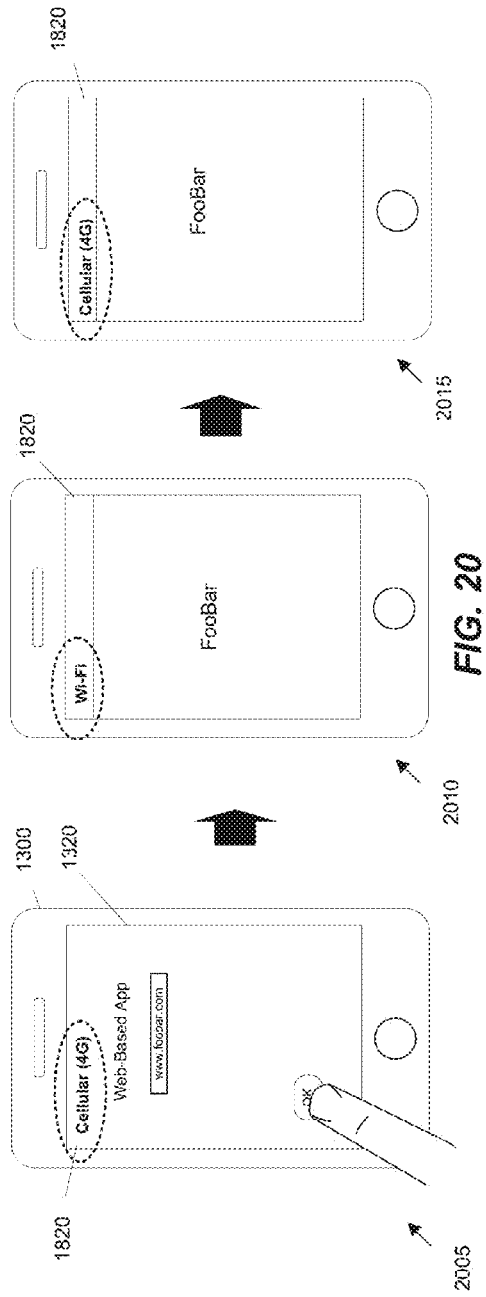
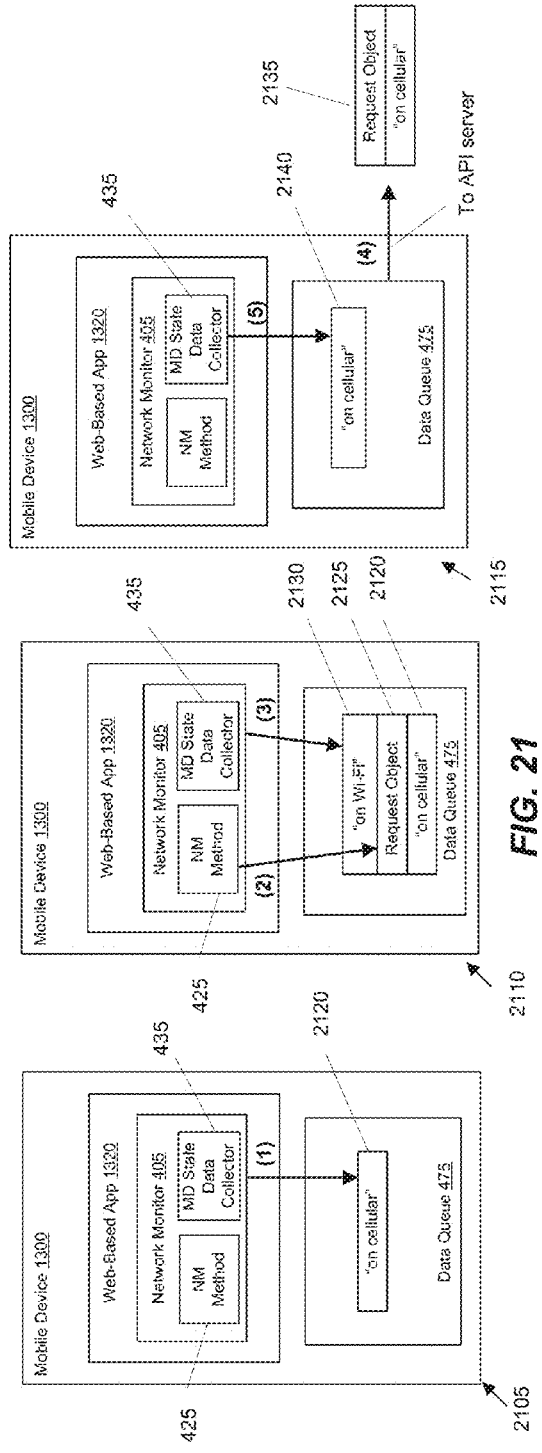
FIG. 20
FIG. 21

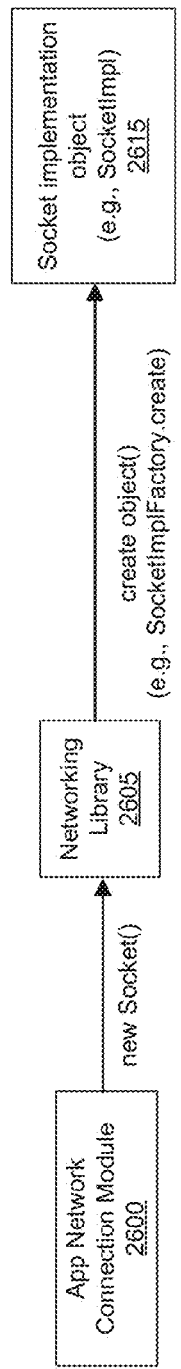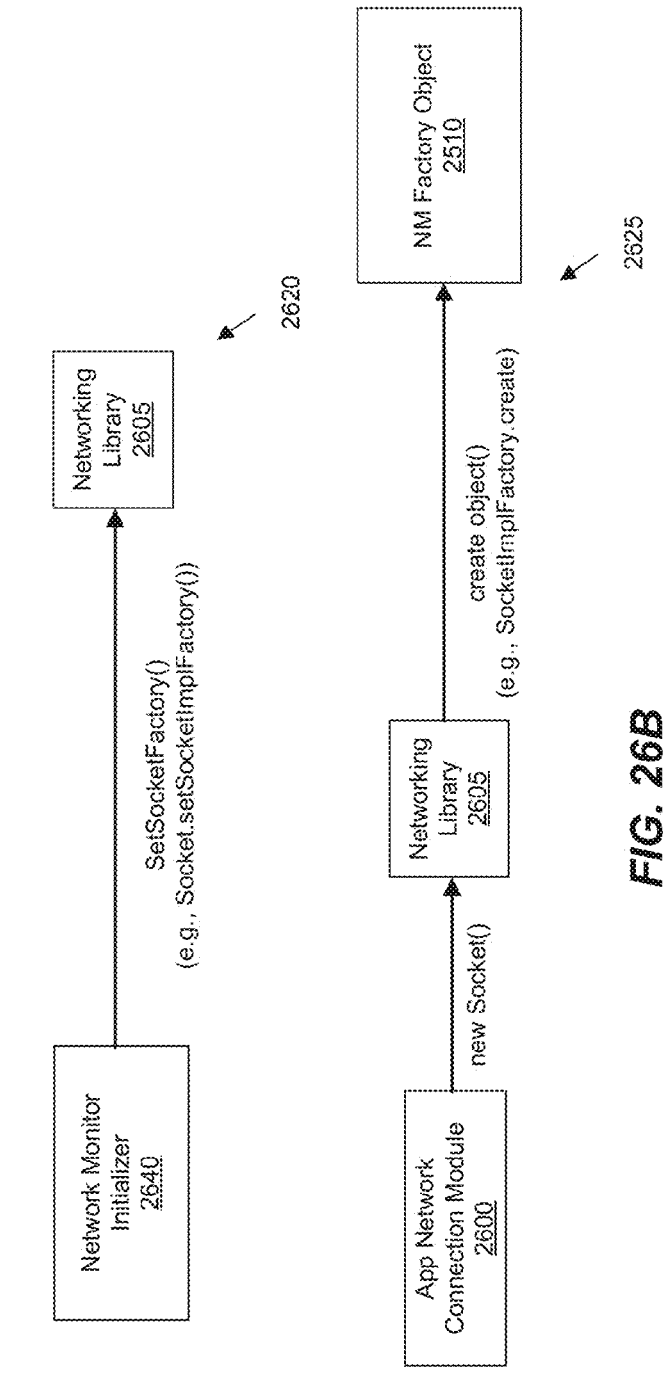
FIG. 26A
FIG. 26B

Device Trends

| | Request Volume | Latency | Userbase | Service Errors | Crashes |
|---|---|---|---|---|---|
| Smart Phone – Model 1 | 120,000 | 1 s | 50% | 5.0% | 1.0% |
| Smart Phone – Model 2 | 100,000 | 900 ms | 20% | 6.5% | 2.0% |
| Tablet – Model 1 | 75,000 | 800 ms | 20% | 8.5% | 2.0% |
| Tablet – Model 2 | 10,000 | 950 ms | 10% | 10% | 5.0% |

OS Trends

| | Request Volume | Latency | Userbase | Service Errors | Crashes |
|---|---|---|---|---|---|
| Mobile OS Version 1.5 | 110,000 | 850 ms | 55% | 6.0% | 4.0% |
| Mobile OS Version 1.4 | 90,000 | 800 ms | 20% | 6.5% | 2.0% |
| Mobile OS Version 1.0 | 70,000 | 500 ms | 15% | 7% | 2.5% |
| Mobile OS Version (beta) | 5,000 | 950 ms | 10% | 8% | 4.0% |

*FIG. 37*

SERVICE MONITOR FOR MONITORING AND TRACKING THE PERFORMANCE OF AN APPLICATION RUNNING ON DIFFERENT MOBILE DEVICES

CLAIM OF BENEFIT TO PRIOR APPLICATIONS

This application claims the benefit of U.S. Provisional Patent Application 61/951,491, entitled "Service Monitor for Monitoring and Tracking the Performance of Applications Running on Different Mobile Devices", filed Mar. 11, 2014. U.S. Provisional Patent Application 61/951,491 is incorporated herein by reference.

BACKGROUND

The mobile device industry has been growing for a number of years. The growth in the industry has led to a proliferation of many different types of mobile devices from various different vendors. A vendor may provide various different make and/or models of several mobile devices to gain a competitive edge in the growing industry. For instance, the vendor may provide different smart phones and/or tablets that come in different sizes, with different specifications, etc. In addition, different mobile devices may come with different mobile operating systems (OSs) or different versions of the same mobile OS. Some vendors even modify a particular mobile OS to add or remove specific features. The evolution of the mobile OSs has even led to many other computing devices (e.g., game systems, media player appliances, etc.) adopting the mobile OSs or modified versions thereof.

With the growth, there is an increasing demand for quality applications. The challenges that application developers face can be daunting. For example, to grow with the industry, the developers may have to write applications for different mobile OSs. Different mobile OSs will try to promote different programming languages (e.g., through their respective application programming interfaces (APIs), libraries, and/or frameworks). In addition, each different version of one mobile OS may add and/or remove features (e.g., use different APIs).

Many application developers rely on user feedback to determine if there are any issues (e.g., performance issues) with their applications. Such user feedback may be valuable, but it may not provide the developers with (e.g., real-time) data about how their applications are performing across a number of different mobile devices (e.g., that are from different vendors and/or operate on different mobile OSs). The user feedback may also not provide (e.g., at least in real-time and with minimum effort) detailed measurements of how their applications are performing across different mobile devices in relation to different services, such as cloud services, that the applications are using.

BRIEF SUMMARY

Some embodiments provide a service monitor that operates on a number of different mobile devices to track and monitor services that an application is using. An application may depend on a number of services, such as network services to access various cloud services. In some embodiments, a cloud service represents any service that an application executing on the mobile device needs to access a server through a network, such as the Internet, to provide data and/or retrieve data. Although this list is non-exhaustive, examples of different types of cloud services include a storage service (e.g., an image hosting service, a data backup service), a social network service, a media streaming service, a news service, a weather forecast service, a game service, a messaging service, etc.

In some embodiments, the application can be a native application, a carrier-based application, or a third-party application that communicates with a server through one or more different interfaces, such as through a Wi-Fi interface and a cellular interface (e.g., 4G interface). The service monitor operates in conjunction with such an application to gather data relating to the services and send the gathered data to a server (e.g., managed by a mobile application performance monitoring (mAPM) service provider). The gathering of the data can occur in many mobile devices that are of different types (e.g., smart phone, tablet, etc.), that are from various different vendors, and/or that operate on different mobile operating systems (OSs). For instance, any mobile device with the application with the service monitor enabled can trap and send data each time the application uses a particular service.

Once the data is gathered, it is presented on a client in some manner to inform the application developer of the performance of the application. As an example, the gathered data can be formatted or translated, and then presented (e.g., in-real time) by a mAPM server to show latencies, error rates, data bandwidth, and the number of service requests to different application programming interfaces (APIs). This provides the developer with a wealth of knowledge to quickly identify areas that need improvement, and/or troubleshoot any poorly performing APIs as well as verify and maintain the quality of correctly performing APIs. As the data is gathered from different types of mobile devices, the gathered data can be used to pinpoint or identify a particular type of mobile device (e.g., make and model) or mobile OS (e.g., a particular version of the mobile OS) in which the application is performing poorly.

In monitoring, the service monitor of some embodiments is configured to intercept services calls that an application makes and record certain information relating to the calls. In some embodiments, when a network service is requested by the application, the service monitor captures data relating to the network service request. If there is a response to the service request, the service monitor may also capture data relating to the response. For instance, the service monitor may record the time of the request and the time of the response. From the recorded timestamps, the service monitor may compute latency or some other measurement, such as response time. Alternatively, or conjunctively with such timestamps, the service monitor may capture other data such as an address (URL) associated with the request, the amount of data sent (e.g., bytes sent) with the request, the amount of data received (e.g., bytes received) with the response, an error code in the response, other headers of the response, etc.

As mentioned above, the gathering of the data can occur in many different types of mobile devices (e.g., smart phone, tablet, etc.) from various different vendors. The gathering of data can occur on several different mobiles OSs. To provide additional context regarding the service calls, the service monitor of some embodiments gathers mobile state data. In some embodiments, the service monitor associates each service call data with mobile state data that indicates the state of the mobile device (e.g., at the time the service call data was captured). The mobile state data can include any one or more of the following: carrier info (e.g., the name or identity of the wireless carrier that is servicing the mobile device), geo location information (e.g., latitude, longitude), network connectivity information (e.g., whether the device was on Wi-Fi, cellular, or not connected), mobile network code (MNC), mobile country code (MCC), roaming, time, battery level, memory usage, up time, whether the device is jailbroken or rooted, mobile OS version, and mAPM service monitor version.

In addition to mobile state data or instead of it, the service monitor may collect other data that provide additional context regarding each service call. For instance, when the service monitor is ready to send a report regarding a service call, the service monitor might add to the report an application ID, the version number of the application, a device ID, the make and/or model of the mobile device, the version number of the mobile operating system (OS), etc. In this manner, when the developer views the gathered data, the developer can pinpoint specific areas of interest (e.g., a particular application version, a particular make or model of the mobile device, etc.) that need improvement.

In some embodiments, the service monitor operates on different types of mobile OSs. On or more different types of mobile OSs, the service monitor of some embodiments includes a service call wrapper that wraps an object, method, or function to (1) intercept a service request made by the application to access the service and (2) capture data relating to the service request. Alternatively, in one or more other different types of mobile OSs, the service monitor may include a monitored socket object and/or a monitored connection object to capture data relating a network connection each time the application uses the connection to access a network service.

The service monitor of some embodiments is one of several different tools provided by a mAPM service provider. For instance, the mAPM service provider may also provide one or more other monitors (e.g., a crash monitor, a handled exceptions monitor). In some such embodiments, the service monitor operates on a mobile device to track at least one service that the application is using and to store a log relating to the use of the service each time the application uses the service. An error monitor may also operate on the mobile device to detect an application error (e.g., an application crash). When there is an application error, the error monitor may send a message to the API server regarding the error (e.g., with a code stack trace) along with one or more logs relating to the use of the service. In some embodiments, the message is then used to present an error report to a developer. The developer can then use the error report with one or more log entries to determine if the service usage is in any way correlated to the application error.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments are set forth in the following figures.

FIG. 13 shows an example user interaction with an application that causes the network request to be sent to a cloud service.

FIG. 14 conceptually shows how the network monitor operates as a background process to capture data associated with the service request.

FIG. 15 shows the mobile device receiving a response the network service request.

FIG. 16 shows how the network monitor operates as a background process to capture data associated with the response to the service request.

FIG. 20 illustrates an example of a network request being made by the application while the state of the mobile device is changing.

FIG. 21 illustrates an example of how the network monitor does not update or replace a mobile device state if that state is associated with service call data.

FIG. 26A shows the operations of the application without the network monitor enabled.

FIG. 26B shows the operations of the same application after the network monitor has been enabled.

FIG. 37 provides an illustrative example performance report generated by an API server.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Embodiments described herein provide a service monitor that operates on a number of different mobile devices to track and monitor services that an application is using. An application may depend on a number of services, such as network services to access various cloud services. In some embodiments, a cloud service represents any service that an application executing on the mobile device needs to access a server through a network, such as the Internet, to provide data and/or retrieve data. Although this list is non-exhaustive, examples of different types of cloud services include a storage service (e.g., an image hosting service, a data backup service), a social network service, a media streaming service, a news service, a weather forecast service, a game service, a messaging service, etc.

In some embodiments, the application can be a native application, a carrier-based application, or a third-party application that communicates with a server through one or more different interfaces, such as through a Wi-Fi interface and a cellular interface (e.g., 4G interface). The service monitor operates in conjunction with such an application to gather data relating to the services and send the gathered data to a server (e.g., managed by a mobile application performance monitoring (mAPM) service provider). The gathering of the data can occur in many mobile devices that are of different types (e.g., smart phone, tablet, etc.), that are from various different vendors, and/or that operate on different mobile operating systems (OSs). For instance, any mobile device with the application with the service monitor enabled can trap and send data each time the application uses a particular service.

Once the data is gathered, it is presented on a client in some manner to inform the application developer of the performance of the application. As an example, the gathered data can be formatted or translated, and then presented (e.g., in-real time) by a mAPM server to show latencies, error rates, data bandwidth, and the number of service requests to different application programming interfaces (APIs). This provides the developer with a wealth of knowledge to quickly identify areas that need improvement, and/or troubleshoot any poorly performing APIs as well as verify and maintain the quality of correctly performing APIs. As the data is gathered from different types of mobile devices, the gathered data can be used to pinpoint or identify a particular type of mobile device (e.g., make and model) or mobile OS (e.g., a particular version of the mobile OS) in which the application is performing poorly.

Figure 1:
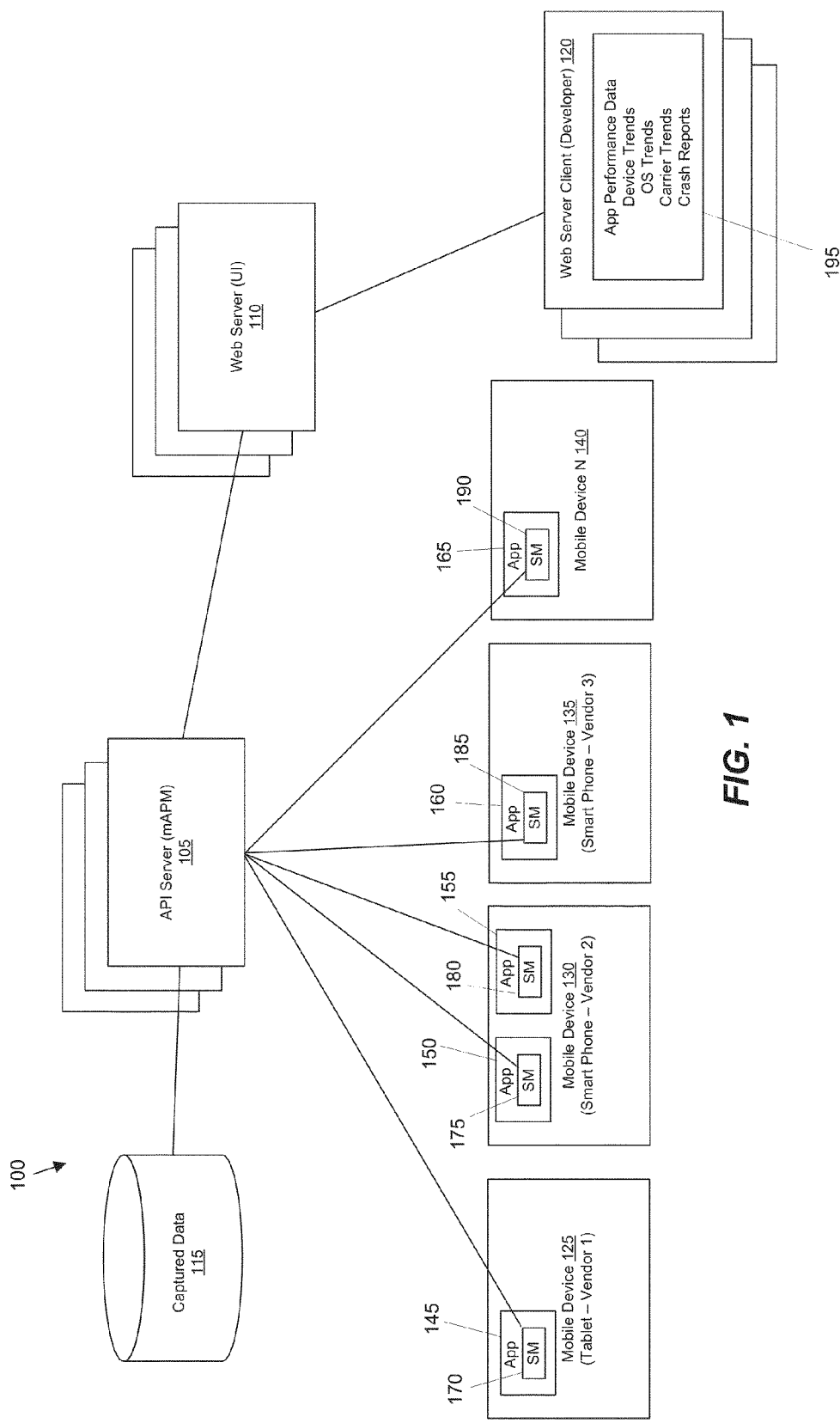
FIG. 1 conceptually illustrates a system for monitoring application services on different mobile devices.

For some embodiments of the invention, FIG. 1 conceptually illustrates a system 100 for tracking and monitoring services that applications use on different mobile devices. Specifically, this figure shows several mobile devices 125-140 reporting data regarding services that applications are using to a set of one or more application programing interface (API) servers. The captured data is then stored in storage 115, formatted and/or translated in some manner by an API server, and presented to an application developer on a client.

The service monitor (170-190) operates on different types of mobile devices (125-140) to monitor services that applications (145-165) are using. In the example of FIG. 1, the mobile devices include a tablet 125 and several smart phones 130 and 135. However, one of ordinary skill in the art will understand that the discussion in this example as well as other examples discussed hereinafter is equally applicable to other kinds of mobile devices (e.g., a smart watch, a phablet, etc.) or any other electronic devices (e.g., a digital media player appliance, a game system, a smart television (TV), a smart appliance, desktop computer, laptop, etc.). Today, many electronic devices are using a modified version of an existing mobile device operating system (OS) as their OS. For instance, a digital media player or a game system might come pre-packaged with a modified version of iOS® by Apple Inc. or Android™ OS by Google Inc.

In addition to device types, the mobile devices can be from different vendors. For instance, in FIG. 1, the tablet 125 is from a first vendor (e.g., Amazon Inc.), the smart phone 130 is from a second vendor (e.g., Apple Inc.), and the smart phone 135 is from a third vendor (e.g., Nokia Inc.). Today, many vendors modify a particular mobile device OS (e.g., Android OS) to add and/or remove features.

The mobile devices 125-140 can also be serviced by different carriers. For instance, in FIG. 1, the mobile device 130 may use one carrier to access the cellular network, while the mobile device 135 may use another carrier. In addition, the devices might access the network using one or more different services. For instance, the tablet 125 may access the internet through Wi-Fi or through the cellular network.

The service monitor 170-190 performs the monitoring on such different device to capture various pieces of data (e.g., performance data, metadata) relating to services that applications use. As an example, each time that an application uses a network service to send and receive data, the service monitor may trap and send metadata and performance data to the API server. The developer can then view and analyze the captured data to identify any issues (e.g., performance issues, error issues) that end-users are having with the application. As the service monitor operates on such different types of devices and different types mobile OSs, the developer can have a complete view of the developer's application(s) and identify areas that need improvement.

In addition to capturing service call data, the service monitor of some embodiments captures other types of data. In some embodiments, the service monitor collects mobile device state data and associates it with the service call data. For example, to provide additional context regarding the service calls, the service monitor (170, 175, 180, 185, or 190) of some embodiments gathers mobile state data. The mobile state data can include any one or more of the following: carrier info (e.g., the name or identity of the wireless carrier that is servicing the mobile device), geo location information (e.g., latitude, longitude), network connectivity information (e.g., whether the device was on Wi-Fi, cellular, or not connected), mobile network code (MNC), mobile country code (MCC), roaming, time, battery level, memory usage, up time, whether the device is jailbroken or rooted, mobile OS version, and mAPM service monitor version. The service monitor of some embodiments then sends a report with the service call data and the mobile state data to the API server.

In addition to mobile state data or instead of it, the service monitor (170, 175, 180, 185, or 190) may collect other data that provide additional context regarding each service call. For instance, when the service monitor is ready to send a report regarding a service call, the service monitor might add to the report an application ID, the version number of the application, a device ID, the model of the mobile device, the version number of the mobile operating system (OS), etc. In this manner, when the developer views the gathered data, the developer can pinpoint specific areas of interest (e.g., a particular application version, a particular make or model of the mobile device, etc.) that need improvement.

In some embodiments, each service monitor (170, 175, 180, 185, or 190) monitors one application that executes on a mobile device. The service monitor may be a part of the application that it monitors. For instance, when the application is installed on a device, it will include the service monitor as one of its components. This is shown in FIG. 1 because each service monitor (170, 175, 180, 185, or 190) is contained in a particular application (145, 150, 155, 160, or 165). Also, when there are two different applications 150 and 155 on a same mobile device 130, each application includes its own service monitor (175 or 180). Alternatively, the service monitor may monitor a group of applications and send a service report that is specific for a particular application executing on a mobile device each time the application makes a service call.

In some embodiments, the mAPM solution provider provides a set of tools that when enabled monitors and captures different aspects of mobile application performance. For instance, an application developer can download a package, a kit (e.g., Software Development Kit (SDK)), a library, or a software framework that includes the set of tools to monitor errors within the application as well as services that interact with the application. To enable the monitoring, the application developer can link the developer code with the service monitoring code. In one embodiment, the linking is static, in another embodiment, the linking is dynamic, or in other embodiments, there could be both. The application developer can then release or publish (e.g., to an online App store) a version of the application with the monitoring features. The application developer can then monitor and track how the application performs on various different mobile devices of different end-users.

In some embodiments, the API server 105 (or a group of API servers) is responsible for back-end processing. This may entail receiving the captured data from the mobile devices 125-140, storing it in storage, and presenting it to developers. In some embodiments, the API server 105 provides a real-time global view of application diagnostics and crashes across different mobile device platforms (e.g., iOS, Android, Windows Phone®, etc.). The API server of some embodiments formats or translates the captured data in some manner to present it to developers. For example, the captured data may be presented in statistical and/or in graphical format. Such a format allows developers to easily track (e.g., in real-time) performance of one or more of their applications across different types of mobile devices, operating systems (OSs), Application versions, etc. This is important because the developers do not have to wait for user feedback. Instead, they can access one or more of the different application performance reports, determine if there are any problems, and address those problems if there are any.

In some embodiments, the API server 105 generates different views with trends associated with the monitored applications. Trending represents tracking captured data over some period of time to detect and diagnose changes in the application's performance. The trends can be over different types of data. For instance, the API server of some embodiments allows developers to track real-time and historical performance across device, OS, versions, etc. The API server may allow developers to view trends by device, OS, and carrier. For developers, such trends can be important from a business perspective as well as a technical perspective. From a business perspective, the trends allow the developers to know which device (e.g., make and/or model), OS (e.g., version), and/or carrier is the most popular. From a technical perspective, the trends allow the developers to know which device, OS, and/or carrier is the most problematic across the developer's user base.

In the example of FIG. 1, the client 120 is a web server client. The web server client 120 can be a standard web browser that accesses the web server 110. The web server 110 delivers web pages to the clients. As shown, the web server 110 might send, to the client, one or more pages with application performance data, device trends, OS trends, carrier trends, and crash reports. In some embodiment, the API server 105 can be accessed via a stand-alone application, or any other distributed software application or service. For instance, instead of a thin client, the mAPM solution provider may provide a thick client application to access the API server (e.g., directly rather than through the web server 110).

The storage 115 stores the captured data from the various different mobile devices 125-140. In some embodiments, the captured data includes the service monitoring data as well as error monitoring data. In some embodiments, the storage may store user accounting data. The user account data may be used to allow the developers to log on and access the monitoring services, to charge the developers for the use of the monitoring services, etc. To simplify the description, only one storage is shown in FIG. 1. However, the captured data and the user accounting data may be stored in a number of storages (e.g., databases). In addition, the data may be stored at different locations (e.g., at different data centers). The data may also be accessed using standard Structured Query Language (SQL), using a NoSQL mechanism, or using some other data access protocol.

Figure 2A:
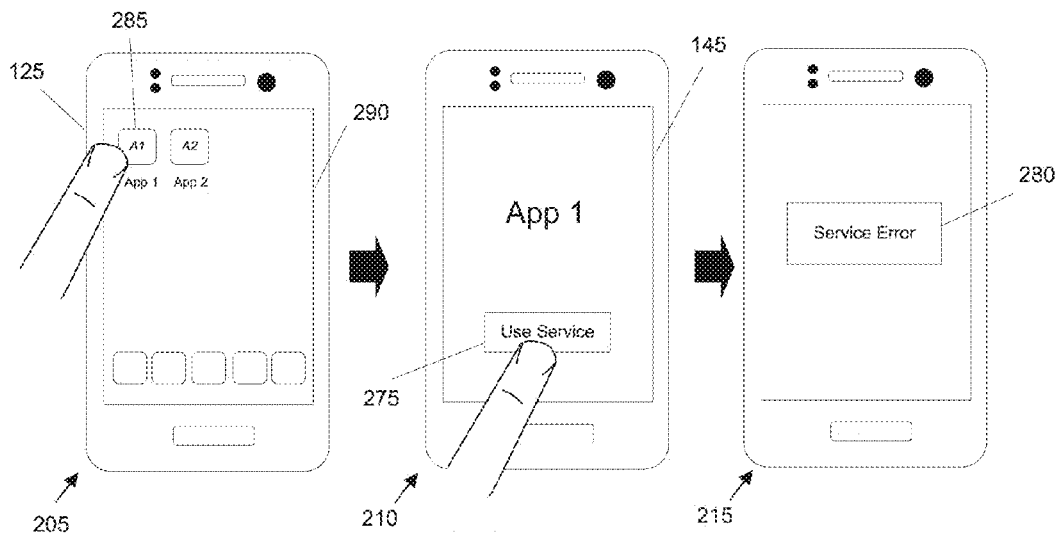
FIG. 2A provides an illustrative example of a user interaction with an application that causes the application to make a service call.
Figure 2B:
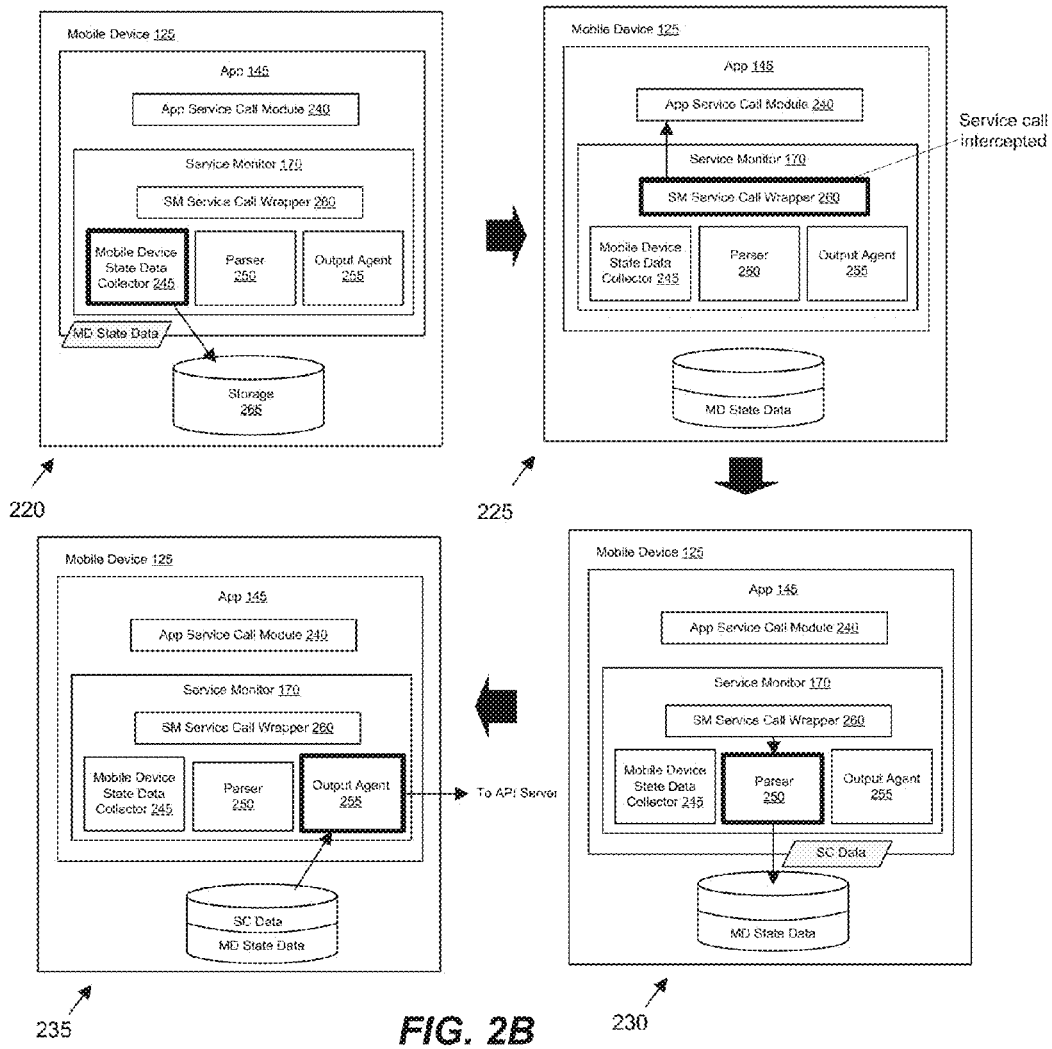
FIG. 2B provides an illustrative example of a service monitor that captures data regarding the service call made by the application.

FIG. 2 illustrates an example of capturing data regarding a service that an application is using. Specially, FIG. 2A conceptually shows an example user interaction with a mobile device 125 that causes the application to make a service call. This is followed by FIG. 2B, which illustrates the same mobile device 125 from the perspective of the service monitor 170.

FIG. 2A shows a person interacting with an application executing on a mobile device 125. In this example, as well as many other examples below, the mobile device is a smart phone. However, one of ordinary skill in the art will understand that the discussion in this example as well as other examples discussed hereinafter is equally applicable to other kinds of mobile devices (e.g., a tablet, a smart watch, etc.) or any other electronic devices (e.g., a digital media player appliance, a game system, etc.).

Three operational stages 205-215 of the mobile device 125 are shown in FIG. 2A. The first stage 205 shows the mobile device 125 showing its home screen page 290 on the device's touch-screen display. The home screen page 290 includes a number of icons, several of which are arranged along the bottom of the screen (e.g., in a dock). Each icon can be selected to open a corresponding application. Here, the user taps the user's finger over an icon 285 associated with the application. The gesture causes the application 145 to be opened, as illustrated in the second stage 270.

The second stage 210 conceptually shows the application being directed to make a service call. As shown, the user interacts with the application 145 by tapping the user's finger over a selectable item. The selectable item has a label that reads "Use Service". However, an application can make a service call in various different ways. For instance, the application may make network calls when the application is trying to load data, when triggered, when directed by a user, etc. The end-user may or may not be aware of the service calls that are taking place in the application.

Third stage 215 illustrates the mobile device 170 after making the service call. In particular, this stage shows that the service call resulted in an error. For instance, there may have been network connectivity issues, which caused the application to fail in sending the service request. As another example, the application may have sent the response but got no response. These are just two of many possible reasons why a failure can occur with a service call.

Irrespective of whether a service call fails or not, the service monitor of some embodiments operates in conjunction with the application to gather data regarding the call. FIG. 2B illustrates the service monitor capturing data regarding the service call made by the application. Four operational stages 220-235 of the mobile device 125 are shown in the figure. These four stages 220-235 represent several operations that are occurring as the user interacts with the application 145 in stages 205-215 of FIG. 2A.

As shown in FIG. 2B, the application 145 executes on the mobile device 125. In this example, the service monitor 170 is part of the application, and includes a service call wrapper 260, a mobile device state data collector 245, a parser 250, an output agent 255, and a storage 265.

The service call wrapper 260 is a service monitor component that is responsible for monitoring and capturing data regarding a service call. In some embodiments, the service call wrapper intercepts service calls (e.g., by wrapping one or more methods, functions, or objects). Without the service monitor feature enabled, the service call would have been received by the application service call module 240. However, as the feature is enabled, the service call that would normally be directed towards the application service call module 240 is now directed towards the service call wrapper 260. Upon interception, the service wrapper of some embodiments captures services call data and/or facilitates in capturing data, and redirects the service call to the application service call module 240.

In some embodiments, the parser 250 receives the service call data from the service call wrapper 260 and then parses the call to extrapolate or extract various pieces of data. The data may be extracted from the headers, the body, and/or the trailer. Depending on the type of service call, the parser may be configured to identify different types of data. As an example, for a network call, the parser may be configured to extract, from the service call, an address (e.g., uniform resource locator (URL) associated with the call), the number of bytes sent (e.g., the content-length associated with the call), etc. Not all data may be extracted from a call. That is, the service monitor 170 may identify, derive, or be informed of other data relating to call. As an example, the service monitor 170 may record the time of the request.

If there is a response to the service request, the service monitor of some embodiments capture data relating to the response. In some embodiments, the service monitor captures the number of byte received (e.g., the content-length associated with the response), etc. Not all data may be extracted from a response. That is, the service monitor 170 may identify, derive, informed of and/or calculate other data relating to call. As an example, the service monitor 170 may record the time of the response, and calculate the latency using the time of the response and the previously recorded time of request.

Different from the service call wrapper 260, the mobile device state data collector 245 is responsible for aggregating state data relating to the mobile device. In some embodiments, the mobile state data includes carrier info (e.g., the name or identity of the wireless carrier that is servicing the mobile device), geo location information (e.g., latitude, longitude), and network connectivity information (e.g., whether the device was on Wi-Fi, cellular, or not connected).

The output agent 255 is responsible for sending captured data (e.g., service monitoring message) to the API server. The output agent 255 may send the data immediately or may send the data when triggered. For instance, the data may be sent on a periodic basis. The frequency of this period may be set by the API server. Alternatively, the data may be sent immediately when it is ready to be retrieved from the storage 265. In some embodiments, the output agent only sends the data when all the necessary data has been aggregated (e.g., in the storage 265). The output agent of some embodiments sends the data in a particular order (e.g., in the order the service call has been invoked).

The storage 265 stores captured service call data. In some embodiments, the storage stores other data, such as mobile state data. In some embodiments, the storage is a data queue. In some embodiments, the storage is a first-in-first-out (FIFO) queue that preserves the order of the different service calls. In other words, each call data will be processed or output in the order that it was put into the queue. In some embodiments, the storage 265 is a serial queue in that it does not process multiple data requests in parallel. Instead, it process one data request at a time (e.g., in the order that the request was received). In some embodiments, the serial queue is used to ensure that each dataset relating to a service call is associated with the appropriate mobile device state. For instance, a mobile device's state can change often. The serial queue ensures that, with all these state changes, the captured service call data is synchronized with the correct mobile state data. The storage 265 may filter data, may compress data, or may redact data.

While many of the features of the service monitor have been described as being performed by one component or module (e.g., the output agent, the mobile device state data collector, etc.), one of ordinary skill in the art will recognize that the functions of such components and other components described herein might be split up into multiple sub-components. Similarly, functions described as being performed by multiple different components might be performed by a single component, in some embodiments.

Having described several example components, the operations of the service monitor 170 will now be described in terms of the four stages 220-230 that are illustrated in FIG. 2B. The first stage 220 illustrates the service monitor 170 storing the mobile device state in the storage 265. Specially, the mobile device state data collector gathers the latest mobile state data, and stores it in the storage. The mobile device state data collector may initially gather this data when the application is opened and continue updating the data. For instance, if network connectivity changes, the mobile device state data collector may be informed of the change and update the state data in the storage. In this manner, when a service call is intercepted, it is associated with the latest state that is stored in the storage.

The second stage 225 illustrates the service monitor 170 intercepting a service call. This corresponds to a point in time after the user has initiated the service call by tapping the user's finger over the selectable item 275 in the second stage 210 of FIG. 2A. As mentioned above, without the service monitor feature enabled, the service call would have been received by the application service call module 240. However, as the feature is enabled, the service call that would normally be directed towards the application service call module 240 is now directed towards the service call wrapper 260.

The third stage 230 shows the service monitor storing data relating to the service call in the storage. Particularly, the service call wrapper has intercepted the call and passed it to the parser. Having received the call, the parser parses the call to extrapolate one or more pieces of data. Here, the service monitor 170 may identify, derive, and/or calculate other data relating to call. Thereafter, all the captured data is stored in the storage 265 along with the mobile state data.

The fourth stage 235 shows the service monitor sending the captured data to the API server (e.g., the application performance monitoring server). In sending, the output agent 255 may retrieve the captured data from the storage, which includes the call data and the mobile state data, and interface with one or more other components to encrypt the data and send it to the API server. For instance, the service call message may encrypt via secure socket layer (SSL) or some other encryption method (e.g., IPsec), and send the data to the API server. The data may also be removed from the storage (e.g., popped from the queue).

Figure 3:
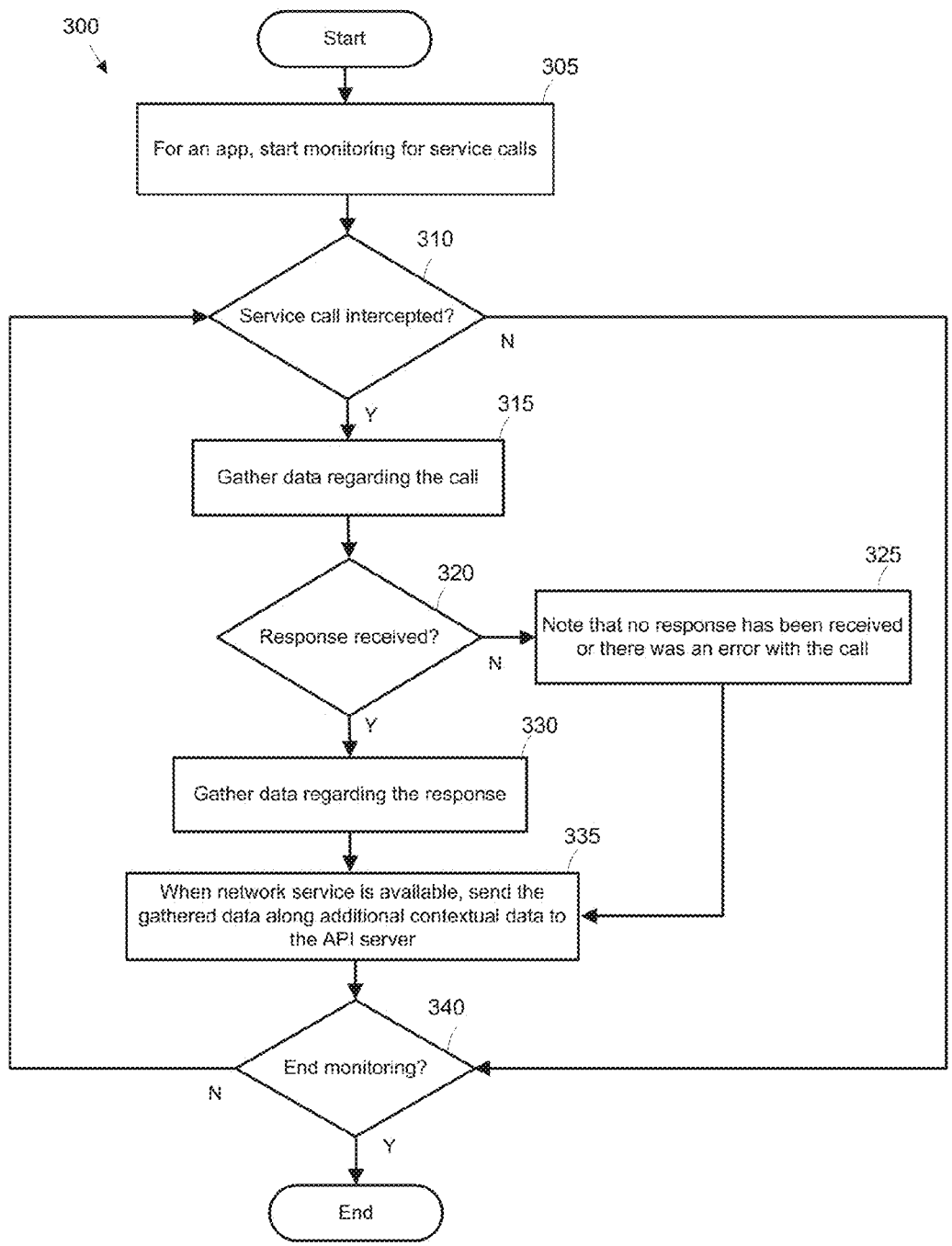
FIG. 3 conceptually illustrates a process that some embodiments implement to monitor application for a service call and gather data regarding the service call.

Having described an overview of service monitoring, an example process will now be described. FIG. 3 conceptually illustrates a process 300 that some embodiments implement to monitor services that an application is using. Particularly, the process 300 shows capturing data regarding a service call and sending the captured data, e.g., along with other data, to a server. In some embodiments, the process 300 is performed by a service monitor.

As shown in FIG. 3, the process 300 begins when it starts (at 305) monitoring an application for any service calls that it makes. In some embodiments, the monitoring begins when the application has been opened (e.g., on a mobile device). The process 300 determines (at 310) whether a service call has been intercepted.

When a service call has been intercepted, the process 300 gathers (at 315) data regarding the service call. In gathering, the process 300 of the some embodiments identifies various pieces of information regarding the service call. At 320, the process 300 determines whether a response to the call has been received. If a response has been received, the process 300 gathers (at 325) data regarding the response. If no response has been received, the process 300 of some embodiments notes (at 330) that there was no response to the call or notes that there was an error with the call (e.g., via an error code).

When network service is available, the process 300 sends (at 335) the gathered data along with mobile state data and/or other data to an API server (e.g., when network service is available). The process 300 determines (at 340) whether to continue monitoring. Here, the application might be closed by user, or the device is locked, turned off, or placed in stand-by mode. If the determination is made to continue monitoring, the process returns to 310, which is described above. Otherwise, the process 300 ends.

Some embodiments perform variations on the process 300. The specific operations of the process 300 may not be performed in the exact order shown and described. The specific operations may not be performed in one continuous series of operations, and different specific operations may be performed in different embodiments. Further, the process 300 could be implemented using several sub-processes, or as part of a larger macro process.

Many more examples of the service monitor are described below. Specifically, Section I describes examples of how the service monitor can be implemented on a particular mobile device platform. This is followed by Section II that describes examples of how the service monitor can be implemented on a different mobile device platform. Next, Section III then describes an example performance-monitoring tool with the service monitor as well one or more different error monitors. Finally, Section V describes electronic systems for implementing some embodiments of the invention.

I. Example Service Monitor Implementation

As mentioned above, the service monitor of some embodiments operates different types of mobile devices to monitor one or more services that applications are using. An example implementation of the service monitor will now be described by reference to FIGS. 1-24. In these figures, the service monitor is implemented on a particular mobile device operating system (OS), namely iOS that is developed and distributed by Apple Inc. However, one of ordinary skill in the art would understand that the service monitor could be implemented on various other mobile device platforms following one or more of the techniques described below.

A. Example Architecture

Figure 4:
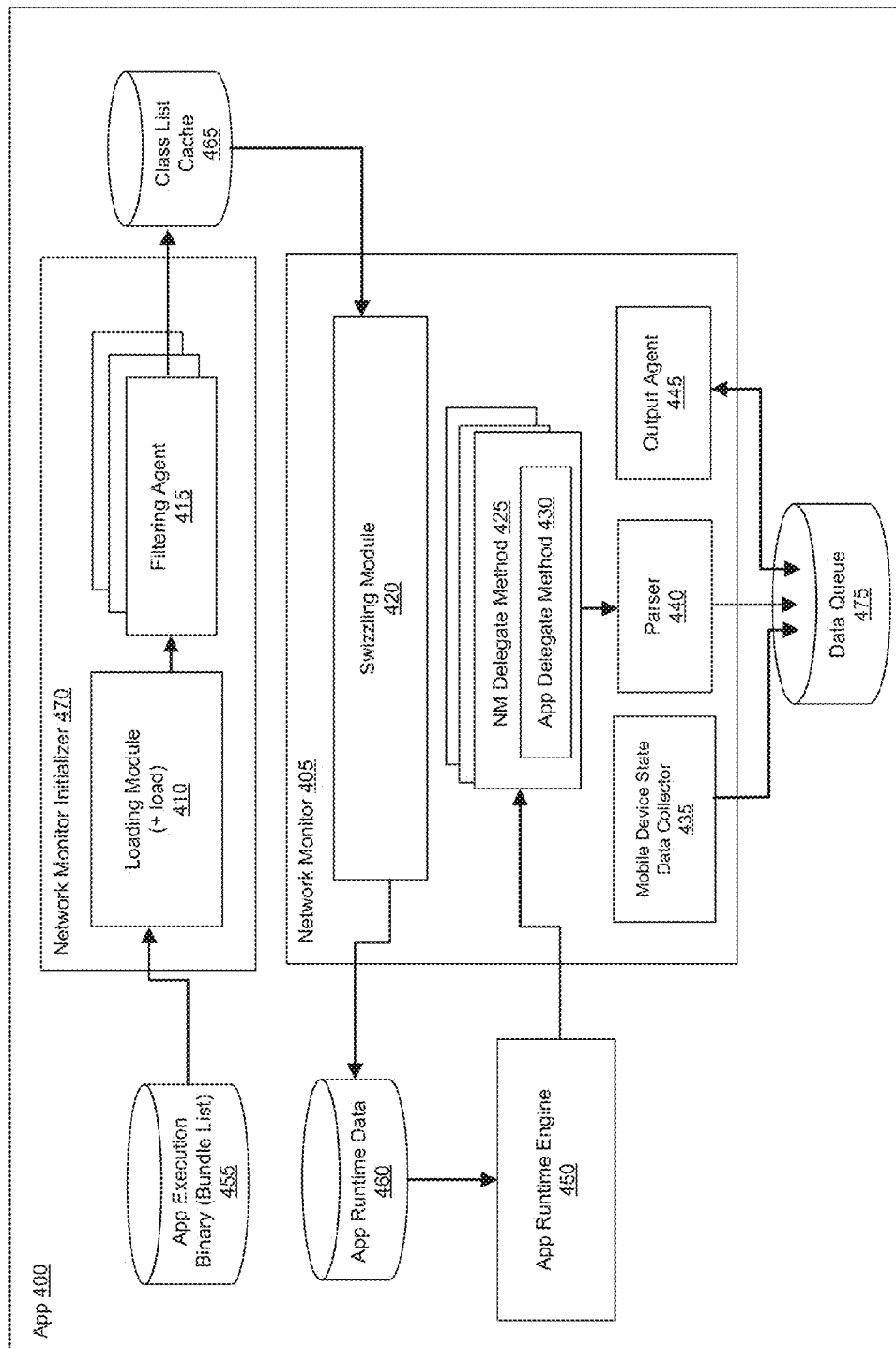
FIG. 4 provides example software architecture of an application with the service monitor enabled to track and monitor application's services.

FIG. 4 provides example software architecture of an application with the service monitor enabled to track and monitor an application's services. Here, the service monitor is a network monitor 405 that tracks network services used by the application. In monitoring and tracking, some embodiments (1) determines which one or more entities (e.g., classes, objects) in the system are responsible for making network requests, (2) injects the service monitor code (e.g., wrap those entities to trap the network requests), (3) monitors the application for such network requests, (4) captures data if there are any network service requests, and (5) sends the captured data to the server (e.g., the API server). To perform these tasks, the figure shows a network monitor initializer 470, a swizzling module 420, a set of network monitor delegate methods 425, an output agent 445.

The network monitor initializer 470 of some embodiments is a component that determines which one or more entities (e.g., classes, objects) in the application are responsible for making network requests. To make such a determination, the network monitor initializer 470 may read one or more lists (e.g., application execution binary or bundle list) and identify each class that it is interested in to produce a filtered list.

In some embodiments, the network monitor initializer 470 performs several different levels of filtering. In particular, the network initializer may perform a first level filtering to identify one or more classes. The network initializer of some embodiments identifies all classes from the initial set of lists (e.g., the bundle list). In some embodiments, the initial filtering is done to identify all classes and/or objects that are provided by application developer, rather than the mobile OS provider. This is because the application bundle list lists items that are specific to the application. Also, it is important to only identify the classes provided by the application developer because it may be against the policy of the mobile OS provider to modify their code (e.g., APIs, libraries, frameworks, etc.).

In some embodiments, the network initializer 470 performs a second level filtering to identify one or more different types of classes. The network initializer 470 of some embodiments identifies delegate classes. The network initializer 470 of some embodiments identifies classes that implement an interface (e.g., a Java interface). The network initializer 470 of some embodiments identifies each class that inherits off another class and implements one or more of the parent's methods or functions.

In some embodiments, the network initializer 470 performs a second level filtering to identify one or more specific classes (e.g., delegate classes) relating to network services. The different levels of filtering can occur at different operational stages of the application. As an example, the first-level filtering can occur when the application is initializing when opened, and the second-level filtering can occur when the application has been initialized. To perform such filtering, the network monitor initializer 470 includes a loading module 410 and a set of filtering agents 415.

The loading module 410 of some embodiments performs a first level filtering to identify all classes. One or more of the filtering agents 415 may identify certain type of classes. In some embodiments, the loading module is a modified version of the +load method, but practitioners of the art will understand that other alternatives in other embodiments could be used for the same loading purpose. The output of the +load method is the application runtime data, which is read by the application runtime engine 450 during the execution of the application. This+load method, along with+ initialize, is tied to the early stages in the loading sequence of an objective-C program.

In some embodiments, the output of the loading module 410 is a list of one or more classes (not shown). This list is then read by the set of filtering agents 415 to perform the one or more additional levels of filtering. In some embodiments, the set of filter agents 415 identifies certain types of classes. For instance, the set of filtering agents may identify delegate classes or objects. A delegate object is an object that acts on behalf of, or in coordination with, another object when an event is encounter in a program. The set of filtering agents 415 identifies such delegate classes because they may implement one or more methods associated with network requests. For instance, in Objective-C, many objects, which are responsible for making network requests, are delegate objects of the NSURLConnection class. The NSURLConnection is a class provided by Apple Inc. to implement an interface for creating and canceling a network connection.

In some embodiments, the identifying of a certain type of class or object includes analyzing data associated with the class. For instance, the set of filtering agents of some embodiments identifies delegate classes by determining whether a class implements a particular protocol or has a particular protocol declaration. For instance, in Objective-C, many objects, which are responsible for making network requests, are delegate objects of the NSURLConnection class. The NSURLConnection is a class provided by Apple Inc. to implement an interface for opening and closing a network connection. The "protocol" associated with the NSURLConnection class is "NSURLConnectionDelegate" This protocol defines the optional methods implemented by delegates of NSURLConnection objects.

Alternatively or conjunctively with identifying certain types of classes and/or objects, the set of filtering agents 415 may perform other filtering on the output list from the loading module 410. In some embodiments, the set of filtering agents narrows the list to one or more specific classes. This can entail removing certain classes from the list that should not be modified and/or removing classes that are associated with the service monitor. As an example, it may be predetermined that a particular class (e.g., UIWebView) runs off the main thread and should not be modified. The set of filtering agents may also identify one or more other classes that inherit from that particular class. This is to ensure that the service monitoring code does not adversely affect the application code. As another example, the set of filtering agents might identify that a delegate class should not be in the list because the class is provided by the mAPM solution provider to track and monitor network services, applications crashes, handled exceptions, etc. In other words, the set of filtering agents removes such classes so that it does not monitor itself (e.g., in making network requests to the API server).

As shown in FIG. 4, the output of the set of filtering agents 415 is a class list cache 465. The swizzling module 420 is a component of the network monitor that is responsible for injecting the service monitor code (e.g., wrap those entities to trap the network requests). In some embodiments, the swizzling module accomplishes this by reading the class list cache and performing swizzling or monkey patching.

In some embodiments, the swizzing module 420 performs method swizzling. The method swizzling entails swapping out an original method (e.g., application method) with a new method (e.g., the network service monitor method), and then calling the original method (e.g., application method). For certain programming languages, method swizzling entails notifying the runtime engine or program execution engine (e.g., virtual machine) to call the new method, instead of the original method. The method swizzling may also entail modifying the runtime code, file, or library so that the runtime engine calls the new method.

In some embodiments, the swizzling module 420 performs monkey patching. The monkey patching extends or modifies the run-time code of certain programming languages without altering the original source code of the application. In some embodiments, the monkey patching refers to dynamic modifications of a class or module at runtime. There are other ways of modifying classes at runtime have different names, based on their different intents. As an example, security patching, in some systems, are often delivered using dynamic class modification, but they are called hot fixes.

In the example of FIG. 4, the swizzling entails notifying the application runtime engine to call the network monitor method instead of some other original method that would normally be called. The swizzling is done here to extend or modify the run-time code of dynamic languages without altering the original source code. In essence, the swizzling results in the service monitor method wrapping the original method. Once wrapped, the network service monitor method 425 extends or modifies the run-time behavior of the application by capturing data relating to each network service request made by the application. In some embodiments, the swizzling module 420 reads the class list cache 465 to identify one or more delegate classes, and modifies the runtime data. Specifically, the swizzling module modifies the runtime data so that the runtime engine calls one or more service monitor methods, instead of one or more corresponding methods of the delegate classes.

The network monitor includes a set of one or more network monitor methods. Each method is similar to the service call wrapper that is described above by reference to FIG. 2B. The network monitor method intercepts a network call. Without the swizzling, the runtime engine would normally call the application method. However, after the swizzling, the network call that would normally be directed towards the application method is now directed towards the network monitor method. Upon interception, the network monitor method of some embodiments captures network call data and redirects the network request to the application delegate method.

The mobile device state data collector 435 is responsible for aggregating state data relating to the mobile device. For instance, each service monitoring message may include a chunk of metadata about the mobile device as well as data (e.g., performance data) relating to the call. In some embodiments, the mobile state data can include any one or more of the following: carrier info (e.g., the name or identity of the wireless carrier that is servicing the mobile device), geo location information (e.g., latitude, longitude), network connectivity information (e.g., whether the device was on Wi-Fi, cellular, or not connected), mobile network code (MNC), mobile country code (MCC), roaming, time, battery level, memory usage, up time, whether the device is jailbroken or rooted, mobile OS version, and mAPM service monitor version.

The output agent 455 is responsible for sending captured data (e.g., network monitoring message) to the API server. The output agent may send the data immediately or may send the data when triggered. For instance, the data may be sent on a periodic basis. The frequency of this period is set by the API server, in some embodiments. Alternatively, the data may be sent immediately when it is ready to be popped from the data queue. In some embodiments, the output agent only sends the data when all the necessary data has been aggregated (e.g., in the data queue). The output agent of some embodiments sends the data in a particular order (e.g., in the order the service call has been invoked).

Prior to sending the captured data, the output agent 455 may also aggregate other data and merge it with the captured data. These other data provide additional context relating to the network request. For instance, the output agent might aggregate data relating to the make and/or model of the mobile device, the version of the OS that is running on the mobile device, the device ID, the application version, etc. Several examples of such additional context data will be described in detail below by reference to FIG. 22-23.

The storage 475 stores captured service call data. In some embodiments, the storage stores other data, such as mobile state data. In some embodiments, the storage is a queue. In some embodiments, the storage is a data queue. In some embodiments, the storage is a priority queue. In some embodiments, the storage is a first-in-first-out (FIFO) queue that preserves the order of the different service calls. In other words, each call data will be processed or output in the order that it was put into the queue. In some embodiments, the storage 475 is a serial queue in that it does not process multiple data request in parallel. Instead, it process one data request at a time (e.g., in the order that the request was received). In some embodiments, the serial queue is used to ensure that each dataset relating to a service call is associated with the appropriate mobile device state. For instance, a mobile device's state can change often. The serial queue ensures that, with all the state changes, the captured service call data is synchronized with the correct mobile state data.

Having described several components of the example architecture, the operations of these components will now be described in the following sub-sections by reference to FIGS. 5-24. In particular, Section I.B describes operations of the network monitor initializer 470. This is followed by Section I.C that describes operations of the swizzling module 420. Example operations of the network monitor method 425 are described in Section I.D. The operations of the mobile device state data collector are described in Section I.E. Lastly, Section I.F described operations of the output agent 445 in gathering other data for the network call report and sending the report to the API server.

B. Network Monitor Initialization

As method above, the network monitor initializer 470 of some embodiments is a component that determines which one or more entities (e.g., classes, objects) in the application are responsible for making network service requests. To make such a determination, the network monitor initializer 470 may read one or more lists (e.g., application execution binary, bundle list, or some other list) and identify each class that it is interested in to produce a filtered list.

Figure 5:
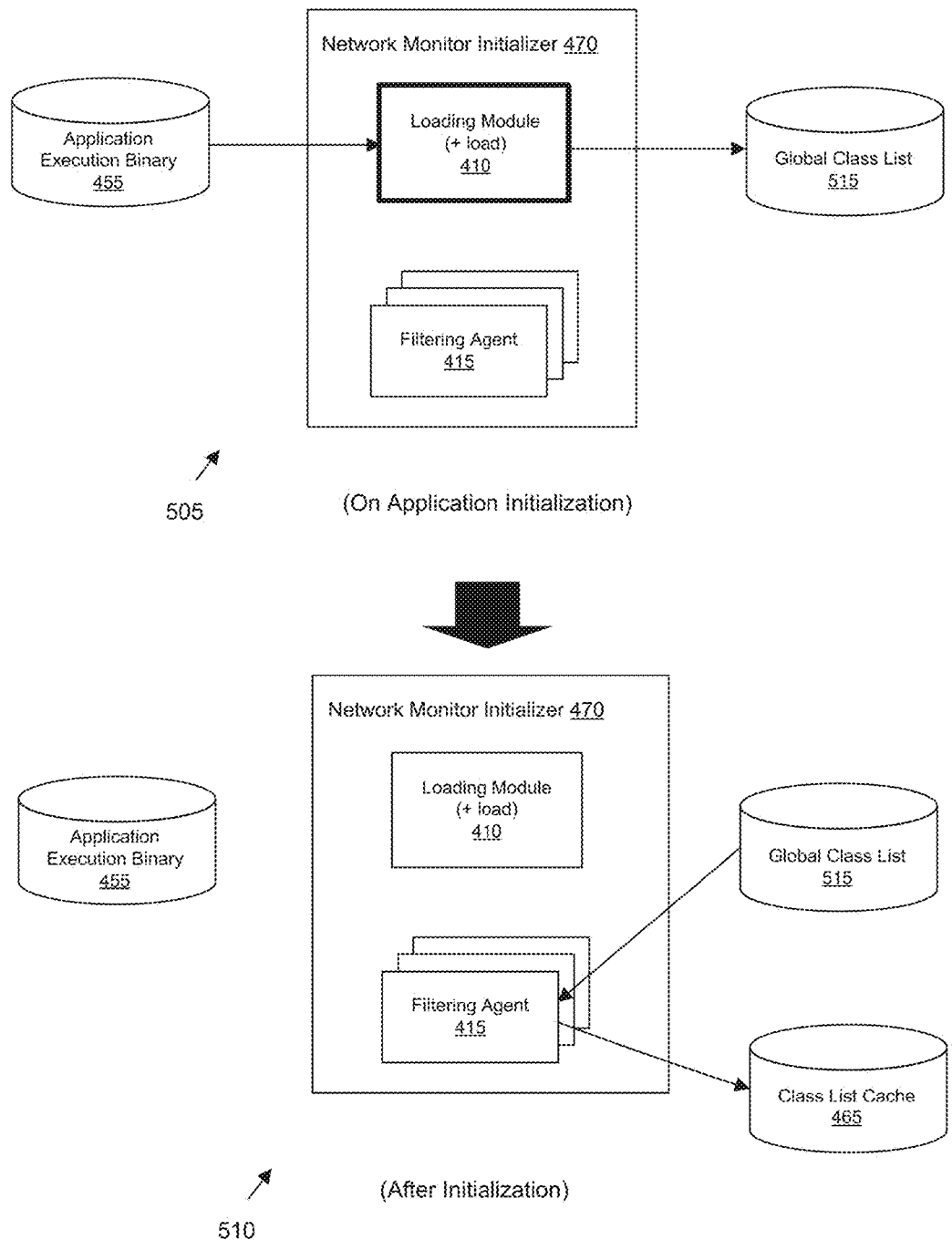
FIG. 5 provides an illustrative example of performing a multi-level filtering to identify a list of classes.

As mentioned above, the network monitor initializer 470 of some embodiments performs several different levels of filtering. FIG. 5 provides an illustrative example of such multi-level filtering. The figure shows two operational stages 505 and 510 of the network monitor initializer 470. The network monitor initializer includes the loading module 410 and the set of filtering agents 415, which are described above by reference to FIG. 4.

The different levels of filtering can occur at different operational stages of the application. The first stage 505 illustrates the network monitor initialization performing the first level filtering on application initialization. Specifically, the loading module iterates through the application execution binary or the bundle list and outputs the global class list 515.

The second stage 510 illustrates the network monitor initializer 470 performing one or more other levels filtering after the initialization of the application. As shown, the set of filtering agents 415 iterates through the global class list to output the class list cache. In some embodiments, the second level filtering occurs after the loading module (e.g., the +load method) has completed its operations in loading the runtime data. For instance, the second level filtering may begin after the +load method and, one or more other methods (e.g., +initialize) has completed their respective tasks.

The loading module 410 of some embodiments takes advantage of the fact the application execution binary is read when the application is being initialized, and attempts to perform at least one level-identification at this initialization stage. On the other hand, the set of filtering agents may only be available after they have been initialized and ready to be executed by the runtime engine (not shown). The initialization stage is also a fragile environment in that the application is initializing or, in other words, trying to load the different items (e.g., classes, objects, etc.,) to be executed by the runtime engine. Therefore, performing additional one or more levels of filtering may not even be possible at this initialization stage.

Figure 6:
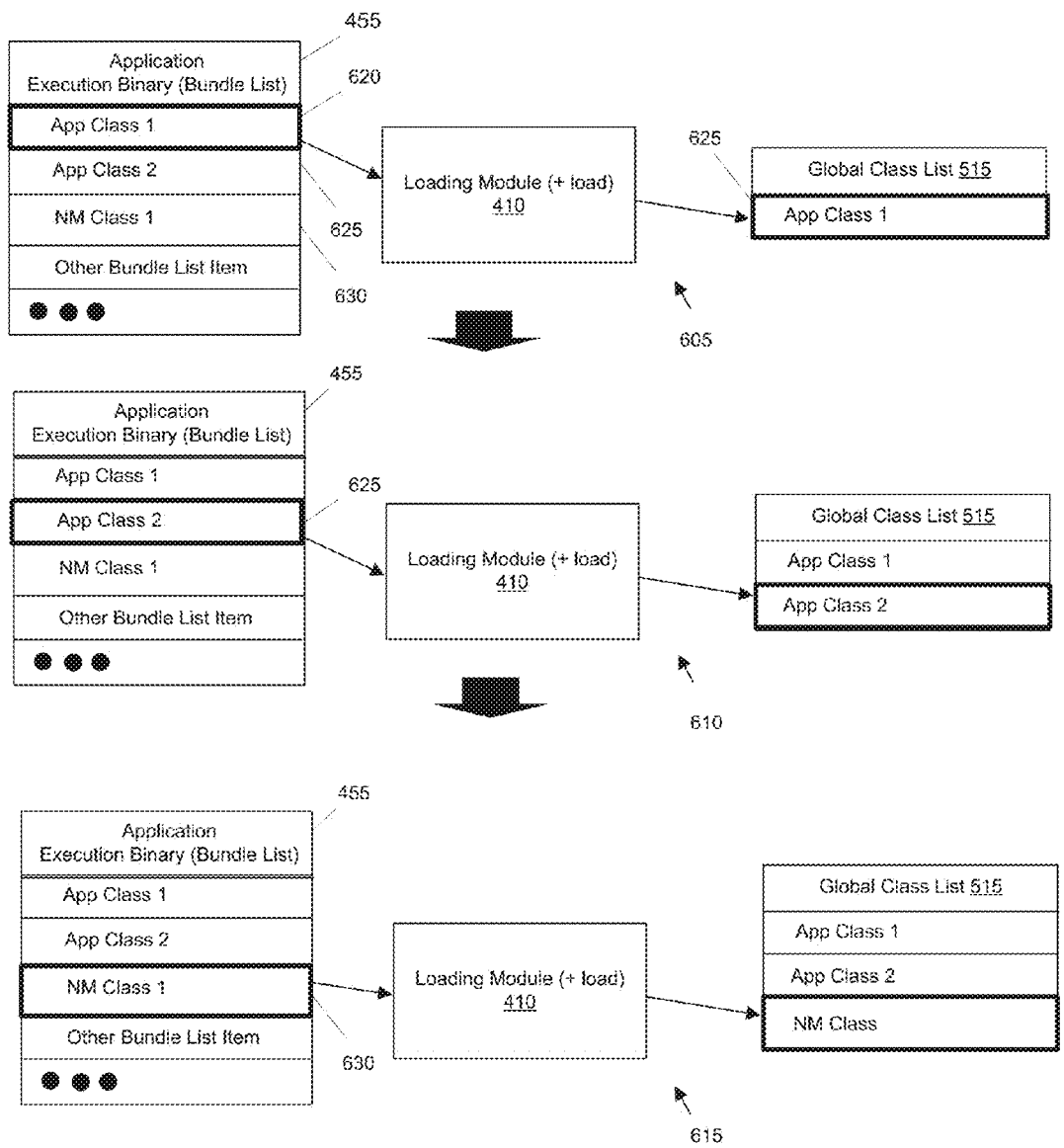
FIG. 6 illustrates an example of a network monitor loading module reading the application execution binary to produce a global class list.

FIG. 6 illustrates an example of the loading module 410 reading the application execution binary 455 to produce a global class list. Specifically, the figure illustrates how the loading module 410 identifies one or more classes.

As shown in FIG. 6, the application execution binary 455 lists different items that the application requires for successful operation. The application execution binary may list executables, resource, other supported files, etc. The bundle list may also list one or more delegate classes. Although the binary is conceptually shown as one data structure, it can encompass multiple data structures or files, in some embodiments. In the example of FIG. 6, the application execution binary lists N number of items, including three classes 620-630.

The first stage 605 illustrates the loading module 410 iterating through the application execution binary 455. Specifically, the loading module has identified that a list item 620 is a class and adds it to the global class list 515.

The second stage 610 illustrates the loading module 410 identifying class 625 or object from the application execution binary 455. Here, the loading module 410 adds the class 625 to the global class list 515. The third stage 615 illustrates the loading module 410 identifying another class 630 or object from the application execution binary 455. The next item is another class 630. So, the loading module 410 adds the class 630 to the global class list 515. Here, the loading module 515 may continue processing the application execution bundle list 455 to identify other classes and/or objects.

Figure 7:
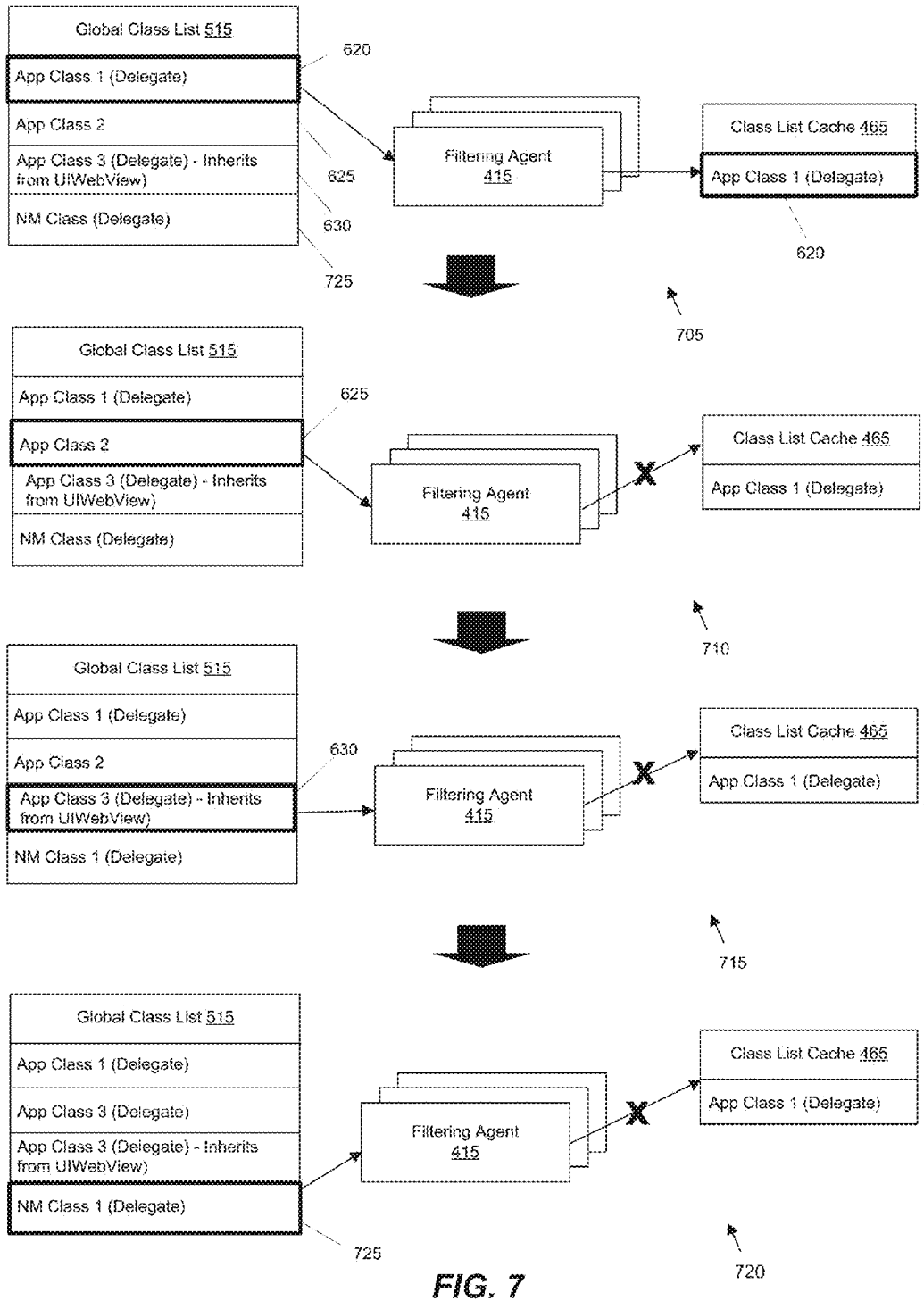
FIG. 7 illustrates an example of a set of filtering agents reading the global to produce a class list cache.

FIG. 7 illustrates an example of the set of filtering agents reading the global class list 515 to produce the class list cache 465. Four operational stages 705, 710, 715, and 720 of the set of filtering agents are shown in this figure. In some embodiments, these stages 705, 710, 715, and 720 occur after the initialization of the application. As shown, the global class list now lists several classes 620, 625, 630, and 725. The first class 620 is a delegate class that the implements a set of one or more methods associated with a network service, or a class that implements the protocol specified for a network connection (e.g., the NSURLConnectionDelegate class).

The first stage 705 illustrates the set of filtering agents identifying the delegate classes that implement one or more methods relating to a network service. Particularly, in the first stage 705, the filtering agent has identified that the delegate class 620 is associated with a network service and added the delegate class to the class list cache 465. In some embodiments, the filtering agent makes this identification based on whether the class implements a particular protocol specified for a particular network connection (e.g., the NSURLConnection protocol). Alternatively, the set of filtering agents can make the identification based on whether the class implements one or more methods relating to the network service.

The second stage 710 illustrates the set of filtering agents 415 iterating through the list 515. Here, the set of filtering agents 415 selects the next class 630 from the list 515. The next class is not a delegate class. According, the loading module does not add the class 625 to the class list cache 465.

The third stage 715 illustrates the set of filtering agents 415 identifying a delegate class 630 that should not be modified. As such, the set of filtering agents do not add the delegate class to the class list cache 465. As mentioned above, it may be predetermined that a particular class runs off the main thread and should not be modified. In the example of the third stage, the class is a delegate but it implements or inherits UIWebView. The UIWebView is a class to embed web content in the developer's application. However, it may be predetermined that modifying such a class or a sub-class thereof may result in instability of the application as it runs off the main thread.

The fourth stage 720 illustrates the set of filtering agents 415 identifying another delegate class 725 that should not be modified. Here, the set of filtering agents has identified that the delegate class is associated with the network monitor. For example, even though the delegate method might implement for a particular connection (e.g., the NSURLConnection), the class may belong to the network monitor or some other class relating to the network monitor. In other works, the set of filtering agents might identify that a delegate class should not be in the list because the class is provided by the mAPM solution provider to track and monitor network services, applications crashes, handled exceptions, etc. The set of filtering agents do not add such delegate class so that it does not monitor itself (e.g., in making network requests to the API server).

In the example described above, the set of filtering agents 415 identified one or more delegate classes. The set of filtering agents 415 identifies such delegate classes because the example relates to Objective-C. However, the set of filtering agents 415 might identify the same or different type of class for other programming languages. For instance, the loading module may identify one or more sub-classes or interfaces if the application was written primarily in a different high-level object-oriented programming language, such as Java, C#, etc.

Also, in the example described above, the network monitor initializer performs multi-level filtering to identify a list of classes (e.g., delegate classes, sub-classes, interfaces, or any other classes that implements service-oriented methods or functions). In some embodiments, the network initializer may only perform one level of filtering (e.g., on or after application initialization). In some embodiments, the network monitor may save the list and reuse it each time the application is opened. Alternatively, the network monitor may save a list based on the first-level filtering and reuse that list to perform the second-level filtering, or save a list based on the second-level filtering and reuse that list to perform a third-level of filtering, and so on.

Figure 8:
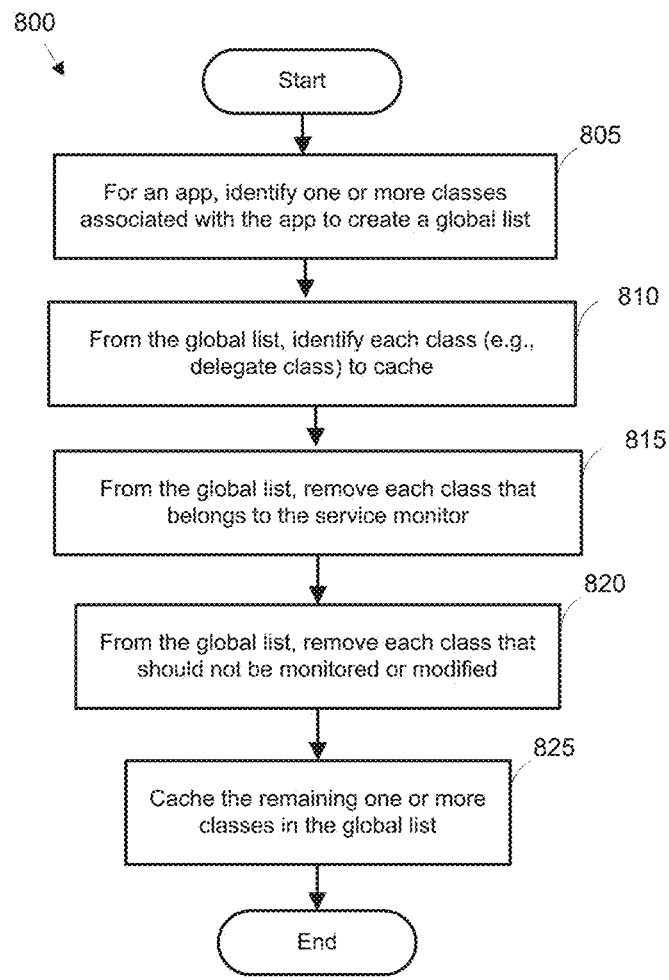
FIG. 8 conceptually illustrates a process that some embodiments use to initialize the network monitor.

Having described an example of network monitor initialization, an example process will now be described by reference to FIG. 8. FIG. 8 conceptually illustrates a process 800 that some embodiments use to initialize the network monitor. In some embodiments, the initialization entails identifying one or more classes or objects. Once identified, the network monitor wraps one or more methods from each class to track and monitor service calls. The process 800 of some embodiments is performed by a network monitor initializer.

The process 800 begins when it identifies (at 805) a set of classes to define a list of classes, which is also referred to as a global class list. At 810, the process 800 identifies, from the set of classes, one or more classes (e.g., delegate classes) to cache. The process removes (at 815) each class that belongs to the network monitor from the global list. The process 800 also removes (at 820) each class that should not be monitored or modified. The process 800 then caches (at 825) the remaining one or more classes in the global class list. The process 800 then ends.

Some embodiments perform variations on the process 800. The specific operations of the process 800 may not be performed in the exact order shown and described. The specific operations may not be performed in one continuous series of operations, and different specific operations may be performed in different embodiments. Further, the process 800 could be implemented using several sub-processes, or as part of a larger macro process.

C. Swizzling

As mentioned above, the swizzling module 420 is a component of the network monitor that is responsible for injecting the service monitor code (e.g., wrap those entities to trap the network requests). In some embodiments, the swizzling module accomplishes this by reading the class list cache and performing method swizzling or monkey patching.

Figure 9:
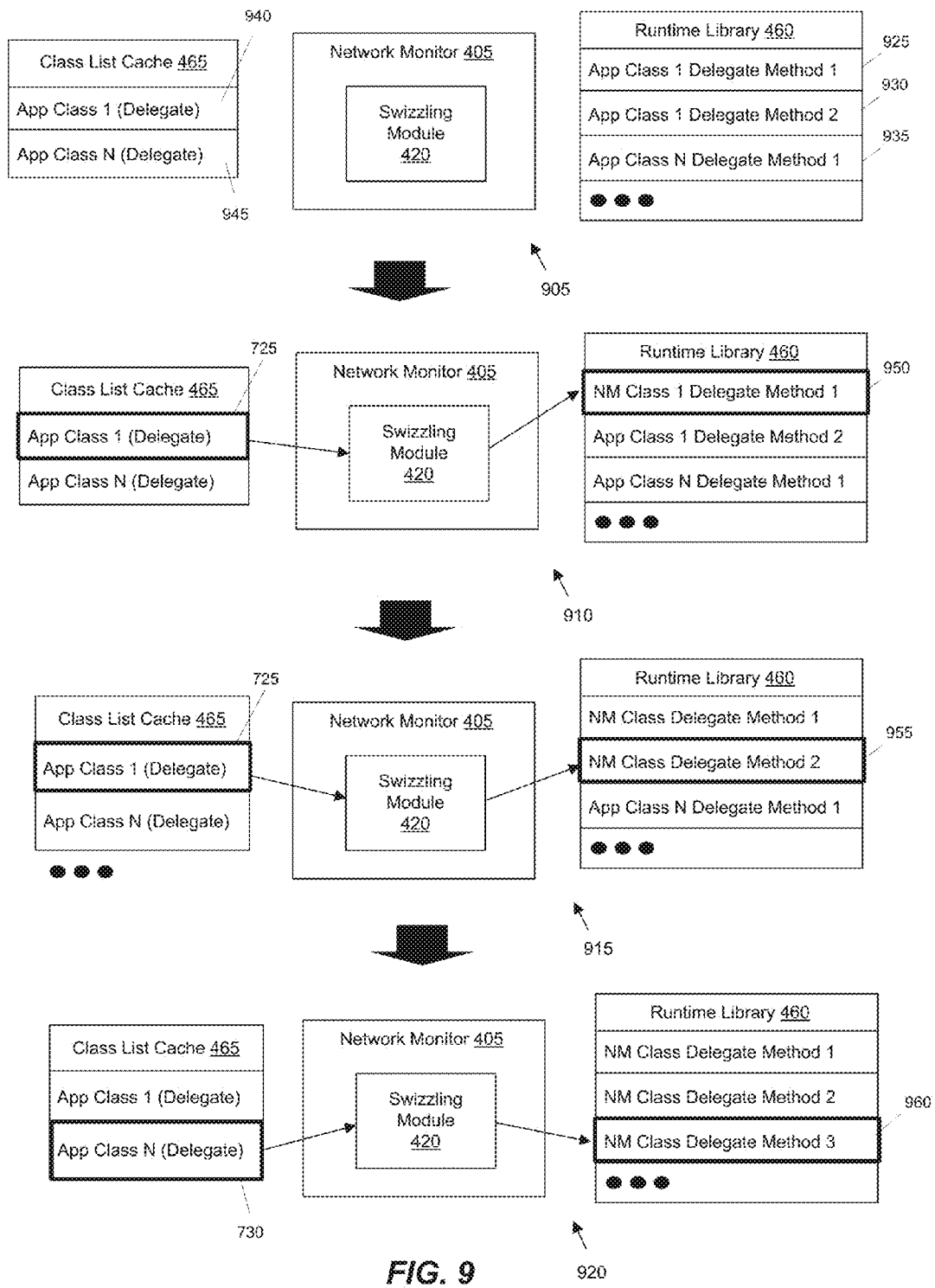
FIG. 9 illustrates an example of the network monitor injecting the network monitor code to alter the runtime code.

FIG. 9 illustrates an example of the swizzling module 420 injecting the service monitor code to alter the runtime code. The network monitor 405 includes the swizzling 420. The figure shows the swizzling module 420 modifying the runtime library so that the network monitor method is called instead of the application method. Four operational stages 905-920 of the network monitor are shown in the figure.

The first stage 905 illustrates the class list cache 465 and the runtime library 460. As shown, the class list cache 465 includes a number of delegate classes 940 and 945. These are same classes that the network monitor initializer has determined to be the classes whose runtime behavior should be modified. The runtime library 460 represents data that is to be read by the runtime engine during runtime. The runtime library 460 includes several methods or functions used by the runtime engine to define the behavior of the application during runtime. To simplify the description, the runtime library is shown as listing several application delegate methods, but it can include many more items or even fewer items. Also, the format of the runtime library may be different or can change depending on the type of runtime engine. In other words, different runtime engines read different runtime data, and the runtime data can be in various different formats.

The second stage 910 shows the swizzling module 420 modifying the runtime library 460. Specifically, the swizzling module 420 identifies the delegate class 940 from the class list cache 465. Based on the identification, the swizzling module then identifies a particular method 925 associated with the class. The swizzling module 420 then replaces that particular method 925 with the network monitor's method 950.

The third stage 915 shows the swizzling module 425 replacing another application method 930 with a particular network monitor method. Here, the swizzling module 420 has already identified the delegate class 940 using the class list cache 465, but decided that there was more than one application method that should be replaced in the runtime library. Accordingly, the swizzling module then replaces another method 930 with the network monitor's method 955.

The fourth stage 920 shows the swizzling module 425 replacing another application method 935 with a particular network monitor method. Here, the swizzling module 420 has identified the delegate class 945 using the class list cache 465. The swizzling module then replaces the delegate class's method 935 with the network monitor's method 960.

Figure 10:
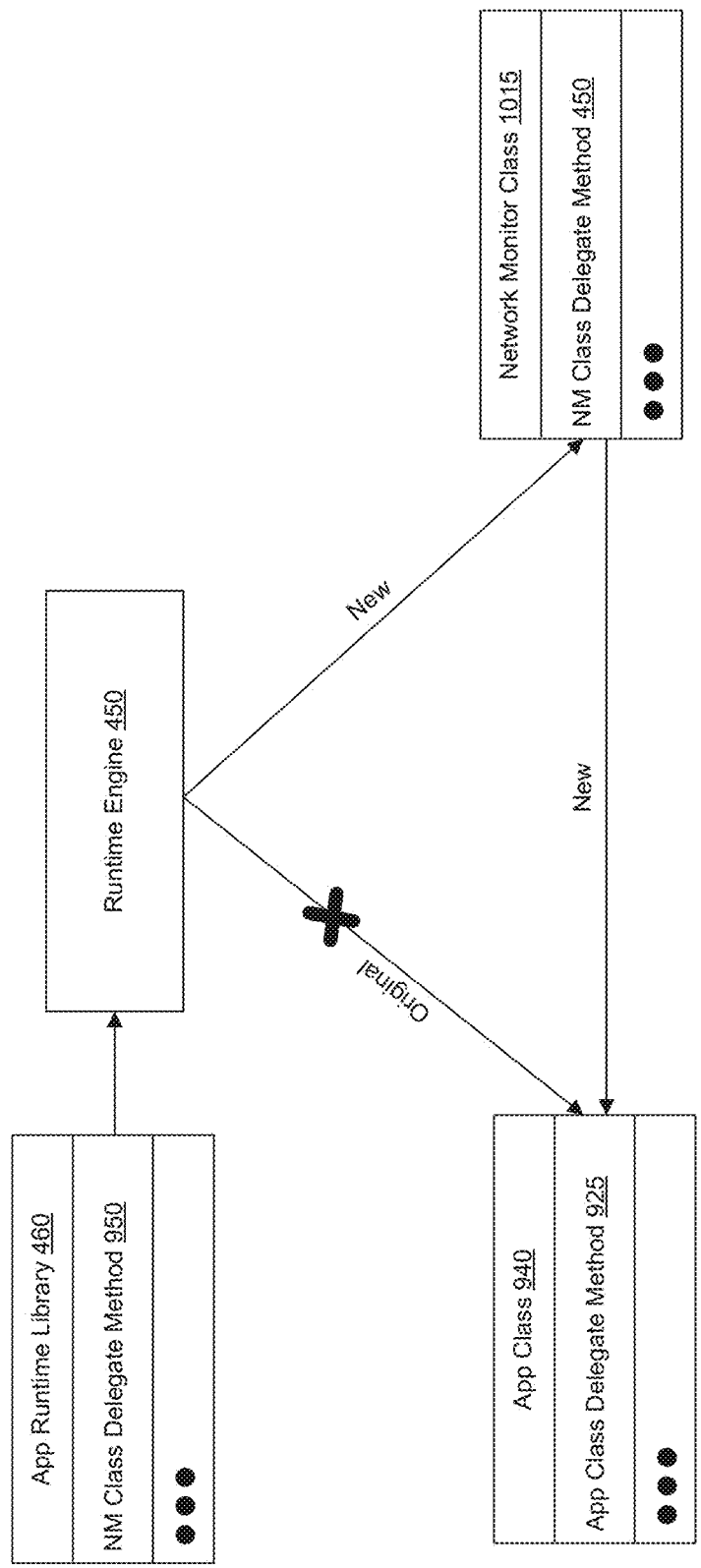
FIG. 10 illustrates an example of how the change to the runtime code causes a runtime engine to call the network monitor method rather than the original application method.

FIG. 10 illustrates an example of how the change to the runtime code 460 causes a runtime engine 450 to call the network monitor method 950 rather than the original application method 925. Specifically, the figure shows that the runtime library has been modified. In the runtime library, the application class method has been replaced by the network class method.

The runtime engine 450 reads the runtime library 460 to control the operations of the application during runtime. For instance, the runtime engine might read the runtime library and call the network mentor method rather than the native application class method. The network class delegate method then extends the functionality of the application delegate method by capturing data relating to the network service request. The network class method then calls the application delegate method. This is conceptually shown in FIG. 10 with several arrowed lines that represents different calls. For each new network service call, the runtime engine directs the call to the network monitor class delegate method, and the network monitor delegate method directs the call the app class delegate method. The crossed-out arrow indicates that the runtime engine does not directly invoke the app class method when there a network access is needed.

By altering the runtime behavior, the swizzling results in the network monitor method wrapping the original method. Once wrapped, the service monitor method extends or modifies the run-time behavior of the application by capturing data relating to each network service request made by the application. FIG. 11A shows an example of an application method 925 prior to being wrapped by a network monitor method. In particular, FIG. 11A shows the original application method that would be called. The method may receive an input and output some value. Depending on the application method, the input may simply be the name of the method or function call without any parameter. In some embodiment, the input to the method is a network service request (e.g., HTTP request) and the output is the response to the network service request (e.g., HTTP response). Also, depending on how the method is coded, the application method may not have any output value.

Figure 11B:
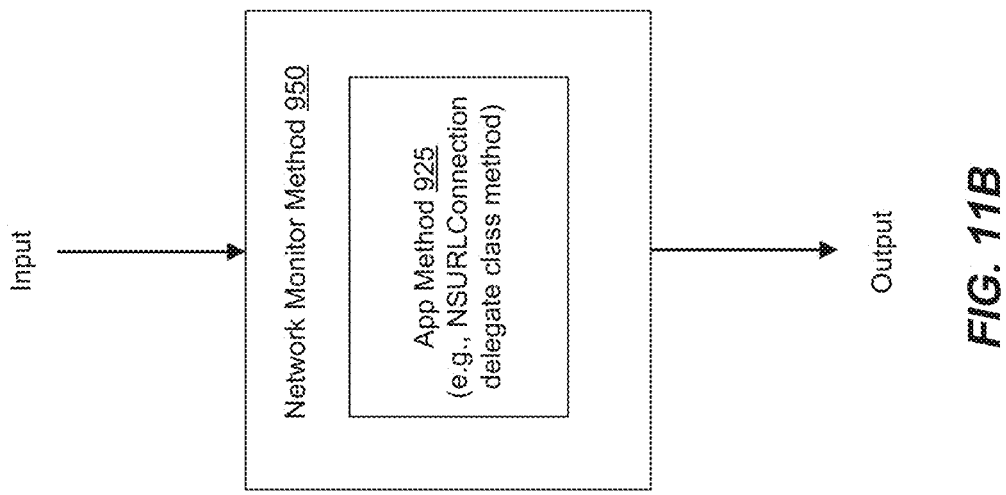
FIG. 11B shows the network monitor method wrapping the application method.
Figure 11A:
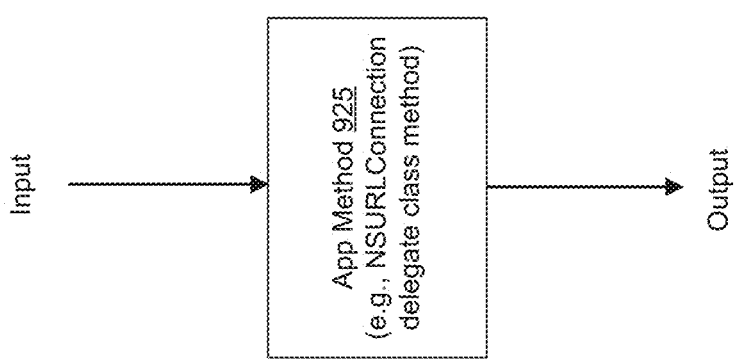
FIG. 11A shows an example of an application method prior to being wrapped by a network monitor method.

FIG. 11B shows the network monitor method 925 wrapping the application method 950. The input is the same; however, the output of the network monitor method is the captured data relating to the service request. The data may be captured with the input of the original request. Alternatively, or conjunctively with input data, the network monitor method may capture data relating to the output of the application method. For instance, the network method may capture data in the response that indicates whether the request has been processed, or there was some error (e.g., through a status code in the response).

FIGS. 11A and 11B show that the original application method, in some embodiments, is an NSURLConnection class delegate method. This means that the application class is a delegate of the NSURLConnection class, and the application method is an implementation of the NSURLConnection class method. The application method may or may not extend the functionality of the original NSURLConnection method. The application method may call the NSURLConnection class method to access the network service. One of the reasons that such delegate classes are used in Objective-C is that it is against the vendor's policy to modify certain classes that the vendor provides, such as the NSURLConnection class.

Figure 12:
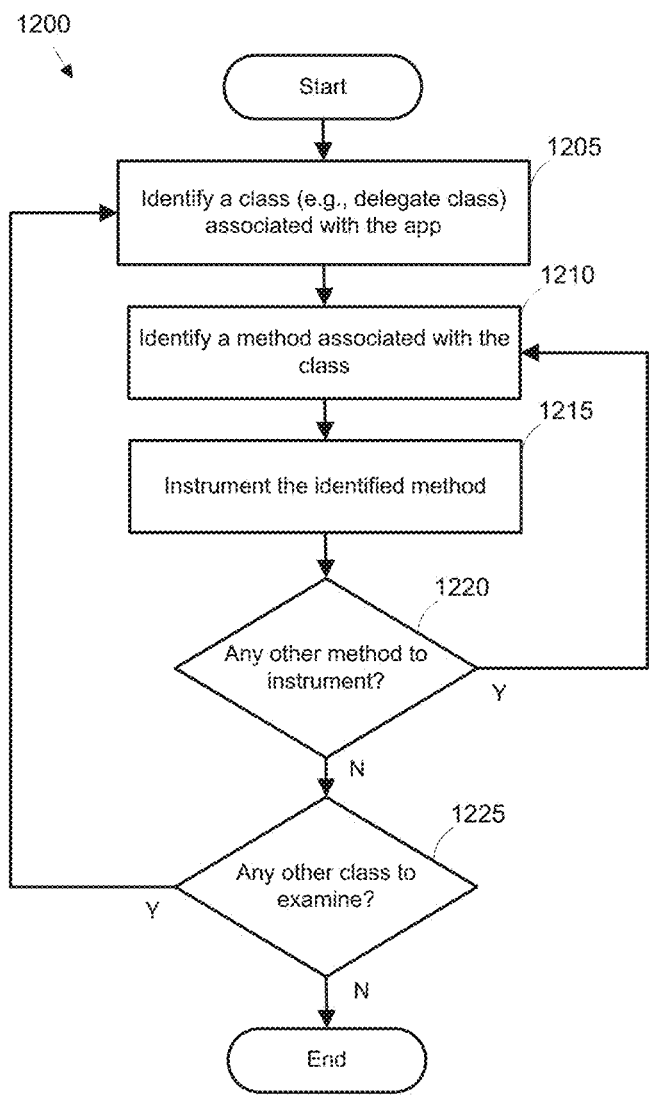
FIG. 12 conceptually illustrates a process that some embodiments implement to instrument one or more methods in order to track and monitor network calls.

Having described an example of swizzling, an example process will now be described. FIG. 12 conceptually illustrates a process 1200 that some embodiments use to instrument one or more methods to track and monitor service calls. In some embodiments, the instrumentation results in an application runtime engine calling at least one network monitor method instead of the application method. The network monitor method then performs its accounting or tracking operations, and calls the application method. In some embodiments, the process 1200 is performed by a network monitor.

The process 1200 begins when it identifies (at 1205) a class that is associated with the application. The class may be a delegate class that implements a particular method. The process 1200 identifies (at 1210) a method associated with the class. The process 1200 then instruments (at 1215) the identified method. Here, the process 1200 of some embodiments is specifying that the application runtime engine to call the network monitor method instead of the application method. In specifying, the process may modify one or more items (e.g., a runtime library), which the runtime engine uses to execute the application.

At 1220, the process 1200 determines whether there is another method to instrument for the identified class. If so, the process 1200 returns to 1210, which is described above. Otherwise, the process 1200 determines (at 1225) whether there is another class to examine. If there is another class, the process 1200 returns to 1205, which is described above. If there are no additional classes, the process 1200 ends.

Some embodiments perform variations on the process 1200. The specific operations of the process 1200 may not be performed in the exact order shown and described. The specific operations may not be performed in one continuous series of operations, and different specific operations may be performed in different embodiments. Further, the process 1200 could be implemented using several sub-processes, or as part of a larger macro process.

D. Collecting Data

The network monitor of some embodiments captured data relating to a network service call and sends the captured data to an API server. In some embodiments, the network monitor captures mobile state data and sends the mobile state to the API server along with the service call data. The network monitor of some embodiments collects other contextual data and sends the contextual data along with the captured data. Several examples of capturing and aggregating such data will now be described by reference to FIGS. 13-24 i. Capturing Service Call Data

The network monitor of some embodiments captures data relating to a network service call and sends the captured data to an API server. The data may be captured at the input of the network service request. Alternatively, or conjunctively with input data, the network monitor may capture data relating to the response to the network service request. An example of capturing data associated with a network service request will now be described by reference to FIGS. 13 and 14. These figures are followed by FIGS. 15 and 16, which show an example of capturing data associated with a response to the network service request.

FIG. 13 shows an example user interaction with an application that causes the network request to be sent to a cloud service. Two stages 1305 and 1310 of the mobile device 1300 are shown in FIG. 14. In the first stage 1310, the mobile device 1300 has been turned on, and the application 1320 has been opened. Here, the application is a web-based application that retrieves web pages. However, the application can be any application or game that makes network service requests. To input an address, the user selects a text field 1330 of the web-based application by tapping the user's finger over the text field on the mobile device's touch screen display.

The second stage 1310 illustrates the mobile device after the user has inputted an address into the field. As shown, the user taps on a button 1325. This causes the web-based application to generate a request based on the user input and send the request to a web server 1315.

FIG. 14 shows how the network monitor 405 operates as a background process to capture data associated with the service request. Three operational stages 1405-1455 of the web-based application 1320 are shown in this figure. The first stage 1405 illustrates that the user input on the button 1325 resulted in the runtime engine 450 calling the network monitor method 425. Here, the network monitor method may be called because the network monitor has modified the runtime behavior of the application. An example of such modification is described above by reference to FIGS. 7 and 8.

The second stage 1410 shows the network monitor 405 after it has intercepted the network service request. Specially, the network service request is passed to the parser 440. The request is then parsed by the parser and then stored as a request object 1420. The parser then parses the request to identify one or more pieces of associated with the request. In some embodiments, the parser identifies an address associated with the service request, the type of method, the amount of data sent with the request (e.g., in bytes), and/or other data in the request (e.g., request headers 2910, body, and/or trailer). The third stage 1415 shows the network monitor method 425 calling the application method 430.

In some embodiments, the network monitor 405 not only derives information from the request but also is informed of other data. For instance, the network monitor may store with the request object a timestamp. In some embodiments, the timestamp records the date and time the request was processed by the network monitor. This can be the time at which the request data was recorded. Alternatively, the timestamp can be recorded when the network request was received by the network monitor method, when the network request was forwarded to the application method, or when the network request was processed by the application method. In this manner, the least amount of processing time on the application's end is factored into different measurements, such as latency, response time, etc.

FIG. 15 shows the mobile device 1300 receiving a response the network service request. Two operational stages 1505 and 1510 of the mobile device are shown in this figure. These stages 1505 and 1510 represent some time after the request has been sent and processed by the web server. Particularly, the first stage 1505 shows the web server 1315 responding to service request by sending a response. In the second stage 1510, the mobile device has received the response. The response has also been processed by the web-based application 1320. Here, the response has been parsed to display a web page.

FIG. 16 shows how the network monitor 405 operates as a background process to capture data associated with the response. Three operational stages 1605, 1610, and 1615 of the web-based app 1320 are shown in this figure. The first stage 1605 illustrates a point in time after the response has been received. To handle the response, the runtime engine 450 calls 450 upon the network monitor method 425.

The second stage 1610 shows the network monitor 405 after it has intercepted the network service response. Specially, the network service response is passed to the parser 440. The response is then parsed by the parser and then stored with the request data as the request object. The parser parses the response to identify one or more pieces of data associated with the request. For instance, the network monitor may record the time of the request and the time of the response to compute latency. In some embodiments, latency is measured from first byte sent to first byte received. Alternatively, or conjunctively with such timestamps, the network monitor may capture other data such as an address (URL) associated with the request, the amount of data sent (e.g., bytes sent) with the request, the amount of data received with the response, an error code in the response, etc.

Figure 17:
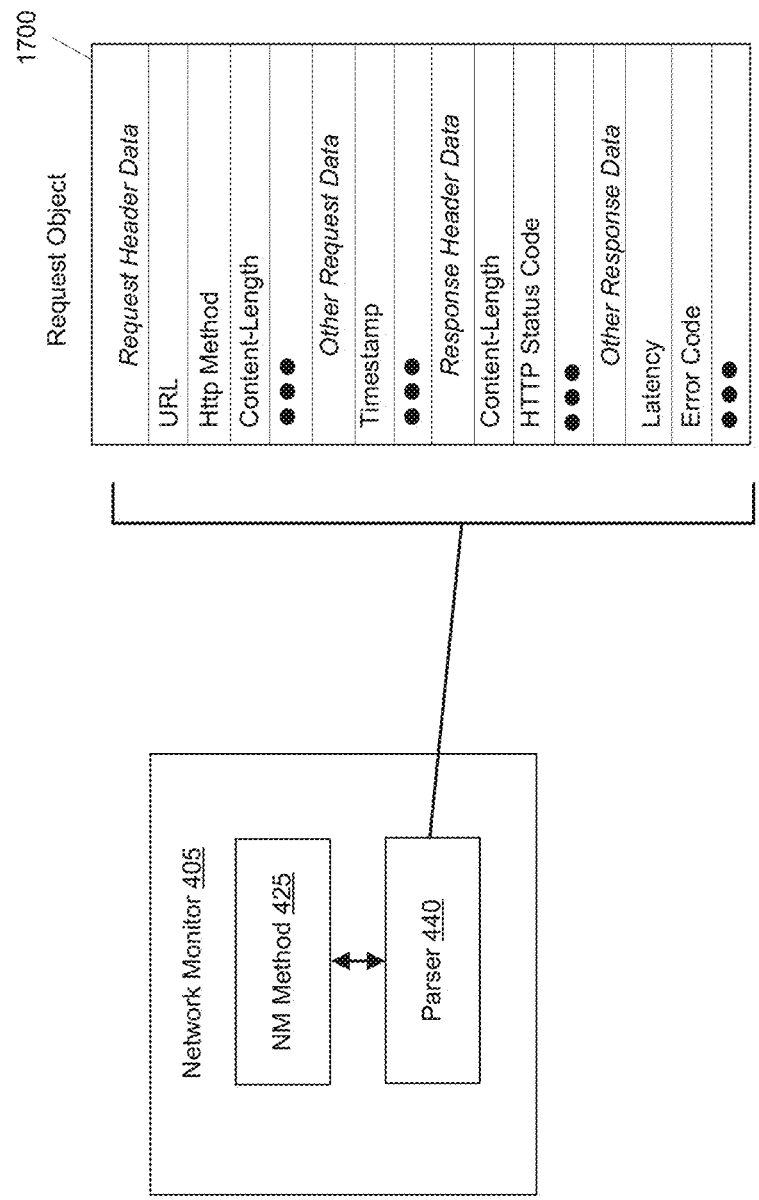
FIG. 17 conceptually illustrates an example of a request object that encapsulates data relating to a network service call.

In some embodiments, the network service request is an HTTP request, and the response is an HTTP response to the HTTP request. FIG. 17 conceptually illustrates an example of a request object 1700 that encapsulates data relating to an HTTP request and an HTTP response. The network monitor 405 includes the network monitor method 425 and the parser 440. The network monitor method 425 intercepts the network request and response, and passes them to the parser 440. In the second stage 1605, the parser 440 then parses the request and the response to identify data that defines the request object 1420. The third stage 1615 shows the network monitor method 425 calling the application method 430.

In the example of FIG. 17, the request object 1700 includes various data relating to the HTTP request and the HTTP response. Specifically, with relation the request header data, the request object 1700 has a web address or URL, the type of HTTP method (e.g., GET, POST, HEAD, DELETE, PUT), and the content length that indicates the size of the entire-body of the request. Alternatively or conjunctively with one or more of the request header data listed above, the network monitor may identify other request header data, such as Content-Type (i.e., MIME type of the body of the request).

With relation the response header data, the request object 1700 has the content length that indicates the size of the entire body of the request (i.e., content body) and the status of the response (e.g., 200 OK). Alternatively or conjunctively with one or more of the request header data listed above, the network monitor may identify other response header data, such as Content-Type (i.e., MIME type of the content), Content-Encoding, Content-Language, etc.

In some embodiments, the network monitor 405 identifies several timestamps to measure latency. For instance, when the network monitor receives a network request, it might record the current time. Also, when the network monitor receives a response, it might again record the current time. The two timestamps are then used by the network monitor to calculate latency. In some embodiments, the network monitor records the time immediately after it intercepts the response. In this manner, additional processing on the application's end does not factor into different measurements, such as latency and response time. The calculation of latency may be offloaded to the API server, in some embodiments.

The network monitor 405 of some embodiments analyzes the network request and/or the response to specify its own code (e.g., error code). As an example, the network monitor 405 may determine that there was no response to the request and specify a particular internal error code. Such internal error codes are used by the API server to provide a more detailed error report in relation to network service usage by an application, in some embodiments.

ii. Capturing Mobile State Data

To provide additional context regarding the network request, the network monitor of some embodiments gathers mobile state data. The mobile state data can include any one or more of the following: carrier info (e.g., the name or identity of the wireless carrier that is servicing the mobile device), geo location information (e.g., latitude, longitude), network connectivity information (e.g., whether the device was on Wi-Fi, cellular, or not connected), mobile network code (MNC), mobile country code (MCC), roaming, time, battery level, memory usage, up time, whether the device is jailbroken or rooted, mobile OS version, and mAPM service monitor version.

Figure 18:
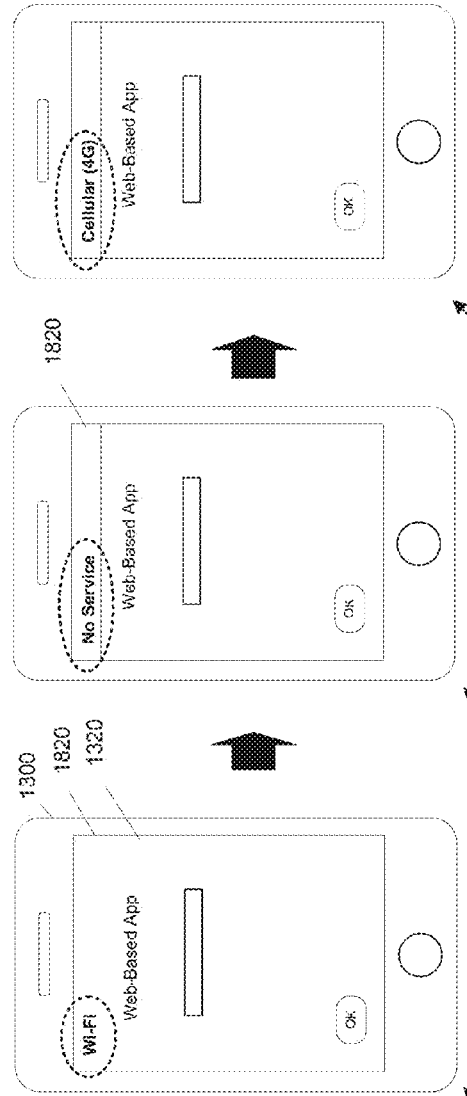
FIG. 18 shows examples of changes in network connectivity of a mobile device.
Figure 19:
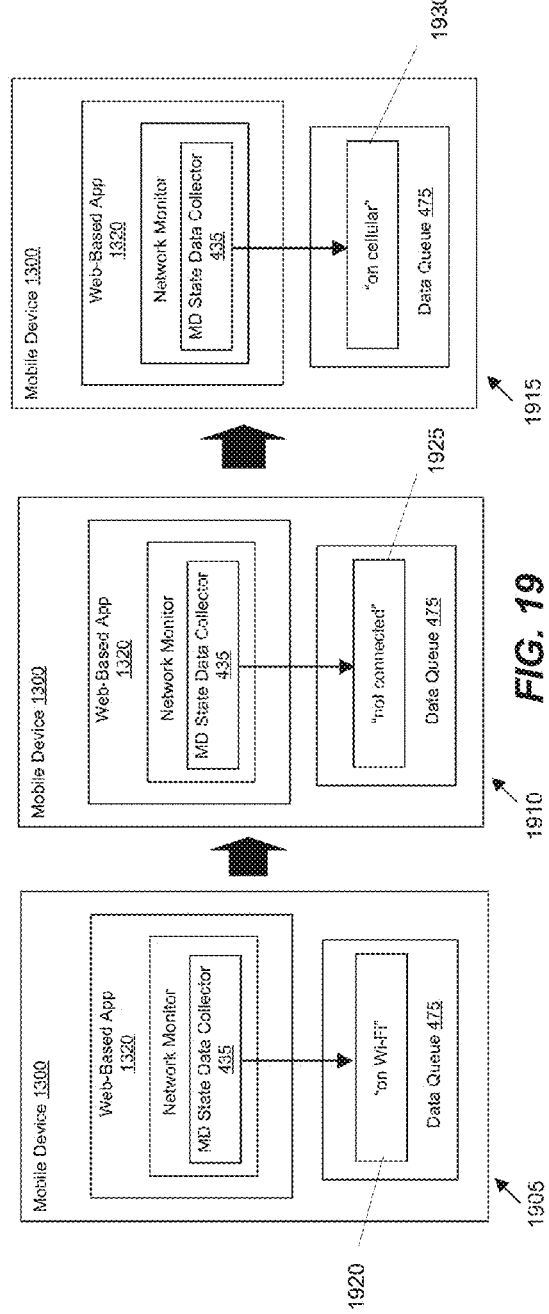
FIG. 19 shows how the network monitor captures mobile state data in accord with the changes in the network connectivity.

In some embodiments, each time there is a change in the mobile device state, the network monitor updates the state data. This is to ensure that the request object is associated with the latest state. FIGS. 18 and 19 provide an illustrative example of the network monitor updating the mobile state data. Specifically, FIG. 18 shows changes in network connectivity of the mobile device. This is followed by FIG. 19, which shows how the network monitor gathers the mobile state data in accord with the changes in the network connectivity.

Three operational stages 1805-1815 of the mobile device 1300 are shown in FIG. 18. In the first stage 1805, the mobile device 1300 has been turned on, and the application 1320 has been opened. The mobile device's touch screen display also shows a status bar of the mobile operating system. The status bar has a label or icon that indicates that the mobile device is on a Wi-Fi network.

The second stage 1810 shows a change in the network connectivity of the mobile device. The mobile device 1300 is no longer connected to the Wi-Fi network. Here, the mobile device 1300 is not connected to the cellular network as well. This is conceptually shown with the "Wi-Fi" label of the status bar 1820 in first stage 1805 that is being replaced with a "No Service" label in the second stage 1810.

The third stage 1815 shows another change in the network connectivity of the mobile device. The mobile device 1300 is now on the cellular network. This is conceptually shown with the "No Service" label of the status bar 1820 in second stage 1810 that is being replaced with a "Cellular (4G)" label in the third stage 1815.

FIG. 19 shows three operational stages 1905-1915 of the same mobile device 1300 from the perspective of the network monitor 405. The network monitor includes mobile device state data collector 435 and the data queue 475, which are described above by reference to FIG. 4. Here, the mobile device state data collector may be registered with a mobile OS service or may implement an API, framework, or library to receive an update each time there is a change in network connectivity. The update may include a code or some identifier, which indicates the network connection if the mobile device is connected to one.

The first stage 1905 corresponds to the first stage 1805 of the previous figure. Here, it 1905 shows the mobile device state data collector 435 updating the connectivity info in the data queue 475. Specially, the mobile device state data collector 435 has been notified that the mobile device is connected to the Wi-Fi network. The mobile device state data collector 435 updates the connectively info 1920 in the data queue 475. This is conceptually shown in the first stage 1905 as the connectivity info 1920 now reads "on Wi-Fi".

The second stage 1910 corresponds to the second stage 1810 of the previous figure. Here, it 1910 shows the mobile device state data collector 435 once again updating the connectivity info in the data queue 475. Specially, the mobile device state data collector 435 has been notified that the mobile device is not connected any network. As such, the mobile device state data collector 435 updates the connectively info in the data queue 475. This is conceptually shown in the second stage 1910 as the connectivity info 1925 now reads "not connected".

The third stage 1915 corresponds to the first stage 1815 of the previous figure. Here, it 1915 shows the mobile device state data collector 435 yet once again updating the connectivity info in the data queue 475. Specially, the mobile device state data collector 435 has been notified that the mobile device is now connected to the cellular network. As such, the mobile device state data collector 435 updates the connectively info in the data queue 475. This is conceptually shown in the third stage 1915 as the connectivity info 1930 now reads "on cellular".

In the example described above, the network monitor 405 updates the connectivity info in the storage (e.g., in the data queue 475). However, one of ordinary skill in the art would understand that the example is equally applicable to other mobile state data, including carrier info (e.g., the name or identity of the wireless carrier that is servicing the mobile device), geo location information (e.g., latitude, longitude), network connectivity information (e.g., whether the device was on Wi-Fi, cellular, or not connected), mobile network code (MNC), mobile country code (MCC), roaming, time, battery level, memory usage, up time, whether the device is jailbroken or rooted, mobile OS version, and mAPM service monitor version. For instance, when the application is open, the mobile device state data collector 435 may update the geo location info each time there is a detectable change in the physical location of the mobile device 1300. Similarly, when the application is open, the mobile device state data collector 435 may update carrier info each time there is a detectable change in the carrier that is providing services for the mobile device 1300.

In some embodiments, the network monitor 405 updates or replaces a mobile device state if is not associated with another. This is to ensure that each network service request report is associated with that state of the mobile device at the time the request was processed (e.g., when the request was intercepted). FIGS. 20 and 21 provide an illustrative example of the network monitor 405 not updating or replacing a mobile device state because the state is associated with a network request report. Specifically, FIG. 20 illustrates a network request being made by the application 1320 while the state of the mobile device 1300 is changing. This is followed by FIG. 20, which shows that the network monitor 405 does not update or replace a mobile device state if that state is associated with service call data.

Three operational stages 2005-2015 of the mobile device 1300 are shown in this figure. In the first stage 2005, the mobile device 1300 has been turned on, and the application 1320 has been opened. The mobile device's touch screen display also show a status bar of the mobile operating system. The status bar has a label or icon that indicates that the mobile device is on a cellular network. In this example, the user performs a touch-based gesture over the device's touch screen display to select an application button. The selection triggers a network service request to retrieve a web page.

The second stage 2010 shows that the user request to retrieve the web page has been completed. This is shown with the web page on the device's screen. The second stage 2010 also shows a change in the network connectivity of the mobile device. The mobile device 1300 is no longer connected to the cellular network. Here, the mobile device 1300 is now connected to the Wi-Fi network. This is conceptually shown with the "Cellular (4G)" label of the status bar 1820 in first stage 2005 that is being replaced with a "Wi-Fi" label in the second stage 2010.

The third stage 2015 shows another change in the network connectivity of the mobile device. The mobile device 1300 is now returned to the cellular network. This is conceptually shown with the "Wi-Fi" label of the status bar 1820 in second stage 2010 that is being replaced with a "Cellular (4G)" label in the third stage 2015.

FIG. 21 shows three stages operational stages 2105-2115 of the same mobile device 1300 from the perspective of the network monitor 405. The network monitor includes mobile device state data collector 435, the data queue 475, and the network monitor (NM) method 425, which are described above by reference to FIG. 4.

The first stage 2105 corresponds to the first stage 2005 of the previous figure. Here, it 2105 shows the mobile device state data collector 435 updating the connectivity info in the data queue 475. Specially, the mobile device state data collector 435 has been notified that the mobile device is now connected to the cellular network. The mobile device state data collector 435 updates the connectively info in the data queue 475. This is conceptually shown in the first stage 2105 as the connectivity info 2120 reads "on Cellular".

The second stage 2110 corresponds to the second stage 2010 of the previous figure. Here, the network monitor method 425 has intercepted, and stored data regarding the network request as a request object 2125 in the data queue. The request object 2125 is stored with or associated with the previously stored connectivity info 2120.

After capturing the data, in the second stage 2110, the mobile device state data collector 435 is notified of an update to the connectivity info. Specially, the mobile device state data collector 435 has been notified that the mobile device is now connected to the cellular network. As shown, the mobile device state data collector 435 does not update the state 2120 that is associated with the request object 2125. Instead, the mobile device state data collector simply stores it in the data queue. Note that the request object 2125 and the associated state 2120 have not been popped from the data queue 475. This may be because some embodiments send capture data in a periodic basis and the frequency may be specified by the mAPM provider. Such similar situation may also occur when there is no network connection.

The third stage 2115 corresponds to the third stage 2015 of the previous figure. Here, the data queue 475 has been popped and the request object 2125 and the network connectivity info 2120 has been packaged as a service call report 2135, and sent to the API server. The third stage 2115 also shows another change in the network connectivity of the mobile device 1300. The mobile device 1300 has now returned to the cellular network. As such, the mobile device state data collector 435 updates the connectively info in the data queue 475. This is conceptually shown in the third stage 2115 as the connectivity info 2140 now reads "on cellular". Different from the previous stage 2110, the mobile device state data collector updates a previously stored state. This is because the previously stored state 2130 was not associated with captured service call data.

iii. Collecting Additional Contextual Data

Figure 22:
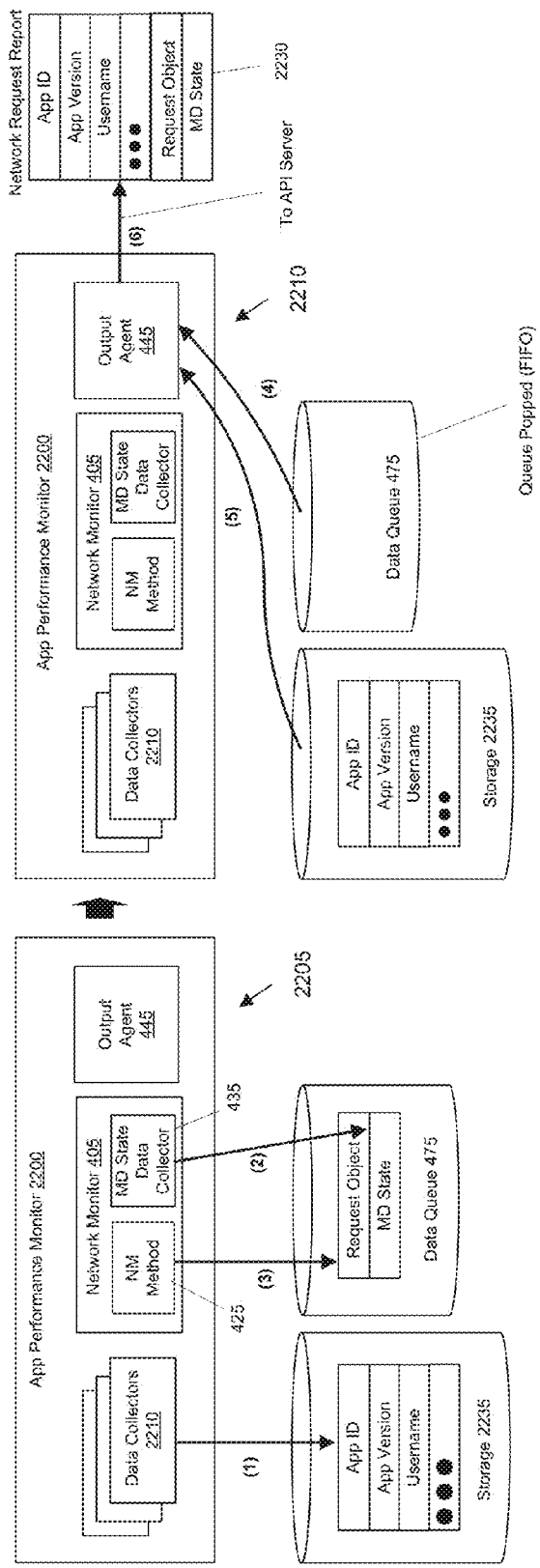
FIG. 22 conceptually shows an example of gathering additional contextual data for a network service call report.

In addition to mobile state data or instead of it, the network monitor may collect other data that provide additional context regarding each network service call. FIG. 22 conceptually shows an example of gathering additional context data for the network service call report. Two operational stages 2205 and 2210 of an application performance monitor 2200 are shown in this figure. As will be described below by reference to FIG. 33. The network monitor 405 of some embodiments is one of several different monitoring tools that are provided by the mAPM provider. In this example, the network monitor 405, a set of data collectors 2210, and the output agent 445 are shown inside the "application performance monitor" box. This is to provide a visual indication that these components are tools of the application performance monitor 3300.

The first stage 2205 of FIG. 22 shows the application performance monitor 2200 gathering data. Although the figure shows several arrowed lines with numbers that indicate some sort of a sequence. The actual sequence may be different because each component could be gathering different data at different time. As shown, the set of data collectors 2210 gather additional contextual data and stores it in storage 2235. In this example, the context data includes application ID, the version number of the application, a username, etc. The username can be a user ID, an email address, login name (e.g., to access a user account associated with the application or a cloud service), or any other string identifying a user.

The first stage 2205 also shows the network monitor 405 capturing request data and mobile state data. Specifically, the mobile device (MD) state data collector has been informed about an update in the mobile device state and stored data regarding the update in the data queue 475. The network monitor method 425 has also intercepted a network call and stored a request object relating to the network call in the data queue 475.

The second stage 2210 shows a network request report 2230 being sent to the API server from the application performance monitor 2200. In particular, the output agent 445 retrieves (e.g., pops a dispatch queue to retrieve) the request object and the mobile device state data. The output agent 445 also gathers additional contextual data from the storage. The output agent then packages or formats the gathered data as one or more network request reports or messages 2230. Thereafter, the output agent 445 sends each report 2330 to the API server.

iv. Example Message to API Server

Figure 23:
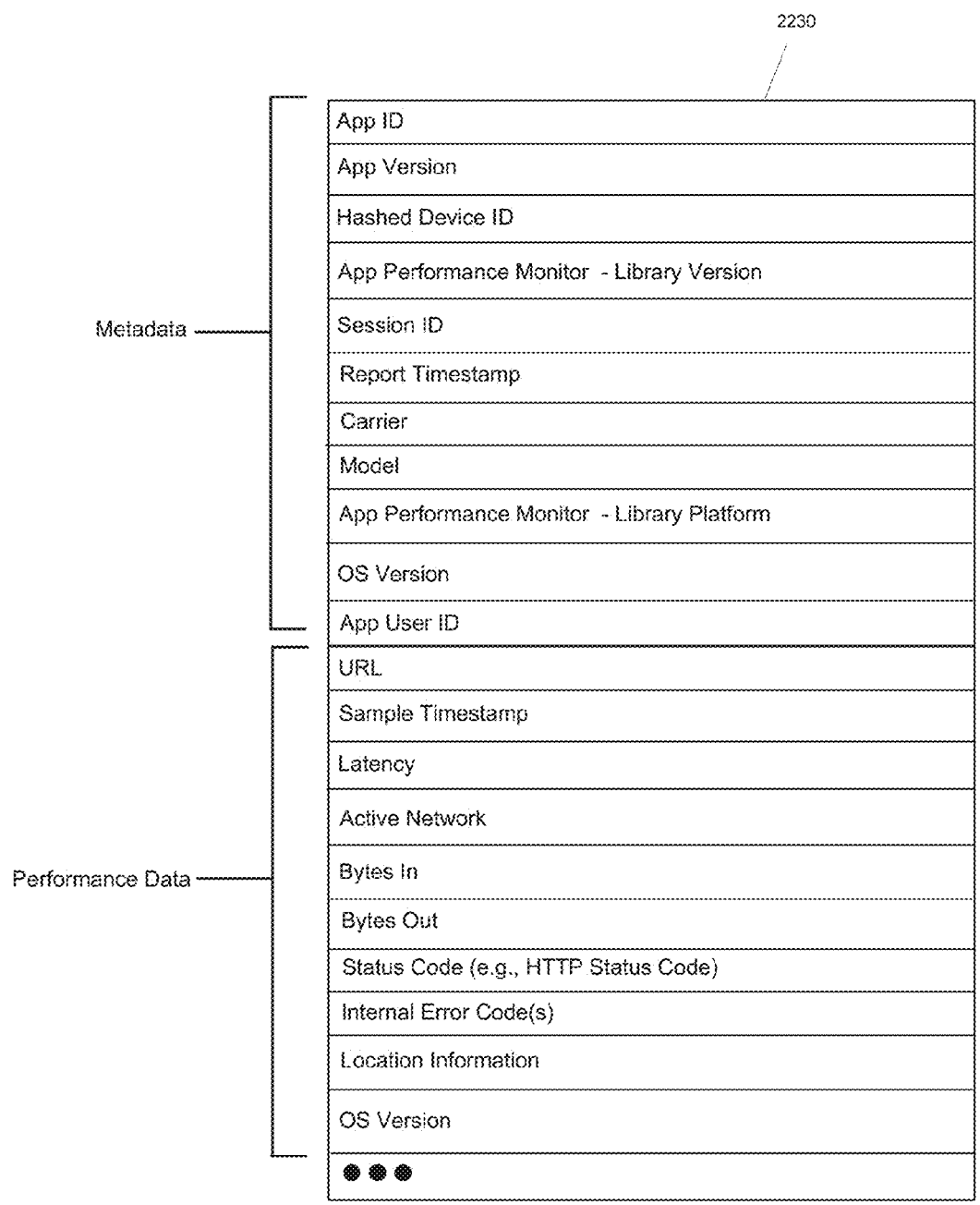
FIG. 23 illustrates an example service call report that is sent to the API server each time a network monitor captures data regarding a network service call.

FIG. 23 illustrates an example report 2230 that is sent to the API server each time a network monitor captures data regarding a network service call made by an application. As shown, the report can include metadata and performance data. In some embodiments, the metadata includes application ID (e.g., randomly generated mAPM solution provider ID identifying the app), the version of the application (e.g., version number), hashed device ID (e.g., randomly generated string which can be used as an internal mAPM solution provider identifier for a user, the version of the library or the SDK (e.g., used to enable application performance monitoring, a session ID (e.g., an auto incrementing number representing the nth app load), a report timestamp, carrier (e.g., wireless carrier), model (e.g., make and model of the device), library platform (e.g., the application performance monitor's platform, such as iOS, Android, or Windows Phone), and the version of the OS (e.g., Android—4.4 KitKat). In some embodiments, the device ID is generated by hashing a particular ID associated with the mobile device, such as the universally unique identifier (UUID).

In some embodiments, the performance data includes an address or URL, a sample timestamp (e.g., the time at which the performance information was recorded), latency (e.g., the time it took to complete the network transaction), active network (e.g., either "on Wi-Fi", "on cellular", "unknown", or "not connected"), bytes in (e.g., the number of bytes received from the server in the network transaction), bytes out (e.g., the number of bytes sent to the server in the network transaction, status code (e.g. status code returned from the server), error codes (e.g., internal error code that is used to display error information on the server end), location (e.g., Latitude and longitudinal coordinates). In some embodiments, latency is measured from first byte sent to first byte received. This sort of measurement is often referred to as round trip latency, and does not factor in the processing that can occur on the server side.

In the example described above, the report 2230 to the API server includes various items. One of ordinary skill in the art would understand that the report 2230 is an example report. Different embodiments can choose different pieces of data for such a report. For instance, the actual report that is sent may include additional data or even fewer data. The report may even include other data that is not shown in the list, such as content type (e.g., MIME type), content encoding, content language, etc.

Figure 24:
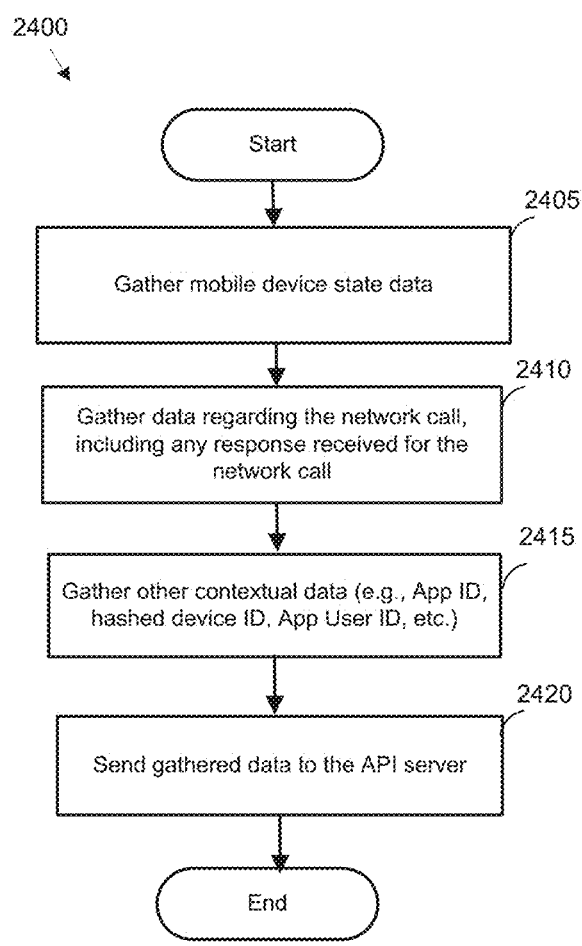
FIG. 24 conceptually illustrates a process that some embodiments implement to send data to the API server.

FIG. 24 conceptually illustrates a process 2400 that some embodiments implement to send data to the API server. In some embodiments, the process 2400 is performed by the network monitor. As shown, the process 2400 begins when it gathers (at 2405) mobile device state data. For instance, the process 2400 might gather carrier info (e.g., the name or identity of the wireless carrier that is servicing the mobile device), geo location information (e.g., latitude, longitude), and/or network connectivity information (e.g., whether the device was on Wi-Fi, cellular, or not connected).

At 2410, the process 2400 gathers data regarding the network call, including any response received for the network call. For instance, when a network service is requested by the application, the process 2400 might captures data relating to the network service request. If there is a response to the service request, the process 2400 might also capture data relating to the response. Here, the process 2400 may record the time of the request and the time of the response to compute latency. In some embodiments, latency is measured from first byte sent to first byte received. Alternatively, or conjunctively with such timestamps, the process 2400 may capture other data such as an address (URL) associated with the request, the amount of data sent (e.g., bytes sent) with the request, the amount of data received with the response, an error code in the response, etc.

At 2415, the process 2400 gathers data other contextual data. For instance, when the process 2400 is ready to send a report regarding a service call, the service monitor might add to the report an application ID, the version number of the application, a device ID, the model of the mobile device, the version number of the mobile operating system (OS), etc. The process 2425 then sends (at 2420) the gathered data to the API server. The process 2400 then ends.

Some embodiments perform variations on the process 2400. The specific operations of the process 2400 may not be performed in the exact order shown and described. The specific operations may not be performed in one continuous series of operations, and different specific operations may be performed in different embodiments. Further, the process 2400 could be implemented using several sub-processes, or as part of a larger macro process.

II. Example Service Monitor Implementation on Another Mobile Device Platform

The previous section described various examples of how the service monitor can be implemented on a particular mobile device platform, such as iOS by Apple Inc. The following section describes example implementations of the service monitor on a different mobile device platform, such as Android OS by Google Inc. One of the main differences between the two mobile OSs is that they each use a different programming language as a primary language to code applications. For instance, the iOS promotes Objective-C through its application programming interfaces (APIs), while the Android OS promotes Java through its respective APIs. Accordingly, some of the techniques described in this section conform to the programming constructs of the Java programming language. However, one of ordinary skill in the understand that the examples in this section or the previous section can be applied to any mobile device platform using any high-level programming language, such as C++, C#, etc.

A. Example Architecture

Figure 25:
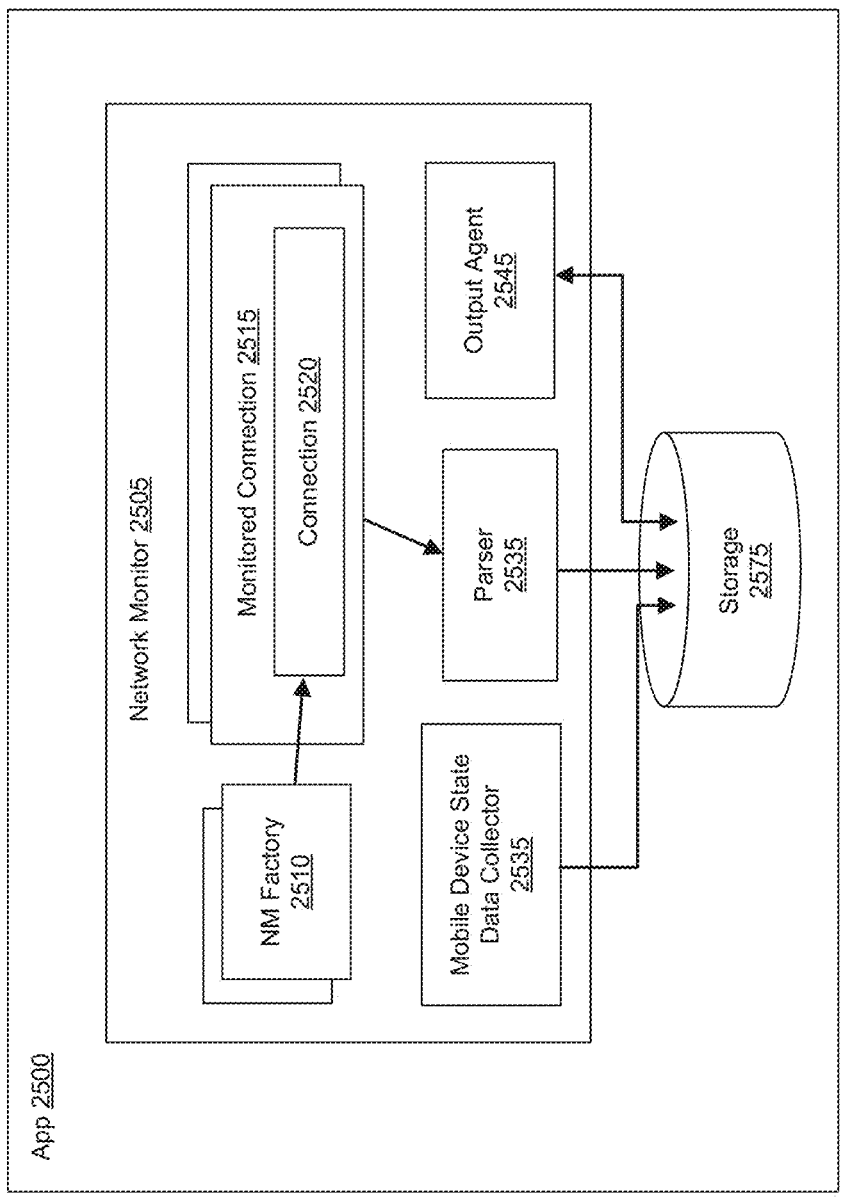
FIG. 25 provides an example software architecture of an application with a network monitor enabled to track and monitor network services used by an application.

FIG. 25 provides an example software architecture of an application 2500 with a network monitor 2505 enabled to track and monitor network services used by the application. As shown, the figure includes a factory object 2510, a monitored connection object 2515, a connection object 2520, a parser 2535, a mobile device state data collector 2535, and a storage 2575. The mobile device state data collector 2535, the output agent 2545, and the storage 2575 are described above by reference to FIG. 2B. Additional examples of the mobile device state data collector 2535, the output agent 2545, and the storage 2575 are described above in Section I above.

The monitored connection object 2515 is a component of the network monitor 2505 that is responsible for capturing data relating to an open network connection. In particular, the monitored connection object wraps a connection object to read data regarding a network service call made by the application. For instance, the monitored connection object 2505 may read the output stream data associated with connection object to capture data relating to a network service request. The monitored connection object 2515 may read the input stream data associated with connection object to capture data relating to a response to the network service request.

In some embodiments, the monitored connection object 2515 wraps a high-level connection object. The high-level connection object may be capable of handling one or more different communication protocols, such as Hypertext Transfer Protocol (HTTP), File Transfer Protocol (FTP), etc. An example of such a high-level connection object is URLConnection class that is provided by Java. The high-level connection object may also include a number of pre-defined methods to read specific pieces of information (e.g., URL address, Content-Length, etc.) associated with the network request and response.

The network monitor 2505 of some embodiments provides the monitored connection object 2515 that wraps a lower-level connection object. In some embodiments, the lower-level connection operates at the socket level. As such, the lower-level connection object may not have a number of pre-defined methods to read specific pieces of information (e.g., URL address, Content-Length, etc.) associated with the network request and the response to the request.

To capture data from such streams, the network monitor 2505 some embodiments includes the parser 2535. In some embodiments, the monitored connection object passes an output stream associated with the low-level connection object to the parser. The parser then parses the output stream to capture data regarding a network request. In some embodiments, the monitored connection object passes an input stream associated with the low-level connection object to the parser. The parser then parses the input stream to capture data regarding a response to the network service request.

In some embodiments, the network monitor factory object 2510 is responsible for creating a particular connection object. For instance, when an application requires a network connection, the application may call upon the factory object to create a new connection object. Thereafter, the monitored connection object, which wraps that new connection object, can read the connection object's input and output streams.

In some embodiments, the factory object 2510 is called each time the application requires a particular network connection. FIGS. 26A and 26B illustrates an example of how the network factory objet 2510 is called upon each time the application needs to a new connection. Specifically, FIG. 26A shows the operations of the application without the network monitor enabled. FIG. 26B shows the operations of the same application after the network monitor has been enabled.

FIG. 26A shows the operations of the application without the network monitor enabled. Specifically, the application includes a module 2600. The module 2600 is an application network connection module that is called each time the application requires a network connection. The module 2600 is conceptual, meaning that different applications that access the network will have one or more different modules or components. When the module 2600 is called, the module makes a call to a network library 2605 to create a new socket. For instance, in the figure, the module makes a new "Socket( )" method call. The library may in turn create a socket implementation object 2615. For instance, in the figure, the network library 2605 makes a "create object( )" method call (e.g., SocketImplFactory.create). This results in the instantiation of the socket implementation object 2615.

FIG. 26B shows the operations of the same application after the network monitor has been enabled. Two stages 2620 and 2625 of the application are shown in this figure. Specifically, the first stage 2620 illustrates an initialization operation that occurs prior to any application module calling for a new socket. Specifically, a network monitor initializer 2640, which is associated with the network monitor, makes a call to define or set the (e.g., default) socket implementation object.

The second stage 2625 shows the application after the initialization. Specifically, when the application needs a network connection, the application calls the module 2600. Similar to above, the module 2600 makes a call to the network library 2605 to create a new socket. However, in reasons to the call, the library creates and/or assigns the network monitor factory object 2510 to handle the connection. This is because the network monitor, in the first stage 2620, network monitor initializer 2640 has informed the network library 2605 to use the network monitor factory object.

In some embodiments, the network monitor factory is called by one or more higher level networking libraries. For instance, in Java, currently there are two primary networking libraries: java.net.URLConnection and Apache's HttpClient library. Both of these libraries are built on top of the java Socket library. Both libraries create sockets by instantiating a socket with the normal java constructor "new Socket( )". This is a built-in java call. Every built in java Socket creates a SocketImpl using a global call SocketImplFactory.create( ). That is where the network service monitor comes in. Before any networking has started, the network service monitor has installed or instrumented its own SocketImplFactory by calling Socket.setSocketImplFactory( ).

In the example described above, the network monitor of some embodiments does not perform method swizzling or monkey patching to direct a runtime engine to call its method instead of the application's method. This is different from the example implementation shown in Section I.A, where the network monitor performs method swizzling. In the example of Section II.A, the network monitor provides a monitored connection object that wraps a connection object to trap data. One of the reasons that the monitored connection object of Section II.A does not perform swizzling is because Java does not support method swizzling or monkey patching. Also, one reason that the swizzling is performed in the example implementation of Section I.A is because Objective-C does not have a standardized factory.

B. Example High-Level and Low-Level Connection Objects

As mentioned above, the network monitor of some embodiments provides a monitored connection object that wraps a high-level connection object. In some embodiments, the network monitor provides a monitored connection object that wraps a low-level connection object. Examples of such different monitored connection objects will now be described below by reference to FIGS. 27 and 28.

Figure 27:
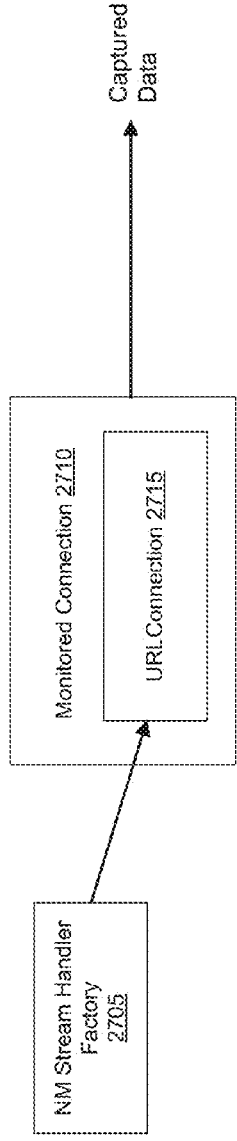
FIG. 27 provides an illustrative example of a monitored connection object that wraps a high-level connection object.

FIG. 27 provides an illustrative example of a monitored connection object 2710 that wraps a high-level connection object 2715. In this example, the high-level connection object 2715 is URLConnection object, which is capable of handling one or more different communication protocols, such as HTTP, HTTPS, and FTP. In some embodiments, the URLConnection object 2715 is created by a network monitor stream handler factory object 2705. For instance, when an application needs an open network connection, the stream handler factory object 2705 may create a new URLConnection object to open a new connection and to get input (e.g., for a webpage).

The monitored connection object 2710 wraps the URLConnection object 2715. In some embodiments, the monitored connection object 2710 captures one or more pieces of information associated with a network service request. The output of the monitored connection object 2710 is the captured data regarding the network service request.

Figure 28:
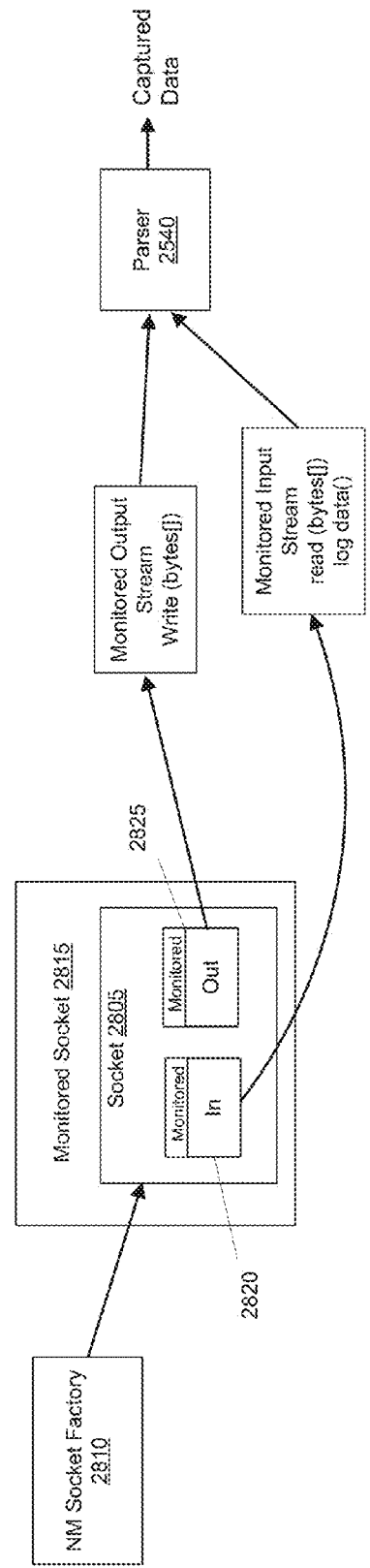
FIG. 28 provides an illustrative example of a monitored connection object that wraps a low-level connection object.

FIG. 28 provides an illustrative example of a monitor socket object 2815 that wraps a low-level connection object 2805. In this example, the low-level connection object 2805 is socket object. In some embodiments, the socket object is created by a network monitor socket factory object 2810. For instance, when an application needs an open network connection, the socket factory object 2810 may create a new socket object to open a new connection.

In this example, the monitor socket object 2815 wraps the socket object's input stream method 2820 and output stream method 2825. The input stream method 2820 returns an input stream for reading bytes from the socket. The output stream method 2825 returns an output stream for reading bytes from the socket. The input stream method 2820 is wrapped to tap into the object's input stream, while the output stream method 2825 is wrapped to tap into the object's output stream.

The parser 2540 receives the output stream to capture one or more pieces of information associated with a network service request. The parser receives the input stream to capture one or more pieces of information associated with a response to the request. The output of the parser is the captured data regarding the network service request. In some embodiments, after reading the input stream, the monitor socket object performs a logging operating (e.g., calls a log method) to store data relating to the network service request and the response as breadcrumb data in a storage (e.g., in a queue). Several examples of storing breadcrumb data are described below by reference to FIGS. 33-36.

In some embodiments, the network monitor utilizes both monitored connection objects 2710 and 2815. For instance, the network monitor may utilizes the monitored connection 2710 for certain types of connection (e.g., HTTPS, HTTP) or for one or more different version of the mobile OS (e.g., Android OS), and may utilize the monitored socket object for all other connections. In some such embodiments, the network service monitor de-instruments the socket instrumentation for one or more specific types of connections (e.g., connection objects) that are created. For instance, the network service monitor may de-instrument the socket instrumentation for each HttpsURLConnection object that is created. The network service monitor may de-instrument the socket instrumentation at creation time (e.g. of the HttpsURLConnection object). In some embodiments, the creation time represents the time the monitored application requests such a connection. The network service monitor may re-instrument the socket version after the application performs the one or more network operations with the connection. In some embodiments, the network monitor utilizes only one of the monitors 2710 or 2815. For instance, the network monitor may utilize the monitored socket object 2815 to capture data relating to all network service requests.

C. Example Parser

As mentioned above, the network monitor some embodiments includes a parser. In some embodiments, a monitored connection object passes an output stream associated with the low-level connection object to the parser. The parser then parses the output stream to capture data regarding a network request. In some embodiments, the monitored connection object passes an input stream associated with the low-level connection object to the parser. The parser then parses the input stream to capture data regarding a response to the network service request.

Figure 29:
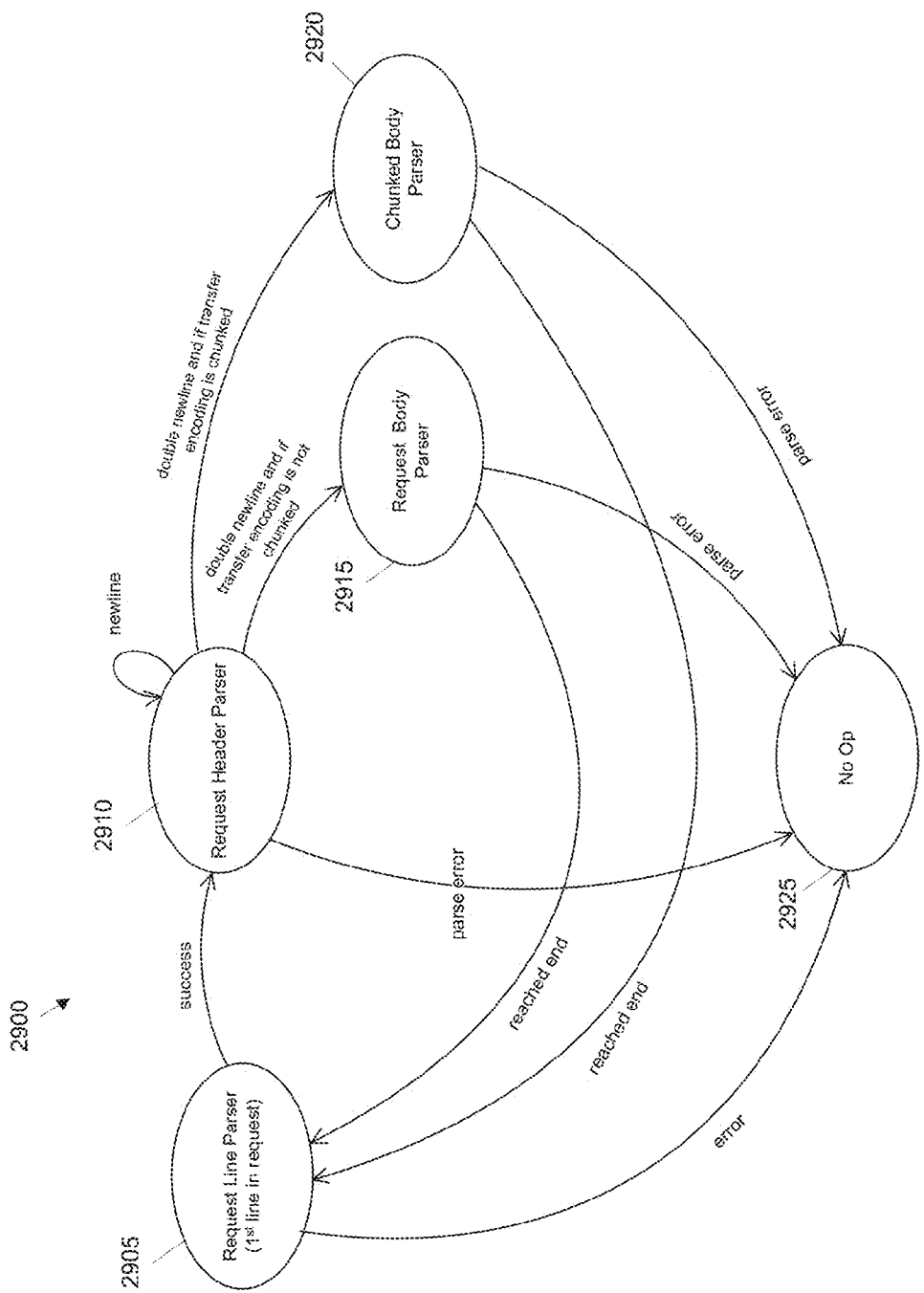
FIG. 29 presents a state diagram that illustrates example operations of the parser to extract data relating to a network service request.

FIG. 29 presents a state diagram 2900 that illustrates example operations of the parser to extract data relating to a network service request. This figure shows five states 2905-2925 that collectively perform these operations. Each of the states represents a set of one or more processes for performing a subset of the operations. The five states include a request line parser 2905, a request header parser 2910, a request body parser 2915, a chunked body parser 2920, and a no-op state 2925. FIG. 29 will be described by reference to FIG. 30, which shows an example parsing a network service request.

In some embodiments, the request line parser 2905 parses the output stream to read a first line in the request. If the first line has been successfully read, the control is shifted to the request header parser 2910. If there is an error, the control is shifted to the no-op state 2925. The no-op state ends the parsing of the output stream. In reading the first line, the request line parser 2905 may analyze the format of the first line. If the request line parser 2905 determines that it does not recognize the first line, the control is transitioned to the no-op state 2925, in some embodiments. For instance, the request line parser 2905 may determine from the first line of the request that output stream does not contain a properly formatted HTTP request and shift the control to the no-op state 2925.

Figure 30:
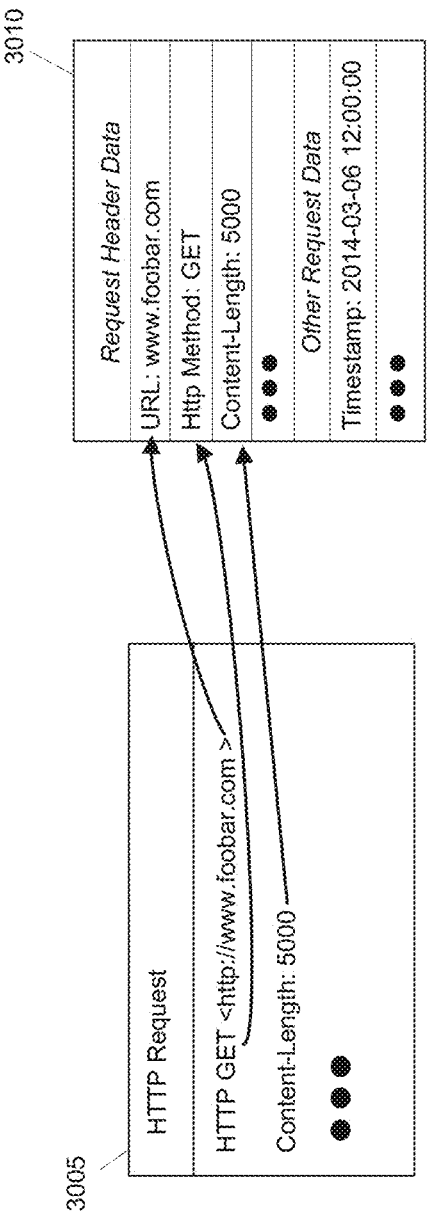
FIG. 30 illustrates an example of parsing a network service request.

In some embodiments, the request line parser 2905 identifies one or more pieces of information from the first line of the request. Referring to FIG. 30, the request line parser 2905 may identity the type of method (e.g., GET, POST, etc.) associated with the request and/or an address (e.g., URL) associated with the request.

As shown in FIG. 29, if the first line has been successfully processed, the control is shifted to the request header parser 2910. The request header parser 2910 parses each header line to identify one or more pieces of information. In some embodiments, the request header parser tries to identify header values, such as Content-Length. This is shown in FIG. 30 as the Content-Length from the request 3005 is added to the request object 3010. The request header parser may also identify a value associate with Transfer-Encoding field. This header field indicates what (if any) type of transformation has been applied to the message body in order to safely transfer it between the sender and the recipient. This is important because the value associated with field allows the parser to determine whether the body is chunked. By chunked, it means that the request was broken into multiple parts (e.g., because the body of the request is lengthy).

As indicated by the new line arrow, the request header parser 2910 is called (e.g., by the request line parser or the request header parser) for each new line of the header. If there is an error, the control is shifted to no-op state 2925 that ends the parsing of the output stream. If there is a double new line, the request header parser has reached the end of the header lines. If the determination is made that the body is not chunked, the control is shifted to the request body parser.

In some embodiments, the request body parser 2915 does not identify any data associated with the body of the request. Instead, it uses the Content-Length to determine how much of the body must be read to reach the next request. When the end of the body is reached, the control is shifted back to the request line parser 2905. However, if there is an error, the control is shifted to no-op state 2925 that ends the parsing of the output stream.

If the determination is made that the body is chunked, the control is shifted to the chunked body parser 2920. The chunk body parser reads the body of the request until it reaches the end. A chunked HTTP message may include the following tags: <HTTP status or request line>, <Multiple HTTP headers including "Transfer-encoding: chunked">, <blank line>, <First Chunk Size>, <Chunk Body>, <Second chunk size>, <Chunk Body>, < >, <Nth chunk size=0>, <Chunk trailer>. This is opposed to a normal "Transfer-encoding": identity> message, which would just have an <body> instead of all the "chunk" tags. In some embodiments, the purpose of the chunk body parser 2920 is to parse out the corresponding sections of the HTTP message. The chunk size parser may operate with a chunk size parser (not shown), in some embodiments. In some embodiments, the chuck size parser counts the number of bytes that come through in the chucked body so that parser can determine when the next section starts. After reading through the chunked body, the control is shifted back to the request line parser 2905. If there is an error, the control is shifted to no-op state 2925 that ends the parsing of the output stream.

Figure 31:
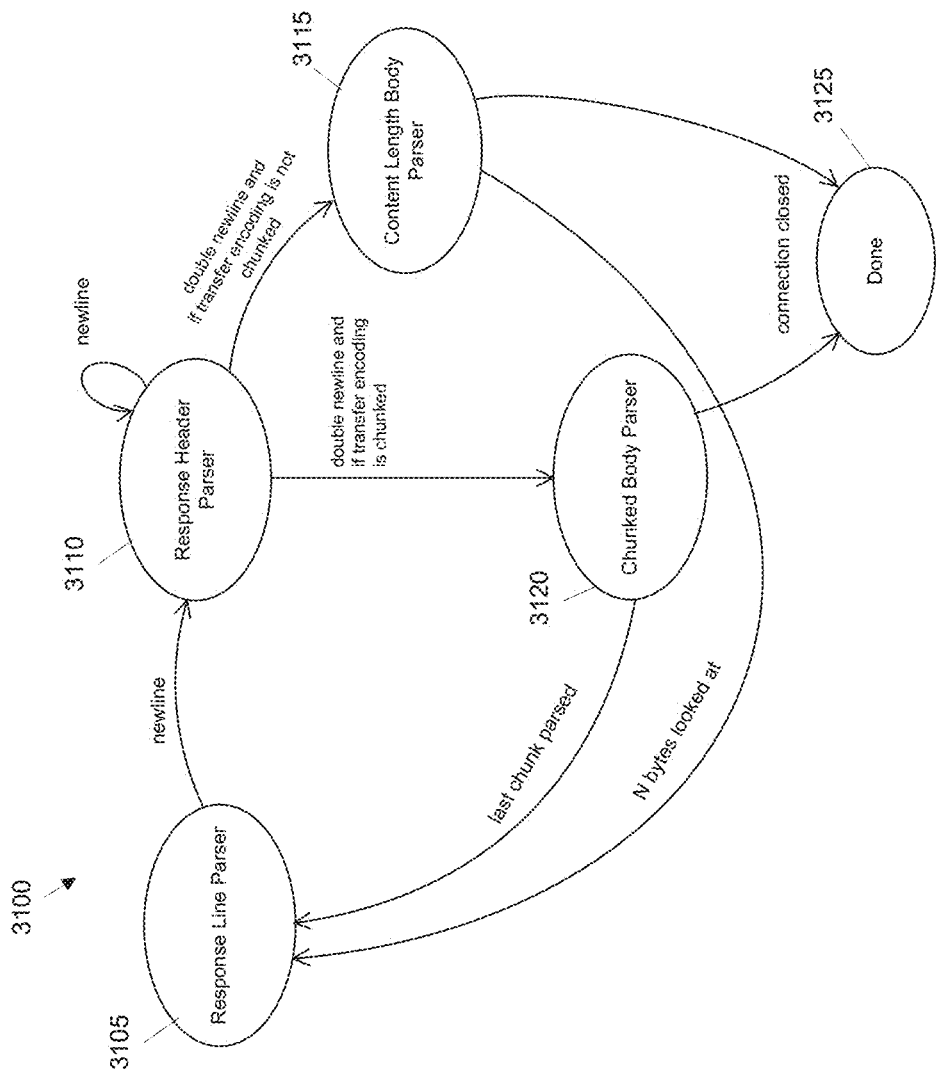
FIG. 31 presents a state diagram that illustrates example operations of the parser to extract data relating to a response to the network request.

FIG. 31 presents a state diagram 3100 that illustrates example operations of the parser to extract data relating to a response to the network request. This figure shows five states 3105-3125 that collectively perform these operations. Each of the states represents a set of one or more processes for performing a subset of the operations. The five states include a response line parser 3105, a response header parser 3110, a response body parser 3115, a chunked body parser 3120, and a done state 3125. FIG. 31 will be described by reference to FIG. 32, which shows an example of parsing a response to a network service request.

In some embodiments, the response line parser 3105 parses the input stream to read a first line in the request. In some embodiments, the response line parser does not identify any piece of information from the first line of the response. After reading the first line, the control is shifted to the response header parser 3110.

Figure 32:
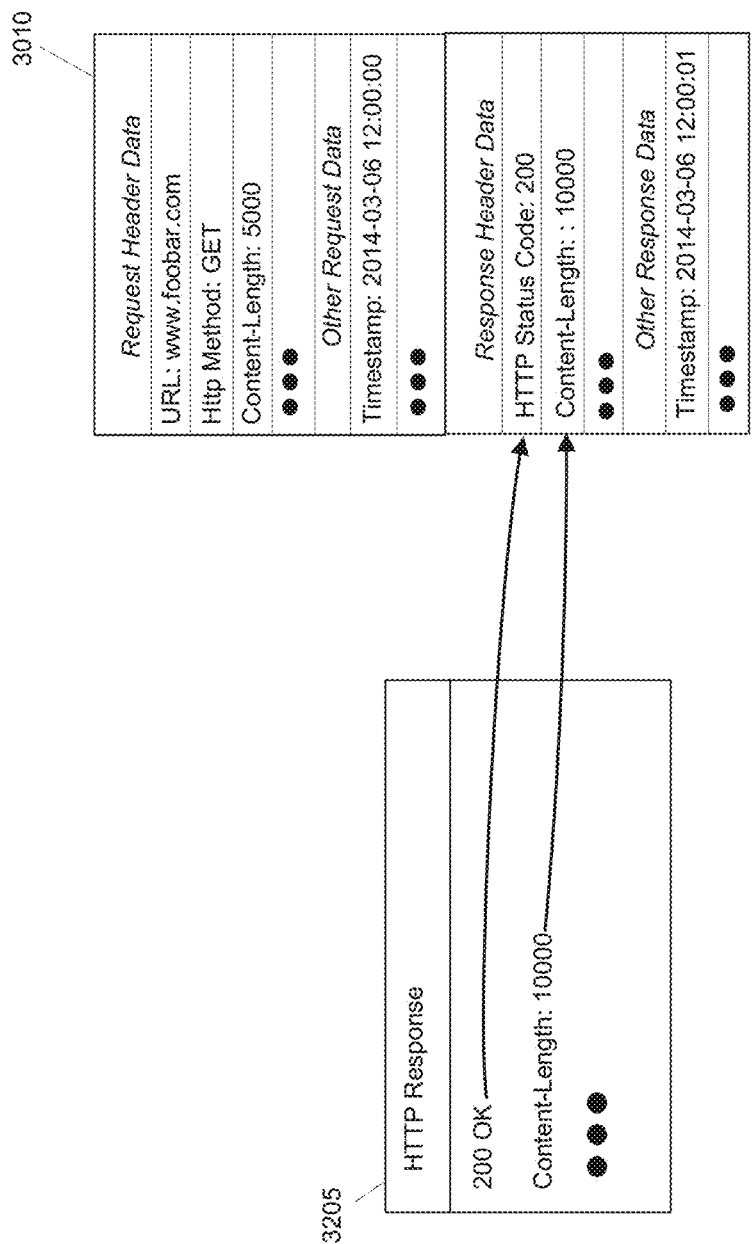
FIG. 32 illustrates an example of parsing a response to the network service request.

In some embodiments, the response header parser 3110 identifies one or more pieces of information from the response header. In the example of FIG. 32, the response header identifies a state code and Content-Length from the request 3205, and adds the values associated with the fields to the request object 3010. The response header parser may also identify Transfer-Encoding to determine if the body of the response is chunked.

As shown in FIG. 31, the response header parser 3110 is called (e.g., by the response parser or the response header parser) for each new header line. If there is a double new line, the response header parser has reached the end of the header lines. If the determination is made that the body is not chunked, the control is shifted to the request body parser. If the determination is made that the body is chunked, the control is shifted to the chunked body parser 3120. The chunk body parser 3120 reads the body of the request until it reaches the end. If for any reason the connection is closed, the control is shifted to the done state 3125. If the connection is not closed, the control is shifted back to the response line parser 3105.

If the determination is made that the body is not chunked, the control is shifted to the response body parser 3115. This response body parser 3115 reads the body of the request until it reaches the end. If for any reason the connection is closed, the control is shifted to the done state 3125. If the connection is not closed, the control is shifted back to the response line parser 3105.

III. Application Performance Tools

Figure 33:
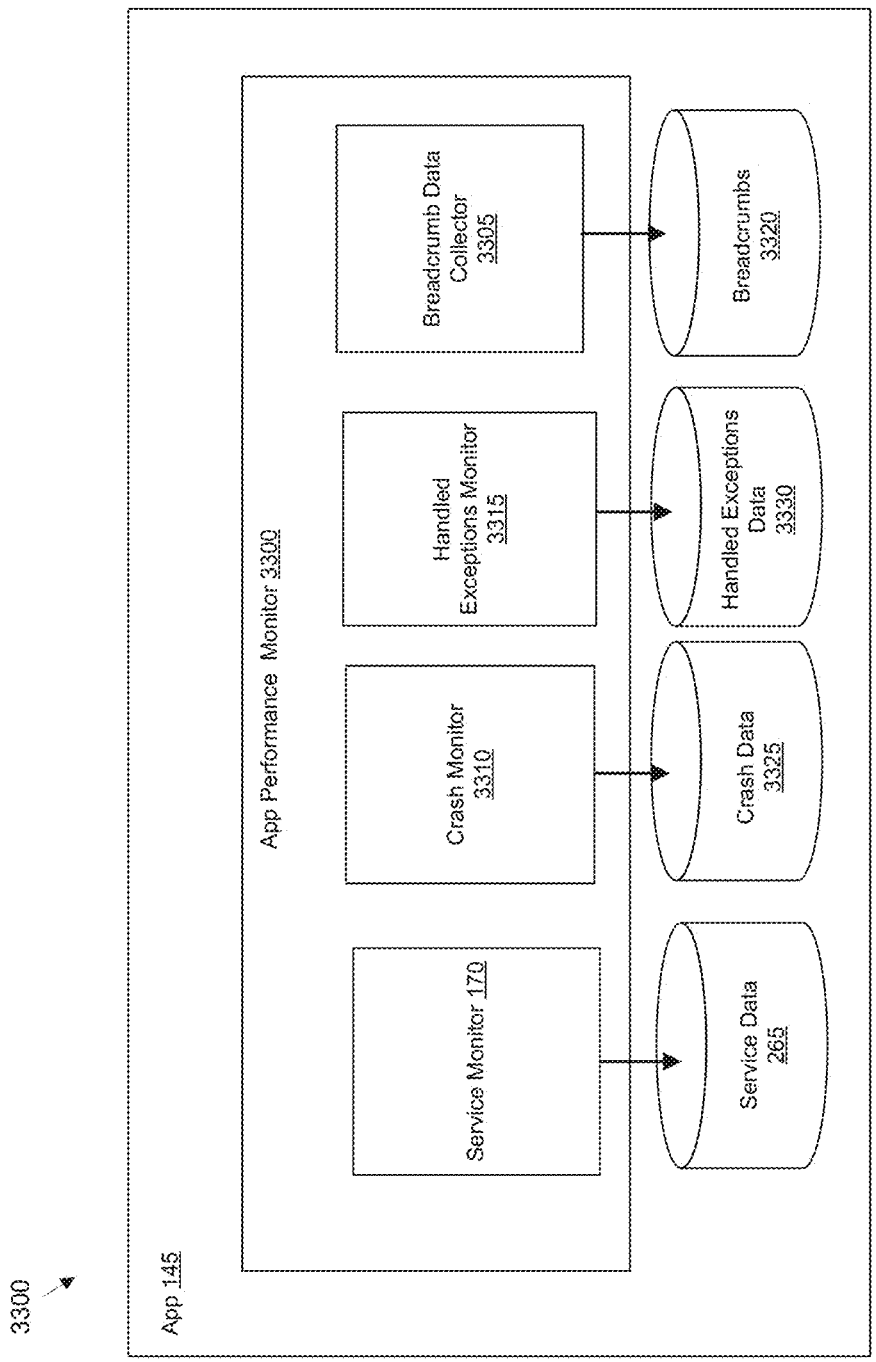
FIG. 33 shows an example architecture of an application with a number of performance monitoring tools.

The service monitor of some embodiments is one of several different application performance monitoring tools provided by the mAPM solution provider. FIG. 33 shows an example architecture 3300 of an application 145 with such performance monitoring tools. As shown, in this example, the application developer has enabled the application performance monitor features. For instance, the application developer may have downloaded a software development kit (SDK) with the tools, and linked the developer code with the performance monitoring code.

As shown in FIG. 33, when the application performance monitor features are enabled, the application includes the application performance monitor 3300. The application performance monitor includes a collection of tools to monitor application performance. The application performance monitor 3300 includes the service monitor 170 that stores service call data in storage 265. Several different examples of such a service monitor are described above in Sections I and II. The application performance monitor 3300 may also include a crash monitor 3310, a handle exceptions monitor 3315, and/or a breadcrumb data collector 3305.

The crash monitor 3310 of some embodiments monitors for and track unhandled exceptions. Similar to the service monitor 170, the crash monitor 3310 may store crash data in a storage 3225 (e.g., a data queue). When an unhandled exception (i.e. crash) occurs in the app, this agent may retrieve the stack trace of code. The stack trace of code shows, which line of code caused the crash. The stack trace may be sent to the API server with additional diagnostic data about the application and the device. This information allows the developer to recreate or understand the conditions of the crash. For instance, the developer may be informed that a certain portion of the code in version 1.0 of the application is crashing on a particular mobile device from a particular vendor. In some embodiments, the crash monitor 3310 collects any one or more of the following data types: threads (e.g., the lines of code that caused the crash including the stack trace, and any background threads that were running), type (e.g., the type of crash, such as unhanded exception, signal crash, etc.), and breadcrumbs. As will be described below, breadcrumb detection is a special feature a company or app developer can implement which allows them to specify a series of events that occurred before the crash occurred (e.g., "Pressed Login", "View Account", "Variable=0").

The handled exception monitor 3315 of some embodiments monitors for and track unhandled exceptions. Specifically, this agent 3315 allows a developer to track error conditions in an application that do not necessarily cause the application to crash. Most common use cases for handled exceptions are for tracking places in developer's code where there already exists a try/catch, to test third party SDKs, and critical areas in the code where developer might already be adding assertions. Handled exceptions can also be used to track error events such as low memory warnings. When there is a handled exception, the handled exception monitor 3315 of some embodiments collects data relating to the handled exceptions, and sends it to the API server. The handled exception report may include custom value with context about the exception. Similar to the service monitor 170, the handled exception monitor 3315 may store crash data in a storage 3325 (e.g., a data queue).

The breadcrumb data collector 3305 is a special type of collector that the developer or application author can use to track changes and information about their running program. The breadcrumb data collector is customizable by the developer. For instance, the developer might want to know what chain of events led to a crash in the application. So, the developer can specify a list of items (e.g., changes to the application, such as an end user navigated to a different application tab, the end user when to a screen to get a list of songs, etc.).

When there is a crash, the breadcrumbs are then sent with the crash report or as part of the crash report. In this manner, the developer can have an understanding of the series of one or more events that occurred prior to crash. In some embodiments, developers can specify what breadcrumbs they would like to track through the performance monitor tool or kit (SDK). For instance, the developers can leave breadcrumbs through a SDK call: [Service monitor leave Breadcrumb: @"hello world"]. This is an example of a user-defined breadcrumb. In some embodiments, the service monitor captures network breadcrumbs. In some embodiments, the network breadcrumbs are logged automatically when any network call happens. In some embodiments, the network breadcrumbs are logged automatically but do not show up on error reports unless specified by a developer. Alternatively, the network breadcrumbs may only be logged after the developer instructs the service monitor to log network breadcrumbs.

In some embodiments, the service monitor is used to track only a set number of network breadcrumbs. The service monitor may only log the last several connections, and not all connection. For instance, the service monitor may be used to log the last ten network connections. In some embodiments, the number of network breadcrumbs the service monitor logs can be customized based on user input. That is, the performance monitor tools of some embodiments may allow a user to specify (e.g., through the performance monitor tool or kit) the maximum number of breadcrumbs to track. In some embodiments, the breadcrumb data collector only retains the last several number of network breadcrumbs in a (e.g., circular) buffer or queue.

Figure 34:
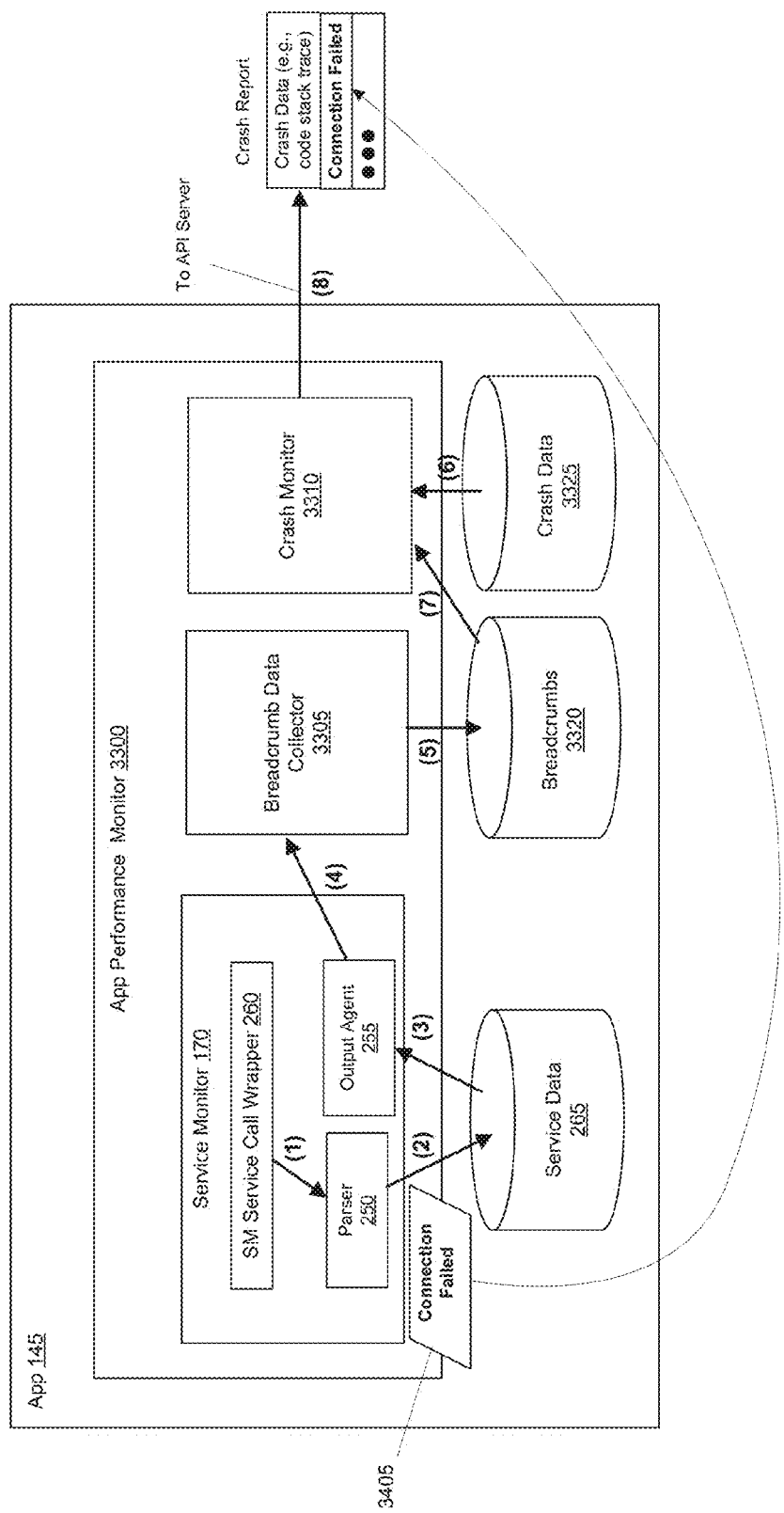
FIG. 34 shows an example of how data relating to a connection can be sent part of a crash report.

In some embodiments, the information gathered by the service monitor regarding a service call is stored as a breadcrumb data. The breadcrumb data then is sent to the API server when there is a crash. FIG. 34 shows an example of how data relating to a connection can be sent part of a crash report. In this example, the application performance monitor 3300 includes the service monitor 170, the breadcrumb data collector 3205, and the crash monitor 3210. The service monitor 0170 includes the service call wrapper 260, the parser 250, and the output agent 255, which are described above by reference to FIG. 2.

The data flow of FIG. 34 begins when the service call wrapper intercepts a call. The server call wrapper 260 then passes (at 1) the service request and any response to the parser 250. The parser parses the call and any response to identity service call data 3405. The parser then stores (at 2) the service call data 3405 in the storage 265. When the service call data is ready to be sent, the output agent 255 may gather additional contextual data, as mentioned above by reference to FIGS. 23 and 24. The output agent then the report to the API server.

The output agent 255 also provides (at 3 and 4) the service call data to the breadcrumb data collector 3305. The breadcrumb data collector then stores (at 5) the data in the storage 3300. If there is a crash, the crash detector gathers data regarding the crash and stores it in the storage 3325. When the crash data is ready to be sent, the crash monitor retrieves (at 6) the crash data from the storage. The crash monitor then retrieves (at 7) the service call data from the breadcrumb storage 3320. The crash monitor then sends (at 8) a crash report with the crash data and the service call data. This association of the service call data with the crash report allows the developer to determine if there was a connection between the network event and the application crash.

In the example described above, the breadcrumb data is sent with the crash report. Alternatively, or conjunctively, such breadcrumb data may be sent with handled exception report, in some embodiments. Although FIG. 34 shows several arrowed lines with numbers that indicate a sequence of operations. The actual sequence may be different because each component could be gathering different data at different time. Also, the figure has been simplified to highlight how network connection data can be sent as part of a crash report. In addition, although the FIG. 34 shows the output agent handing the network breadcrumb to the breadcrumb data collector. The service monitor 170 may interface with a logging module or agent (not shown) to store the network breadcrumb in storage 3320. An example of a service monitoring object calling an example logging module (e.g., a log data method) is shown and described above by reference to FIG. 28.

Figure 35:
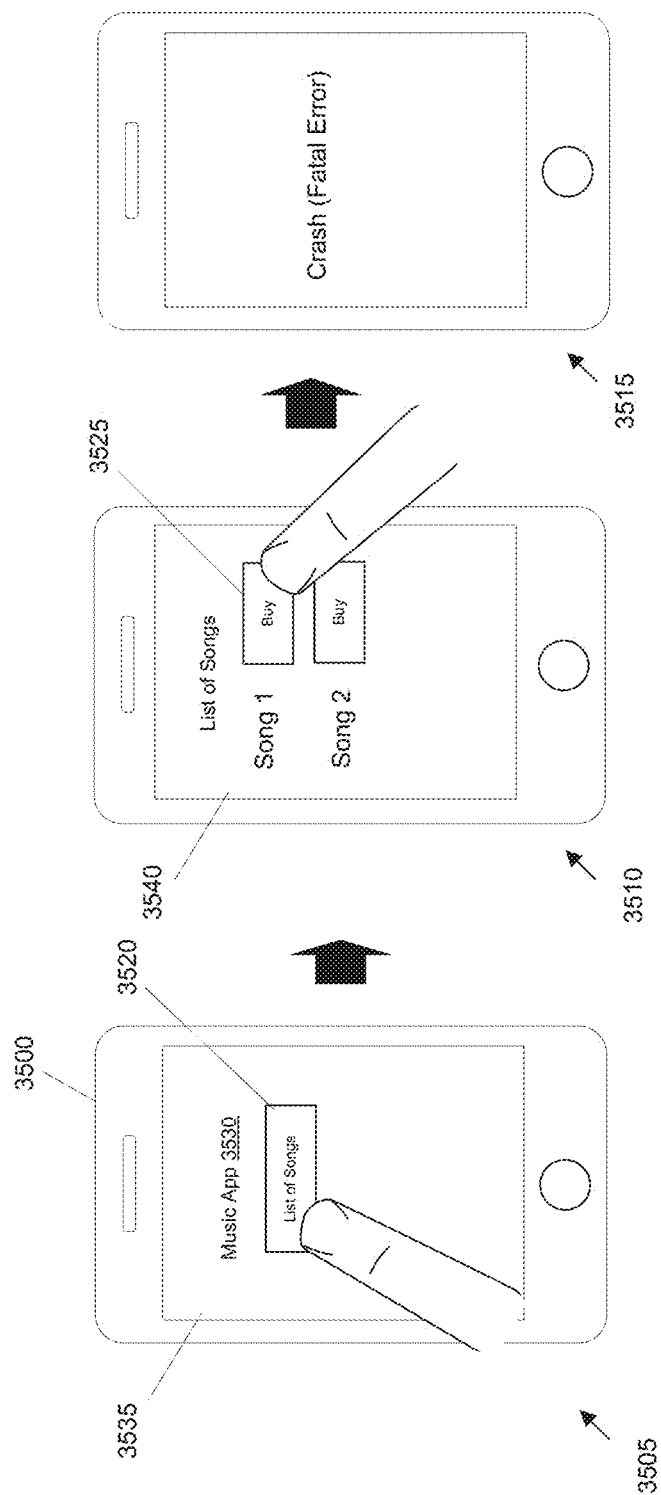
FIG. 35 illustrates an example of a user interacting with an application, which leads to the application crashing.
Figure 36:
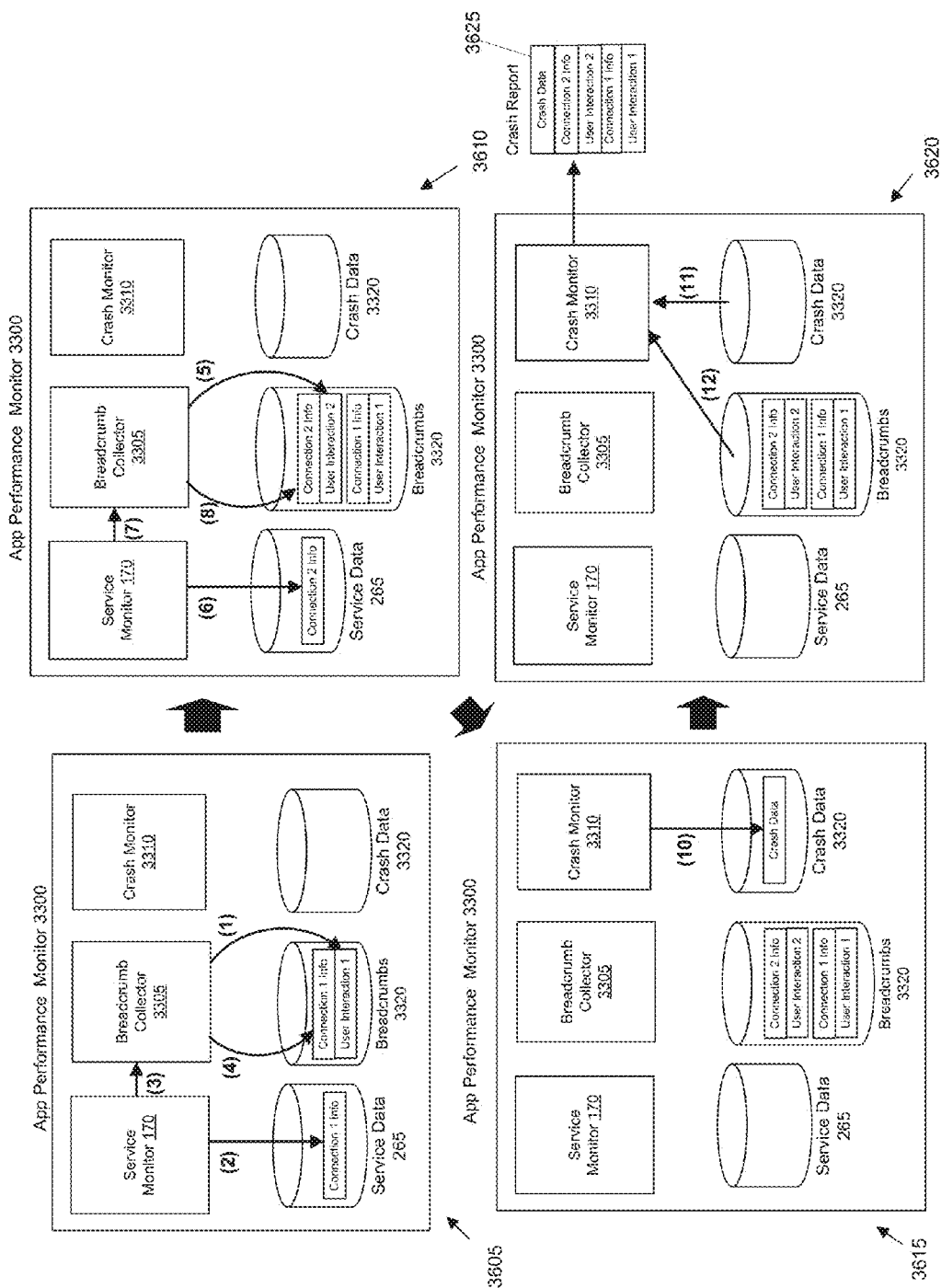
FIG. 36 shows an example of breadcrumb data that is captured by the breadcrumb data collector prior to the application crashing.

As mentioned above, the breadcrumb data collector is customizable by the developer. For instance, the developer might want to know what chain of events led to a crash in the application. So, the developer can specify a list of items. For instance, the developer may specify tracking changes to the application, such as change in data value associated with a parameter. The developer may specify tracking user interaction with the application, such as an end user navigated to a different application tab, the end user when to a screen to get a list of songs, change in data, etc. FIGS. 35 and 36 conceptually illustrate an example of capturing service call data and user interaction data as breadcrumb data. Specifically, FIG. 35 illustrates an example of a user interacting with an application. The user interaction leads to application crashing. FIG. 35 shows an example of breadcrumb data that is captured by the breadcrumb data collector 3305 prior to the crash.

Three operational stages 3505-3115 of the mobile device 3500 are shown in this figure. In the first stage 3505, the mobile device 3500 has been turned on, and the application 3530 has been opened. In this example, the application 3530 is an application to buy music. However, the application 3530 can be any application or game (e.g., that makes network service requests).

As shown in the first stage 3505, the user selects a button 3520 on a page 3535 of the application 3530 to navigate to a page with a list of songs. Here, the first user input on the button 3520 initiates a first network request. The second stage 3510 shows that first user input caused the mobile device to display a page 3540 with a list of songs. The song page 3540 includes a number of buttons to purchase songs. The user then selects one of the buttons 3525 to purchase a song. This is the second user interaction shown in FIG. 35. The second user interaction also initiates a second network request. The third stage 3505 illustrates the mobile device 3500 after the second user interact. Specifically, the third stage 3515 shows that the application 3530 has crashed.

FIG. 36 shows four stages operational stages 3605-3620 of the same mobile device 3500 from the perspective of the application performance monitor 3300. The first stage 3605 illustrates several breadcrumb data being stored based on the first user input and the first network request in the first stage 3505 of the previous figure. Specifically, the breadcrumb data collector 3305 has detected the first user interaction and stored data regarding the interaction as a breadcrumb data in the breadcrumb data storage 3320. The service monitor has also detected the first network request and stored data regarding the request in the service call data storage 265. The service monitor 170 has also sent the service call data to the breadcrumb data collector 3305. The breadcrumb data collector then stores the service call data in the breadcrumb data storage 3320.

The second stage 3610 illustrates several breadcrumb data being stored as a result of the second user input and second first network in the second stage 3510 of the previous figure. Specifically, the breadcrumb data collector 3305 has detected the second user interaction and stored data regarding the interaction as a breadcrumb data in the breadcrumb data storage 3320. The service monitor has also detected the second network request and stored data regarding the request in the service call data storage 265. The service monitor 170 has also sent the service call data to the breadcrumb data collector 3305. The breadcrumb data collector then stores the service call data in the breadcrumb data storage 3320.

The third stage 3615 illustrates the crash monitor 3310 detecting the application crash and storing data relating to the crash in the crash data storage 3320. The fourth stage 3620 shows the crash monitor 3310 retrieving the crash data from the storage 3320. The crash monitor then retrieves the group of breadcrumbs data (e.g., that relates to the two network request and the two user interactions) from the breadcrumb storage 3320. The crash monitor then sends a crash report 3625 with the crash data and the group of breadcrumb data.

As mentioned above, the API server (e.g., managed by the mAPM service provider) generates a real-time global view of application diagnostics and crashes across different mobile device platforms (e.g., iOS, Android, Windows Phone, etc.). The API server of some embodiments formats or translates the captured data (e.g., the service call data, mobile state data, other contextual data, etc.) in some manner to present it to developers. For example, the captured data may be presented in statistical and/or in graphical format. Such a format allows developers to easily track (e.g., in real-time) performance of one or more of their applications across different types of mobile devices, Operating Systems (OSs), Application versions, etc. This is important because the developers do not have to wait for user feedback. Instead, they can access one or more of the different application performance reports, determine if there are any problems, and address those problems if there are any.

FIG. 37 provides an illustrative example of a performance report 3700 generated by the API server (e.g., a performance monitoring server). The generated report is presented on a client device upon user input (e.g., by a developer to view real-time data. As mentioned above, the client device may be running a thin-client or thick client, in some embodiments.

In this example, the performance report is a trend report 3700 but can be any other type of report. In some embodiments, trending represents tracking captured data over some period of time to detect and diagnose changes in the application's performance. The trends can be over different types of data. For instance, the API server of some embodiments allows developers to track real-time and historical performance across device, OS, carriers, versions, etc. The API server may allow developers to view trends by device, OS, and carrier. For developers, such trends can be important from a business perspective as well as a technical perspective. From a business perspective, the trends allow the developers to know which device (e.g., make and/or model), OS (e.g., version), and/or carrier is the most popular. From a technical perspective, the trends allow the developers to know which device, OS, and/or carrier is the most problematic across the developer's user base.

Although the performance report shows a performance report for a number of mobile devices or OSs, the API server may provide a report regarding performance of the application on a single mobile device, in some embodiments. This can be achieved because the API server has all the necessary metadata, such as the device ID that is described above by reference to FIG. 23. Also, the performance report can be formatted, translated, or presented differently using one or more of the different types of data shown in FIG. 23 or any other captured or collected data described herein (e.g., mobile network code (MNC), mobile country code (MCC), roaming, time, memory usage, up time, whether the device is jailbroken or rooted, etc.). In some embodiments, the API server can provide raw data that can be processed at the client device (e.g., through a web component, plug-in, or if the client device has a thick client application, through the client application's code).

As shown in FIG. 37, the report 3700 includes a device section 3705 with device trends, and an OS section 3710 with OS trends. The device section lists different mobile devices by make and/or model. Each one is listed with measurements or statistics, such as the total number of requests (e.g., request volume), the average latency, user base or the number of people using the application, the developer's application, the number of service errors, and the average number of crashes. Each measurement is shown graphically and textually. The OS section has the same measurements or statistics, but the section lists different versions of mobile one or more mobile operating systems. Although, the figure shows several bar graphs, the report 3700 may present other types of graphs (e.g., a line graph, pie chart, etc.) or other types of graphical representation (e.g., media presentation or animation) of the captured data.

IV. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 38:
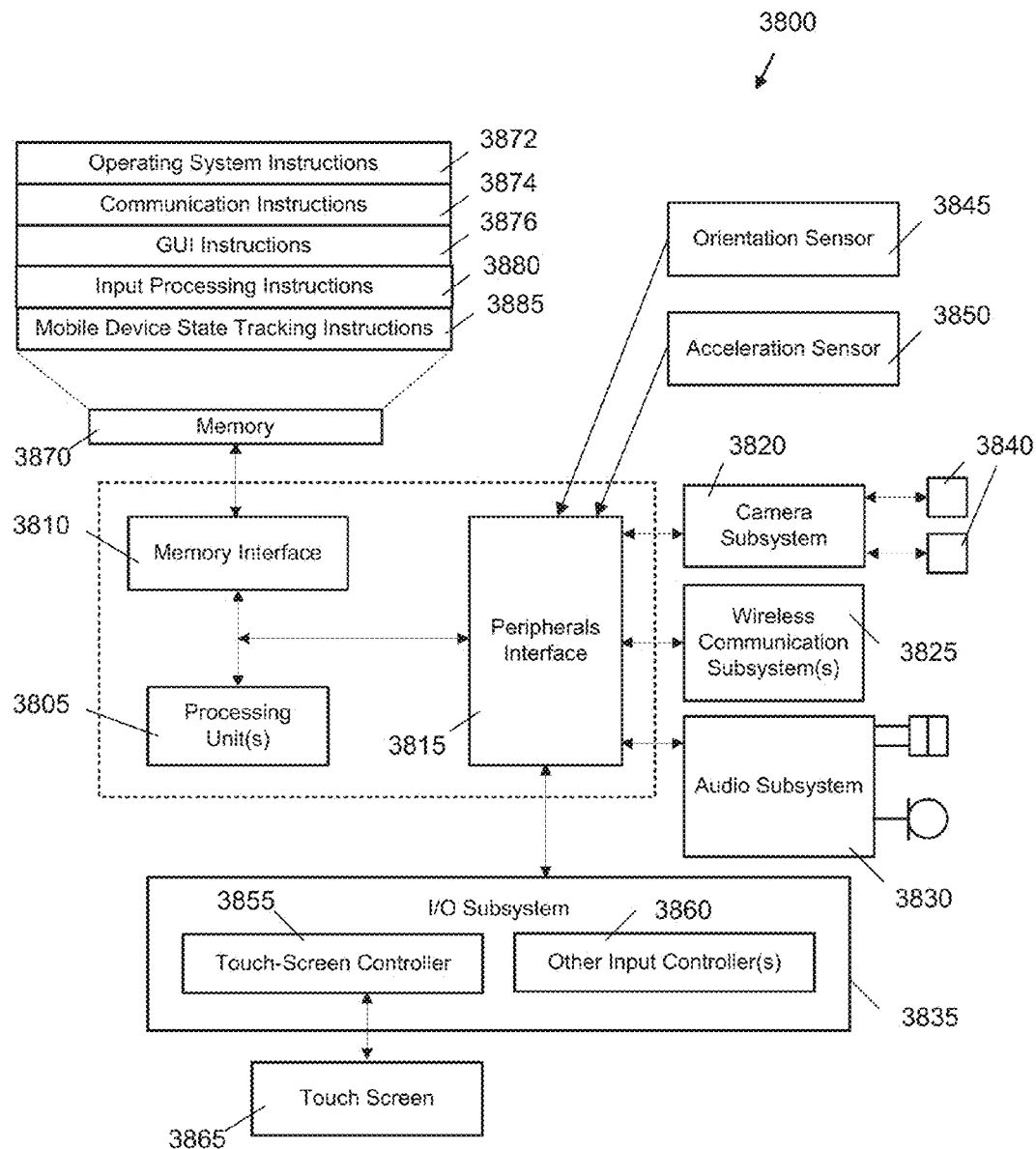
FIG. 38 shows an example of an architecture of a mobile computing device.

The service monitor of some embodiments operates on mobile devices. The applications of some embodiments operate on mobile devices. FIG. 38 is an example of an architecture 3800 of such a mobile computing device. Examples of mobile computing devices include smartphones, tablets, laptops, etc. As shown, the mobile computing device 3800 includes one or more processing units 3805, a memory interface 3810 and a peripherals interface 3815.

The peripherals interface 3815 is coupled to various sensors and subsystems, including a camera subsystem 3820, a wireless communication subsystem(s) 3825, an audio subsystem 3830, an I/O subsystem 3835, etc. The peripherals interface 3815 enables communication between the processing units 3805 and various peripherals. For example, an orientation sensor 3845 (e.g., a gyroscope) and an acceleration sensor 3850 (e.g., an accelerometer) is coupled to the peripherals interface 3815 to facilitate orientation and acceleration functions.

The camera subsystem 3820 is coupled to one or more optical sensors 3840 (e.g., a charged coupled device (CCD) optical sensor, a complementary metal-oxide-semiconductor (CMOS) optical sensor, etc.). The camera subsystem 3820 coupled with the optical sensors 3840 facilitates camera functions, such as image and/or video data capturing. The wireless communication subsystem 3825 serves to facilitate communication functions. In some embodiments, the wireless communication subsystem 3825 includes radio frequency receivers and transmitters, and optical receivers and transmitters (not shown in FIG. 38). These receivers and transmitters of some embodiments are implemented to operate over one or more communication networks such as a GSM network, a Wi-Fi network, a Bluetooth network, etc. The audio subsystem 3830 is coupled to a speaker to output audio (e.g., to output different sound effects associated with different image operations). Additionally, the audio subsystem 3830 is coupled to a microphone to facilitate voice-enabled functions, such as voice recognition, digital recording, etc.

The I/O subsystem 3835 involves the transfer between input/output peripheral devices, such as a display, a touch screen, etc., and the data bus of the processing units 3805 through the peripherals interface 3815. The I/O subsystem 3835 includes a touch-screen controller 3855 and other input controllers 3860 to facilitate the transfer between input/output peripheral devices and the data bus of the processing units 3805. As shown, the touch-screen controller 3855 is coupled to a touch screen 3865. The touch-screen controller 3855 detects contact and movement on the touch screen 3865 using any of multiple touch sensitivity technologies. The other input controllers 3860 are coupled to other input/control devices, such as one or more buttons. Some embodiments include a near-touch sensitive screen and a corresponding controller that can detect near-touch interactions instead of or in addition to touch interactions.

The memory interface 3810 is coupled to memory 3870. In some embodiments, the memory 3870 includes volatile memory (e.g., high-speed random access memory), non-volatile memory (e.g., flash memory), a combination of volatile and non-volatile memory, and/or any other type of memory. As illustrated in FIG. 38, the memory 3870 stores an operating system (OS) 3872. The OS 3872 includes instructions for handling basic system services and for performing hardware dependent tasks.

The memory 3870 may include communication instructions 3874 to facilitate communicating with one or more additional devices; graphical user interface instructions 3876 to facilitate graphic user interface processing; input processing instructions 3880 to facilitate input-related (e.g., touch input) processes and functions. The memory may also include other instructions such as instructions 3885 to update different types of mobile device state (e.g., location information, carrier information, network connectivity information, etc.). The instructions described above are merely exemplary and the memory 3870 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 38 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 38 may be split into two or more integrated circuits.

B. Computer System

Figure 39:
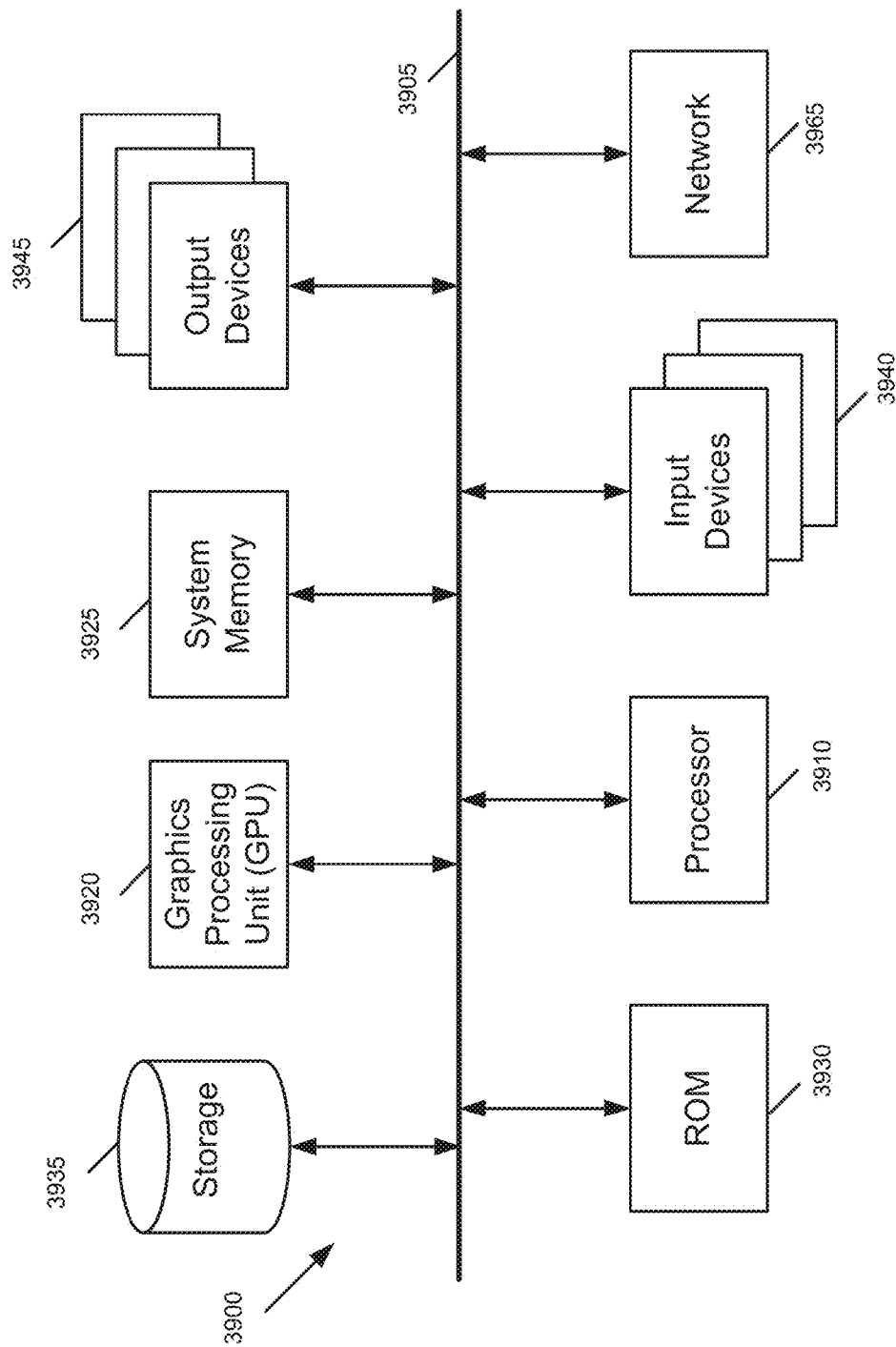
FIG. 39 conceptually illustrates an electronic system with which some embodiments of the invention are implemented.

FIG. 39 conceptually illustrates another example of an electronic system 3900 with which some embodiments of the invention are implemented. The electronic system 3900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3900 includes a bus 3905, processing unit(s) 3910, a graphics processing unit (GPU) 3915, a system memory 3920, a network 3925, a read-only memory 3930, a permanent storage device 3935, input devices 3940, and output devices 3945.

The bus 3905 collectively represents all system, peripheral, and chipset buses that communicatively connect the numerous internal devices of the electronic system 3900. For instance, the bus 3905 communicatively connects the processing unit(s) 3910 with the read-only memory 3930, the GPU 3915, the system memory 3920, and the permanent storage device 3935.

From these various memory units, the processing unit(s) 3910 retrieves instructions to execute and data to process in order to execute the processes of the invention. The processing unit(s) may be a single processor or a multi-core processor in different embodiments.

The read-only-memory (ROM) 3930 stores static data and instructions that are needed by the processing unit(s) 3910 and other modules of the electronic system. The permanent storage device 3935, on the other hand, is a read-and-write memory device. This device is a non-volatile memory unit that stores instructions and data even when the electronic system 3900 is off. Some embodiments of the invention use a mass-storage device (such as a magnetic or optical disk and its corresponding disk drive) as the permanent storage device 3935.

Other embodiments use a removable storage device (such as a floppy disk, flash memory device, etc., and its corresponding drive) as the permanent storage device. Like the permanent storage device 3935, the system memory 3920 is a read-and-write memory device. However, unlike storage device 3935, the system memory 3920 is a volatile read-and-write memory, such a random access memory. The system memory 3920 stores some of the instructions and data that the processor needs at runtime. In some embodiments, the invention's processes are stored in the system memory 3920, the permanent storage device 3935, and/or the read-only memory 3930. From these various memory units, the processing unit(s) 3910 retrieves instructions to execute and data to process in order to execute the processes of some embodiments.

The bus 3905 also connects to the input and output devices 3940 and 3945. The input devices 3940 enable the user to communicate information and select commands to the electronic system. The input devices 3940 include alpha-numeric keyboards and pointing devices (also called "cursor control devices"), cameras (e.g., webcams), microphones or similar devices for receiving voice commands, etc. The output devices 3945 display images generated by the electronic system or otherwise output data. The output devices 3945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 39, bus 3905 also couples electronic system 3900 to a network 3925 through a network adapter (not shown). In this manner, the computer can be a part of a network of computers (such as a local area network ("LAN"), a wide area network ("WAN"), or an Intranet, or a network of networks, such as the Internet. Any or all components of electronic system 3900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Also, while many of the features of the service monitor have been described as being performed by one component or module (e.g., the output agent, the mobile device state data collector, etc.), one of ordinary skill in the art will recognize that the functions of such components described herein might be split up into multiple sub-components. Similarly, functions described as being performed by multiple different components might be performed by a single component, in some embodiments. Further, while many of the features of the service monitor have been described as being performed by one module (e.g., the output agent, the mobile device state data collector, etc.), one of ordinary skill in the art will recognize that the functions of such components described herein might be split up into multiple components. Similarly, functions described as being performed by multiple different components might be performed by a single component, in some embodiments. In addition, a number of the figures (including FIGS. 3, 8, 12, 24, 29, and 31) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing an application for execution by at least one processing unit of a mobile device, the application comprising:
    a service monitor to monitor and track a service that the application is using on the mobile device and to store captured service data in a storage, the service monitor comprising: (a) a service call wrapper (i) to intercept a service request made by the application to access the service and (ii) to capture data relating to the service request, and (b) at least one mobile state data collector to associate the captured data with mobile state data that indicates a state of the mobile device at the time the service request data was captured by the service call wrapper; and
    an output agent to send the captured data to a performance monitoring server in order to present, based on the captured data and other captured data from other mobile devices, at least one performance report relating to performance of the service as used by the same application across a number of mobile devices,
    wherein the storage is a data queue to process one data request at a time in the order that the data request was received and to ensure that the captured data relating to the service request is synchronized with the mobile state data.

2. The non-transitory machine readable medium of claim 1, wherein the service call wrapper is a service monitor method that wraps an application method to intercept the service request and capture the service request data.

3. The non-transitory machine readable medium of claim 2, wherein the service monitor method calls the application method after the interception of the application method.

4. The non-transitory machine readable medium of claim 2, wherein the service monitor is further to direct an application runtime engine to call the service monitor method instead of the application method.

5. The non-transitory machine readable medium of claim 2, wherein the application further comprises a service monitor initializer to identify a class or object having the application method to be wrapped by the service monitor method.

6. The non-transitory machine readable medium of claim 5, wherein the service monitor initializer performs a multi-level filtering operation to identify the class or the object with the application method.

7. The non-transitory machine readable medium of claim 1, wherein the service monitor captures data relating to the service request by gathering data associated with the service request and any response received in response to the service request.

8. The non-transitory machine readable medium of claim 7, wherein the service monitor further comprises a parser to capture the service request data by parsing the service request and the response to the service request.

9. A method for an application executing on a mobile device, the method comprising:
    monitoring and tracking a service that the application is using on the mobile device by (i) intercepting a service request made by the application to access the service, (ii) capturing data relating to the service request, and (iii) storing the captured data in a storage;
    associating the captured data with mobile state data that indicates a state of the mobile device at the time the service request data was captured; and
    sending the captured data to a performance monitoring server in order to present, based on the captured data and other captured data from other mobile devices, at least one performance report relating to the performance of the service as used by the same application across a number of mobile devices;
    wherein the storage is a data queue to process one data request at a time in the order that the data request was received and to ensure that the captured data relating to the service request is synchronized with the mobile state data.

10. The method of claim 9, wherein the monitoring comprises wrapping an application method with a service monitor method to intercept the service request and capture the service request data.

11. The method of claim 10, wherein the service monitor method calls the application method after the interception of the application method.

12. The method of claim 10, wherein the monitoring further comprises directing an application runtime engine to call the service monitor method instead of the application method.

13. The method of claim 10 further comprising performing an initialization operation to identify a class or object having the application method to be wrapped by the service monitor method.

14. The method of claim 13, wherein performing the initialization operation comprises performing a multi-level filtering operation to identify the class or the object with the application method.

* * * * *